US012694247B2

(12) United States Patent
Filter et al.

(10) Patent No.: US 12,694,247 B2
(45) **Date of Patent: *Jul. 28, 2026**

(54) MULTI-PART CODE SYSTEM

(71) Applicant: Flexa Inc., New York, NY (US)

(72) Inventors: Trevor Filter, New York, NY (US);
Zachary Kilgore, Brooklyn, NY (US);
Tyler Robert Spalding, New York, NY (US)

(73) Assignee: Flexa Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/814,270

(22) Filed: Aug. 23, 2024

(65) Prior Publication Data

US 2025/0173534 A1      May 29, 2025

Related U.S. Application Data

(63) Continuation of application No. 18/214,319, filed on Jun. 26, 2023, now Pat. No. 12,073,285, which is a
(Continued)

(51) Int. Cl.
*G06K 7/14*                (2006.01)

(52) U.S. Cl.
CPC ......... *G06K 7/1443* (2013.01); *G06K 7/1413* (2013.01); *G06K 7/1417* (2013.01); *G06K 7/1447* (2013.01); *G06K 7/1456* (2013.01)

(58) Field of Classification Search
CPC .. G06K 7/1443; G06K 7/1413; G06K 7/1417; G06K 7/1447; G06K 7/1456;
(Continued)

(56) References Cited

U.S. PATENT DOCUMENTS 10,540,639 B2      1/2020   Brock
11,194,981 B2 *  12/2021   Filter ............... G06K 19/06037
(Continued)

FOREIGN PATENT DOCUMENTS

EP          2431912 A1      3/2012
KR      20120116265 A      10/2012

OTHER PUBLICATIONS

European Patent Office; Extended European Search Report; Application No. 21803989.9; Mar. 27, 2024; 7 pgs.
(Continued)

*Primary Examiner* — Matthew Mikels

(74) *Attorney, Agent, or Firm* — Garlick & Markison; Patricia M. Healy

(57) ABSTRACT

A multi-part code system includes a network computing device operable to generate a first and second portion of a code for an interaction. The multi-part code system further
(Continued)

includes a second computing device including a second network application and a first computing device including a first network application operable to obtain the second portion of the code, receive the first portion of the code, display the second portion of the code, display the first portion of the code on a code display area, instruct a user to drag the first portion of the code from the code display area to the display area to align with the second portion of the code. When the first portion of the code is aligned with the second portion of the code in the display area, produce the code, and send a finalized interaction notification to the network computing device.

18 Claims, 60 Drawing Sheets

Related U.S. Application Data continuation of application No. 17/378,433, filed on Jul. 16, 2021, now Pat. No. 11,694,049, which is a continuation of application No. 16/871,689, filed on May 11, 2020, now Pat. No. 11,194,981.

(58) Field of Classification Search
CPC .............. G06K 7/1095; G06K 7/1491; G06K 19/06037; G06K 19/06046; G06K 19/06028
See application file for complete search history.

(56) References Cited

U.S. PATENT DOCUMENTS

| | | | | |
|---|---|---|---|---|
| 11,694,049 | B2 * | 7/2023 | Filter | G06K 7/1447 |
| | | | | 235/462.08 |
| 12,073,285 | B2 * | 8/2024 | Filter | G06K 7/1491 |
| 2013/0112760 | A1 | 5/2013 | Schory et al. | |
| 2013/0230241 | A1 | 9/2013 | Cheong et al. | |
| 2021/0350097 | A1 | 11/2021 | Filter | |
| 2022/0222462 | A1 | 7/2022 | Filter | |

OTHER PUBLICATIONS

International Searching Authority; International Search Report and Written Opinion; International Application No. PCT/US2021/031368; Aug. 26, 2021; 9 pgs.
Shuming Jiao et al.; Visual cryptography in single-pixel imaging. Image and video Processing (eess. IV); Nanophotonics Research Center; Nov. 12, 2019; 11 pgs Retrieved from the Internet: <URL: https://arxiv.org/abs/1911.05033>.
Tailing Yuan et al.; Two-Layer QR Codes; IEEE Transactions on Image Processing; Sep. 2019; 17 pgs Retrieved from the Internet: <URL: https://ieeexplore.ieee.org/document/87 09989>.
Wikiversity; Reed-Solomon codes for coders; Wikiversity, May 6, 2020; 40 pgs Retreived from the Internet: <URL: https://en.wikiversity.org/wiki/Reed%E2%80%93Solomon_codes_for_coders>.
Canada Intellectual Property Office; Office Action; CA Application No. 3,177,399; Apr. 28, 2025; 3 pgs.

* cited by examiner

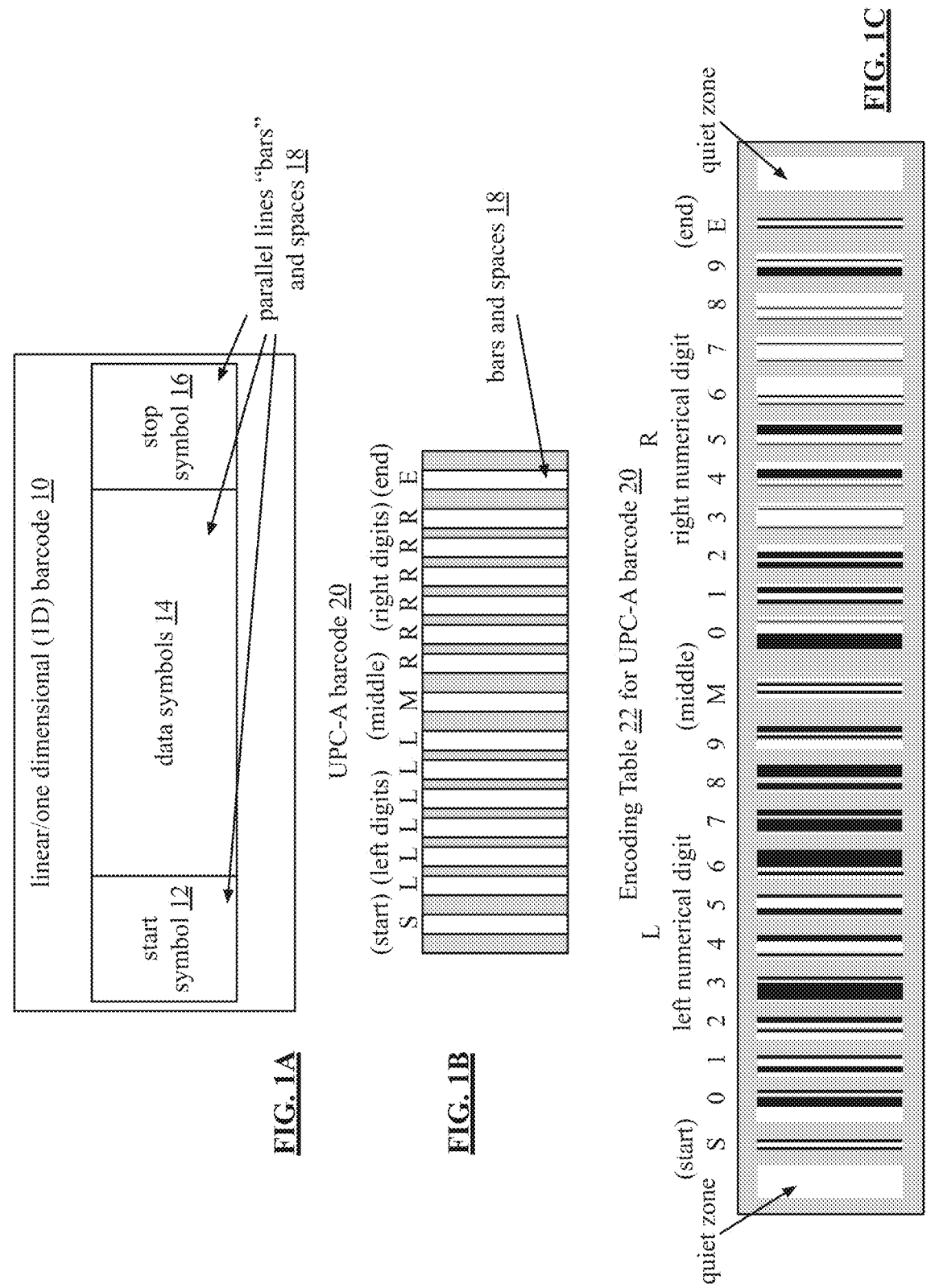

quick response (QR) code 30 data symbols 14 two dimensional (2D) barcode 24

| orientation symbol(s) 26 | data symbols 14 |
| data symbols 14 | |
| non-data info symbol(s) 28 | data symbols 14 | vertical & horizontal pattern orientation symbols 26 & non-data info symbols 28 positioning markings 32 alignment marking 38 quiet zone 42 format information 40 timing patterns 34 version information 36

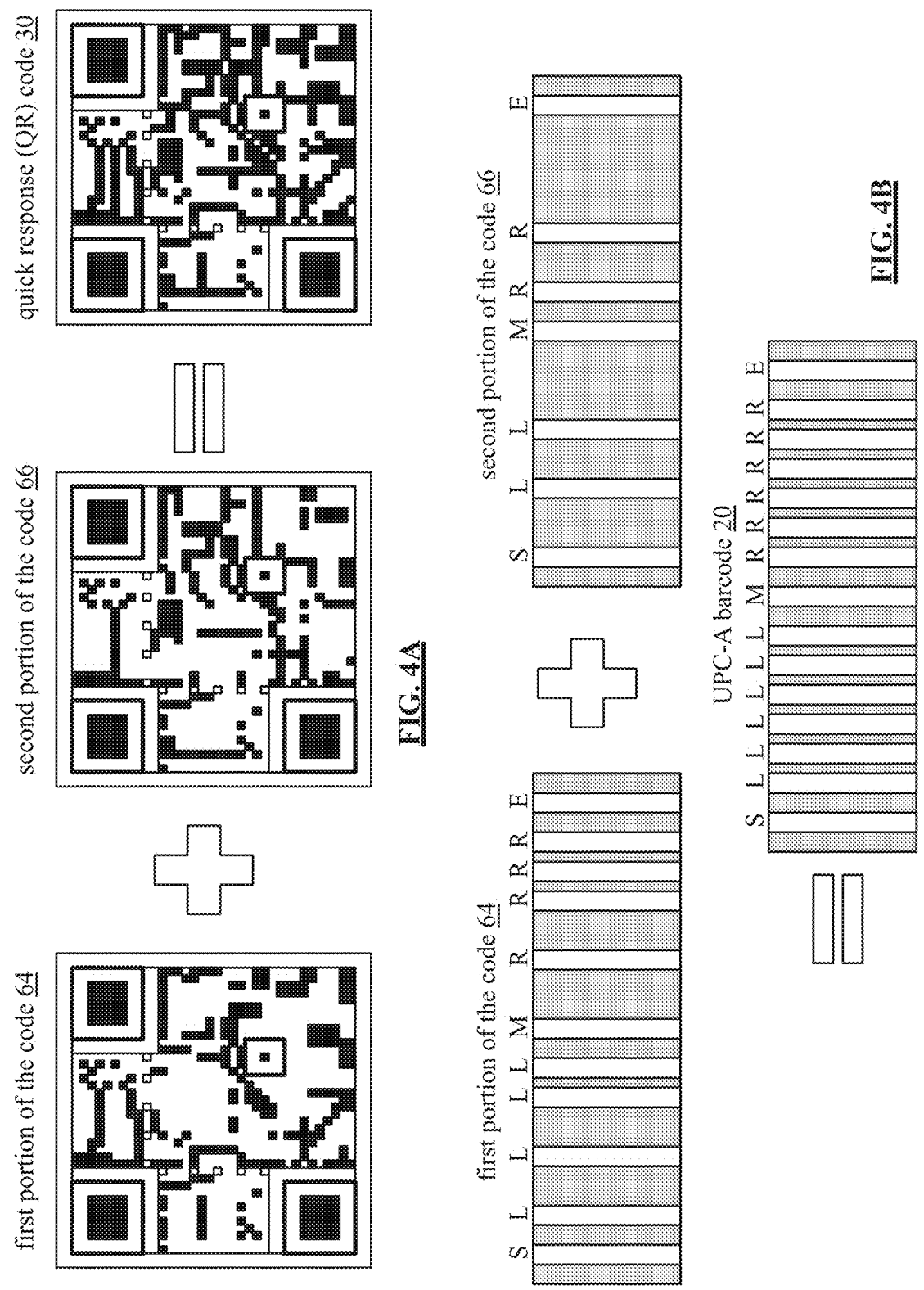

first portion of the code 64

IX    EUP    49%99 second portion of the code 66

PKDH    1234 code 70

IXPKDHEUP12349%99 first portion of the code 64 second portion of the code 66 code 70

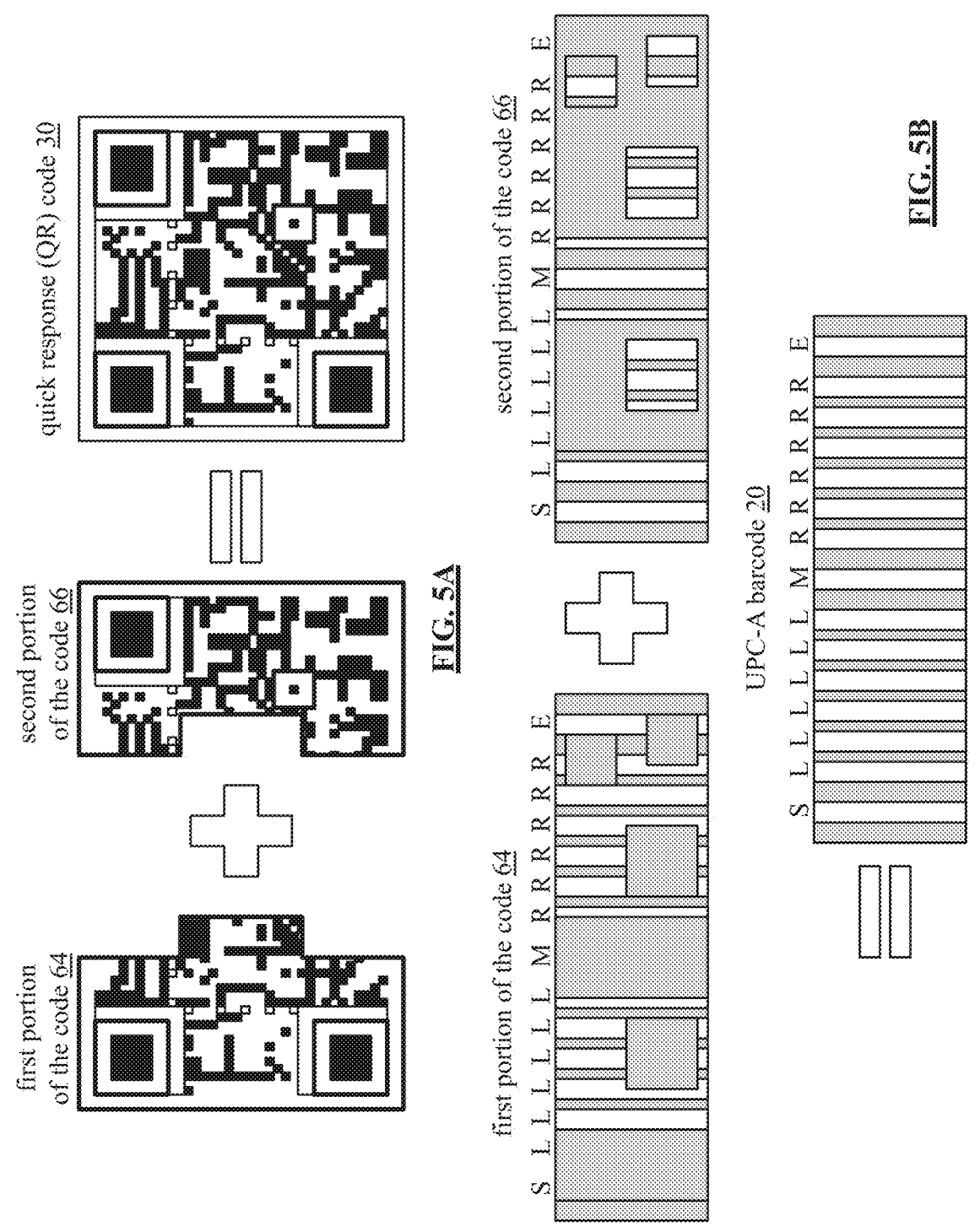

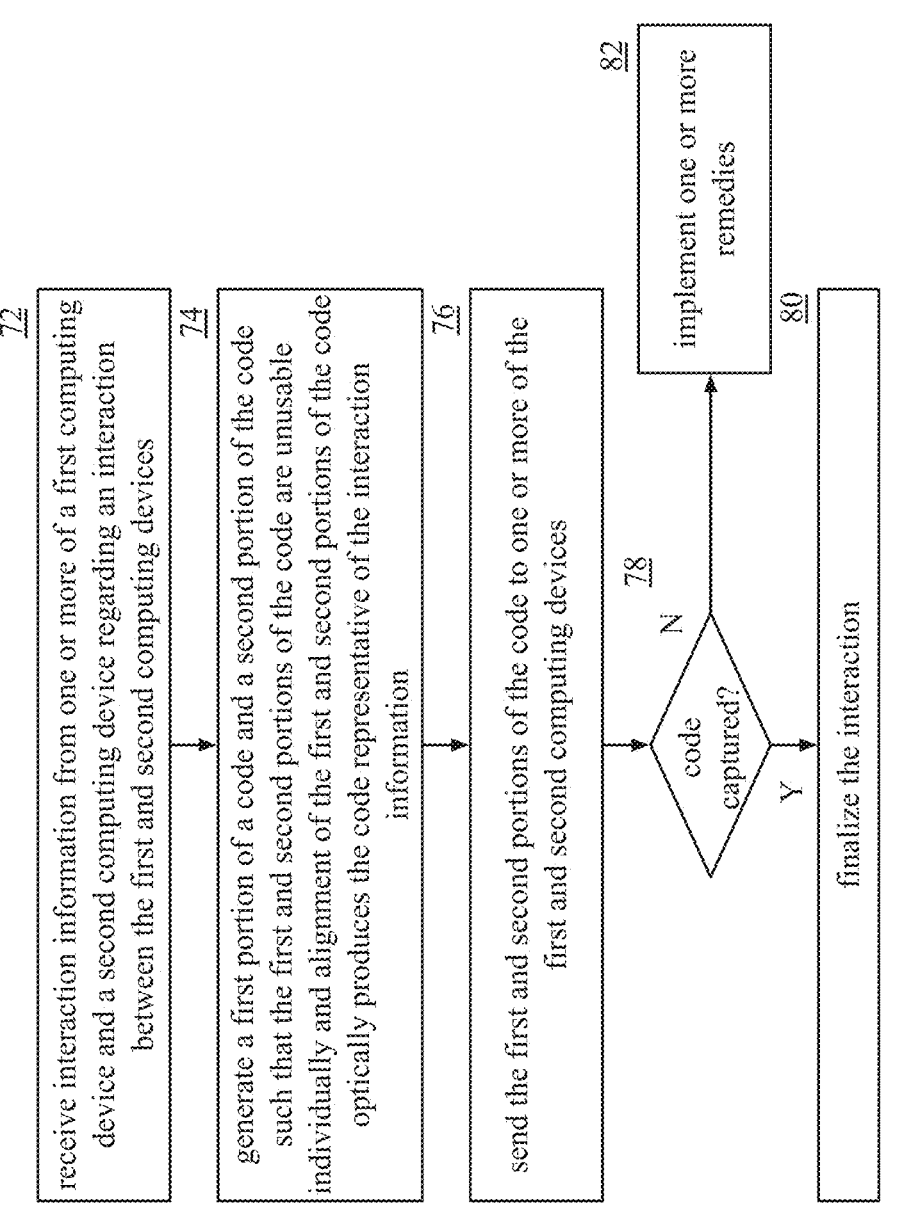

72   receive interaction information from one or more of a first computing device and a second computing device regarding an interaction between the first and second computing devices 74   generate a first portion of a code and a second portion of the code such that the first and second portions of the code are unusable individually and alignment of the first and second portions of the code optically produces the code representative of the interaction information 76   send the first and second portions of the code to one or more of the first and second computing devices 78   code captured?

N

Y 82   implement one or more remedies 80   finalize the interaction

FIG. 7

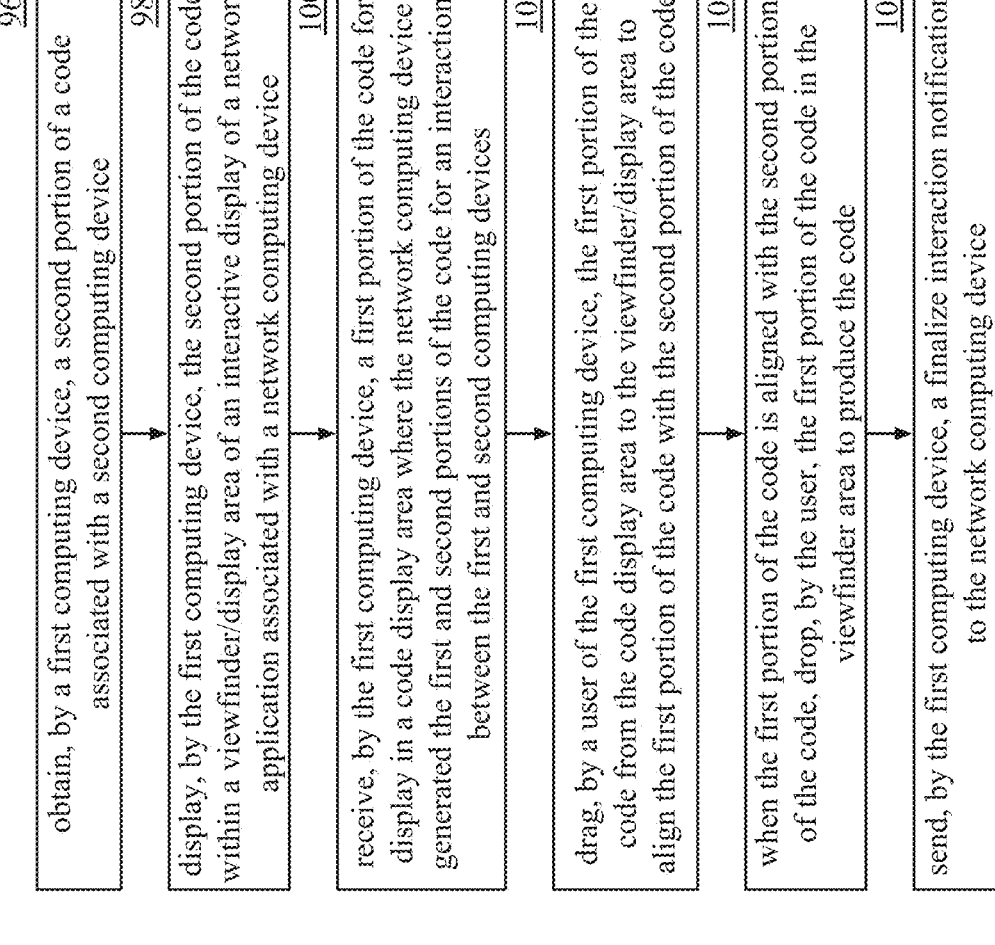

96 obtain, by a first computing device, a second portion of a code associated with a second computing device

98 display, by the first computing device, the second portion of the code within a viewfinder/display area of an interactive display of a network application associated with a network computing device

100 receive, by the first computing device, a first portion of the code for display in a code display area where the network computing device generated the first and second portions of the code for an interaction between the first and second computing devices

102 drag, by a user of the first computing device, the first portion of the code from the code display area to the viewfinder/display area to align the first portion of the code with the second portion of the code

104 when the first portion of the code is aligned with the second portion of the code, drop, by the user, the first portion of the code in the viewfinder area to produce the code

106 send, by the first computing device, a finalize interaction notification to the network computing device

FIG. 12

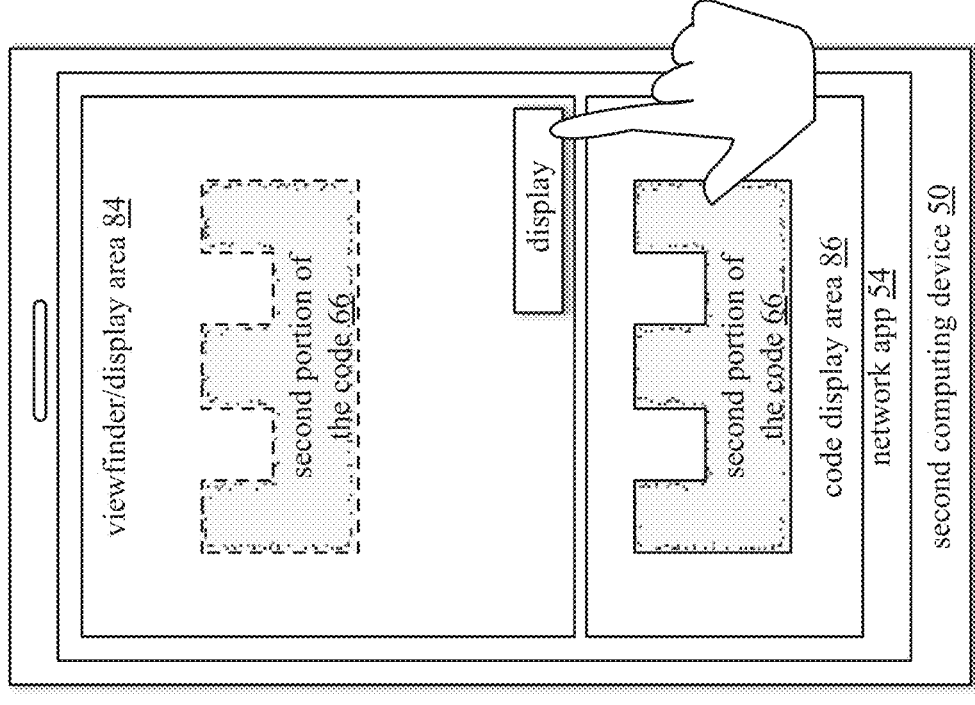
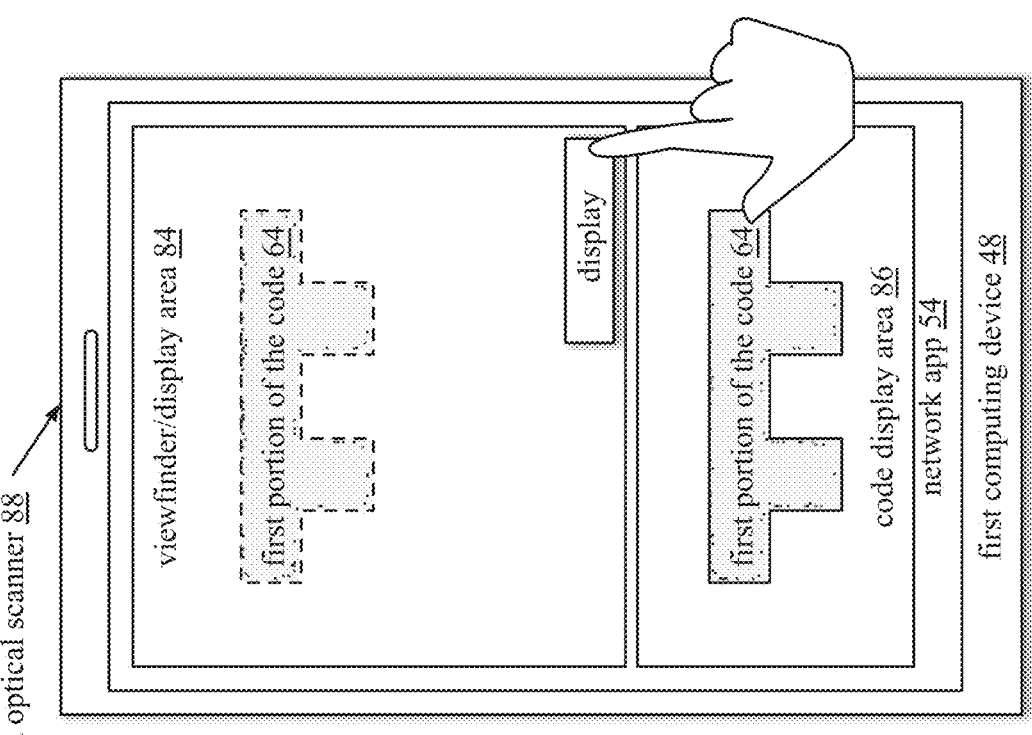
FIG. 13A

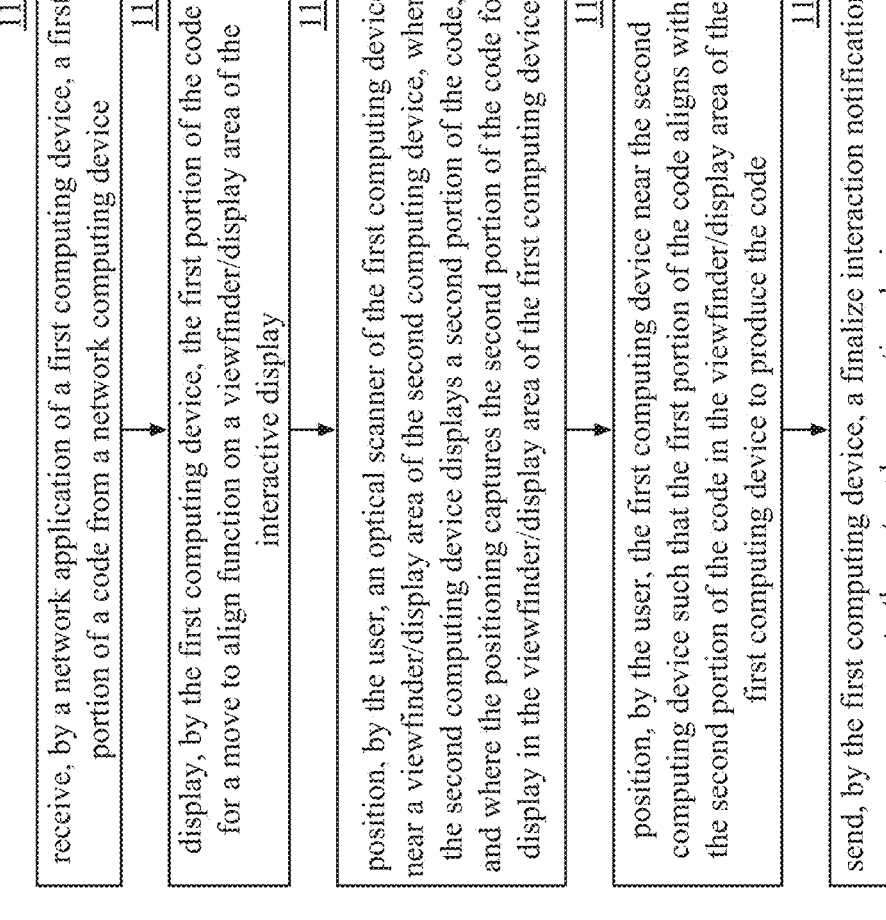

110 receive, by a network application of a first computing device, a first portion of a code from a network computing device

112 display, by the first computing device, the first portion of the code for a move to align function on a viewfinder/display area of the interactive display

114 position, by the user, an optical scanner of the first computing device near a viewfinder/display area of the second computing device, where the second computing device displays a second portion of the code, and where the positioning captures the second portion of the code for display in the viewfinder/display area of the first computing device

116 position, by the user, the first computing device near the second computing device such that the first portion of the code aligns with the second portion of the code in the viewfinder/display area of the first computing device to produce the code

118 send, by the first computing device, a finalize interaction notification to the network computing device

FIG. 15

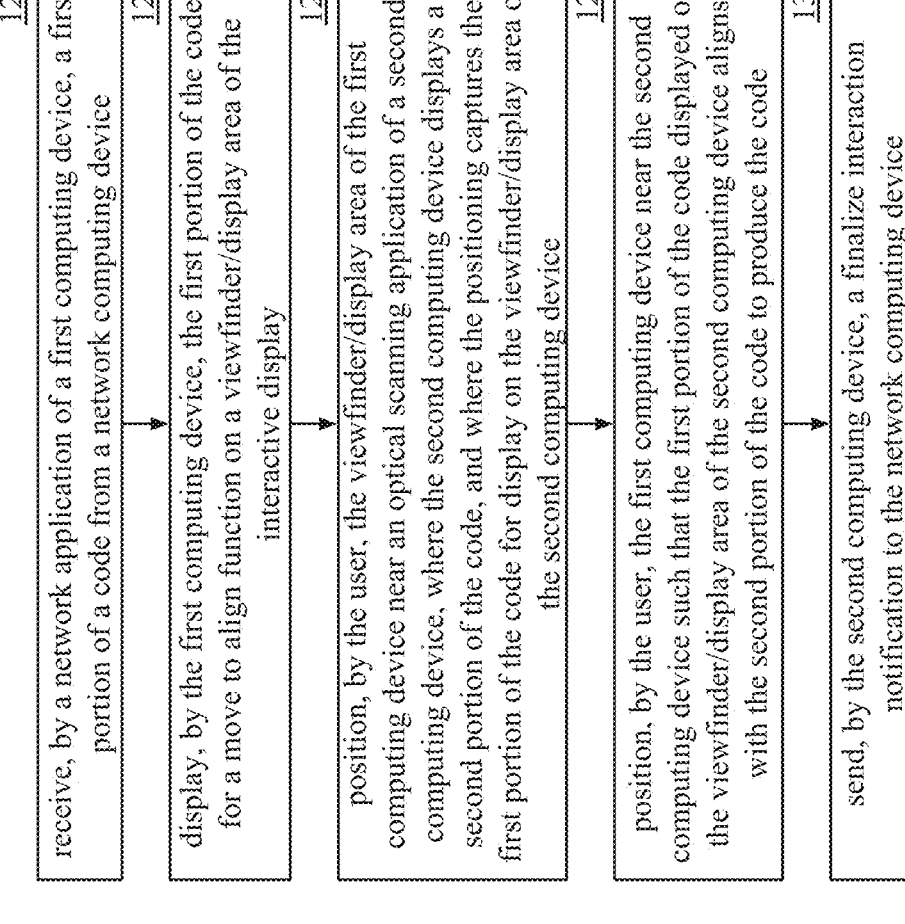

122 receive, by a network application of a first computing device, a first portion of a code from a network computing device

124 display, by the first computing device, the first portion of the code for a move to align function on a viewfinder/display area of the interactive display

126 position, by the user, the viewfinder/display area of the first computing device near an optical scanning application of a second computing device, where the second computing device displays a second portion of the code, and where the positioning captures the first portion of the code for display on the viewfinder/display area of the second computing device

128 position, by the user, the first computing device near the second computing device such that the first portion of the code displayed on the viewfinder/display area of the second computing device aligns with the second portion of the code to produce the code

130 send, by the second computing device, a finalize interaction notification to the network computing device

FIG. 18

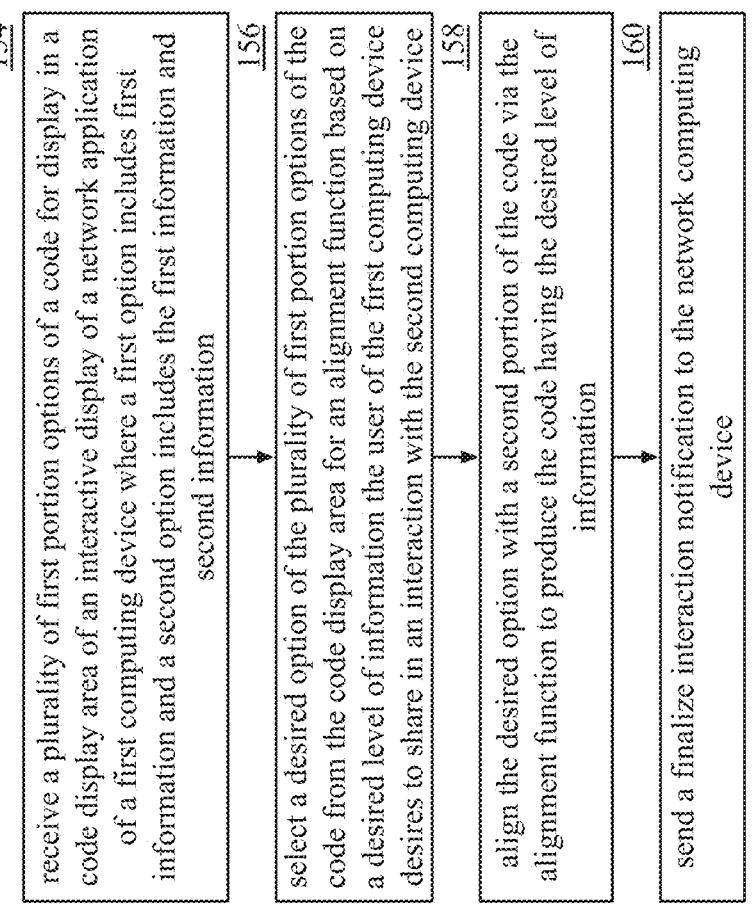

154 receive a plurality of first portion options of a code for display in a code display area of an interactive display of a network application of a first computing device where a first option includes first information and a second option includes the first information and second information

156 select a desired option of the plurality of first portion options of the code from the code display area for an alignment function based on a desired level of information the user of the first computing device desires to share in an interaction with the second computing device

158 align the desired option with a second portion of the code via the alignment function to produce the code having the desired level of information

160 send a finalize interaction notification to the network computing device

FIG. 23 multi-source multi-part code system 162

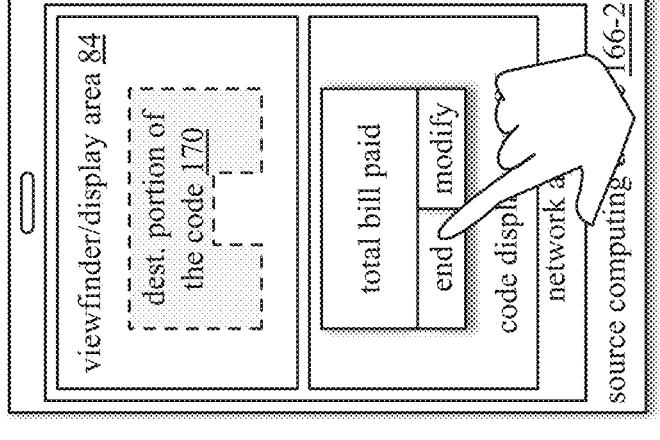
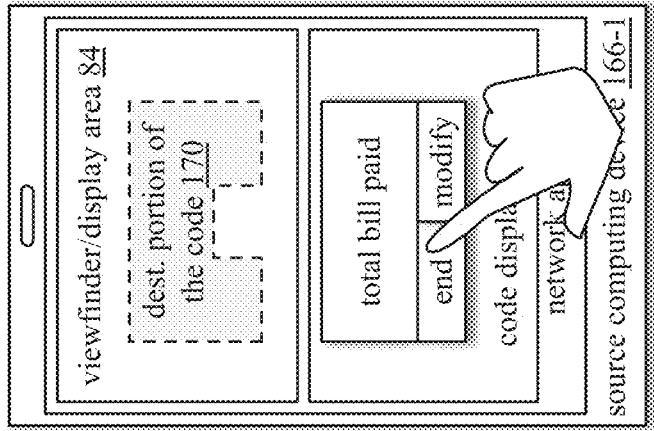
FIG. 25E

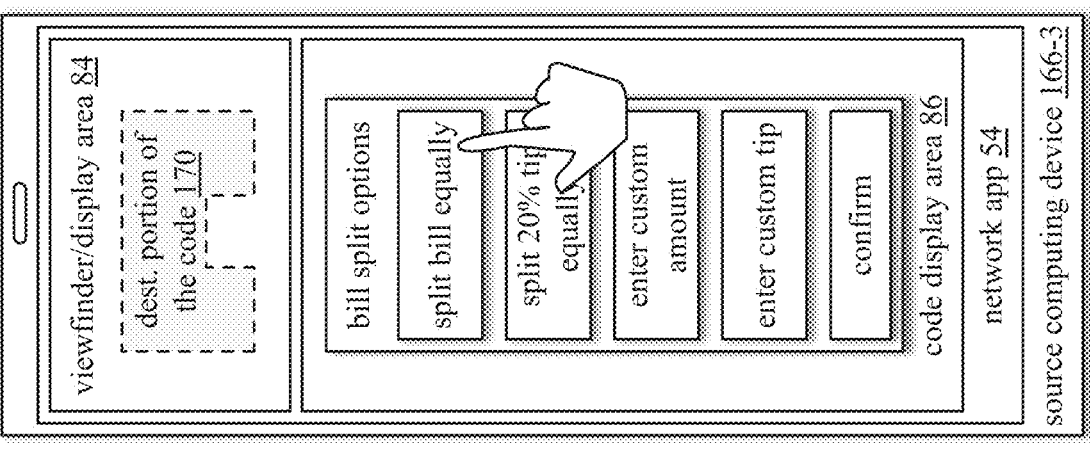
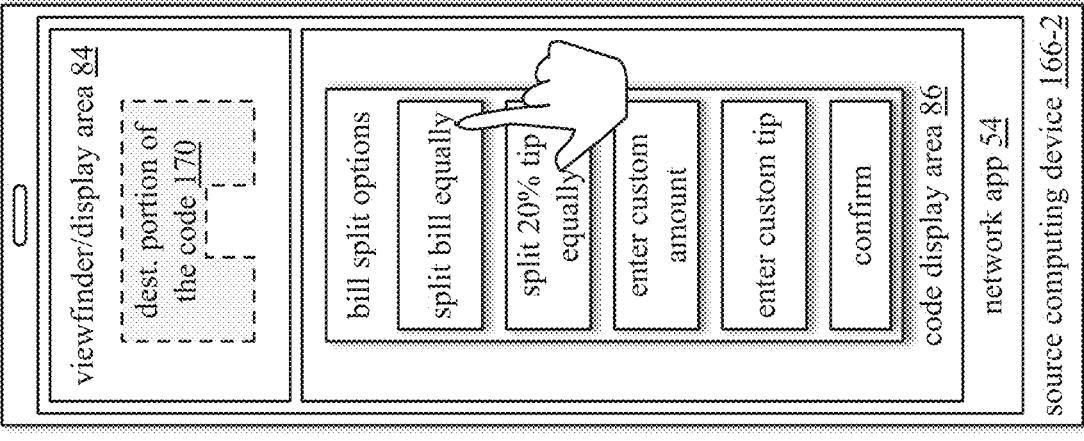
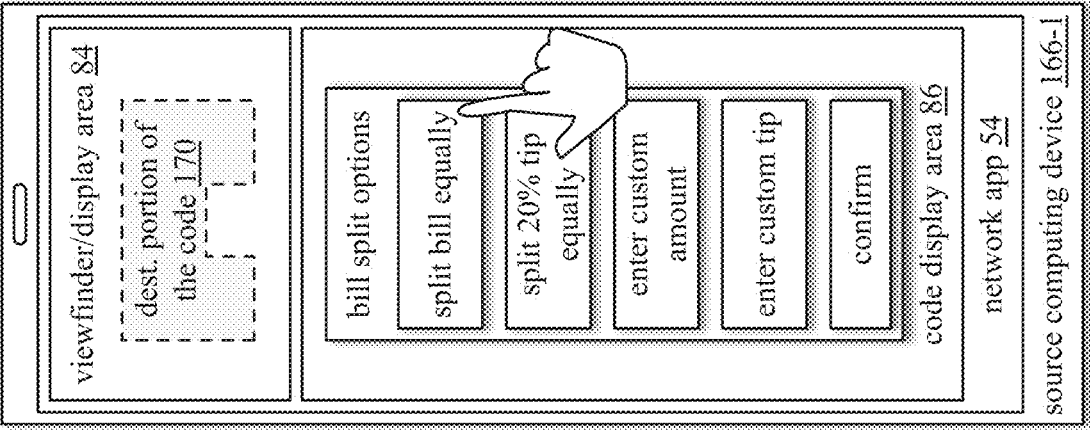
FIG. 26B

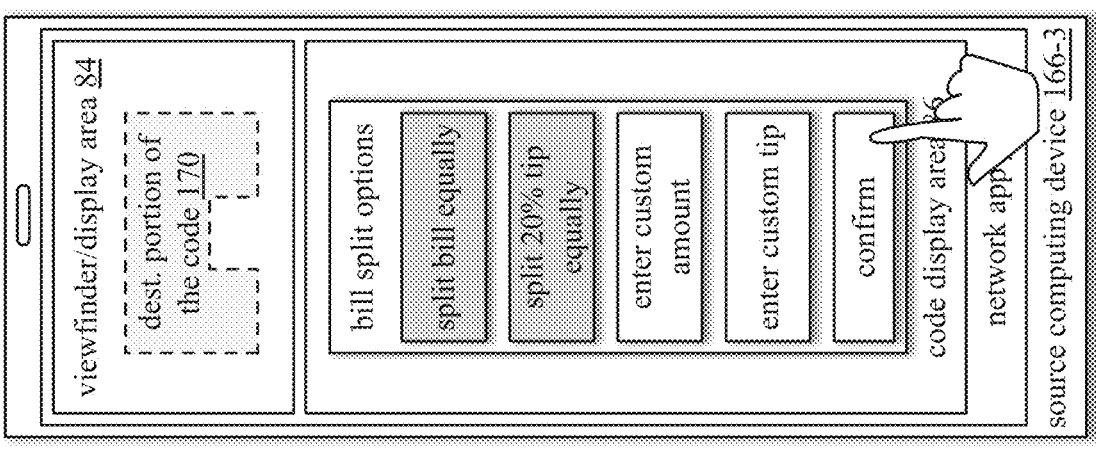
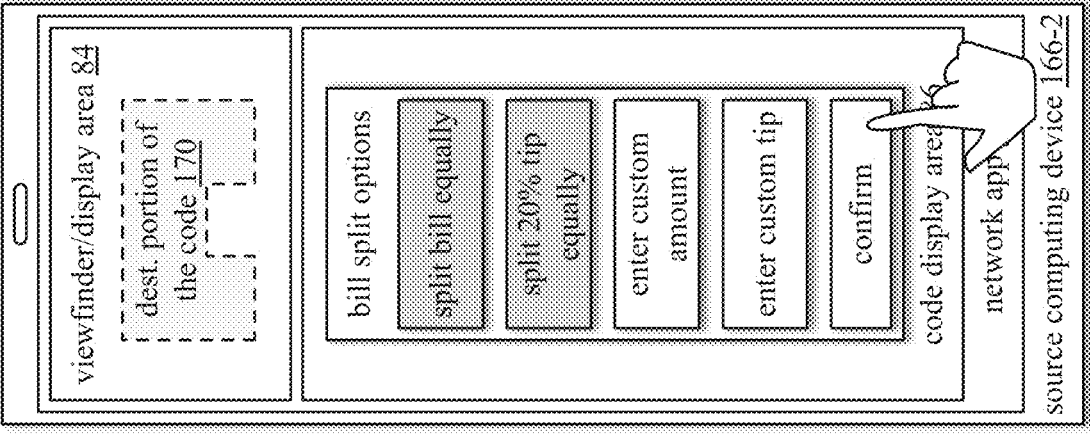
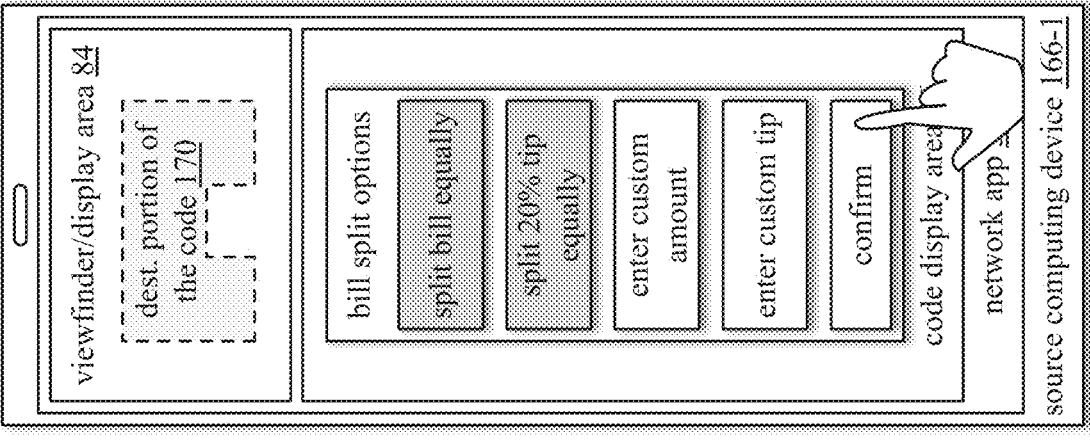
FIG. 26C

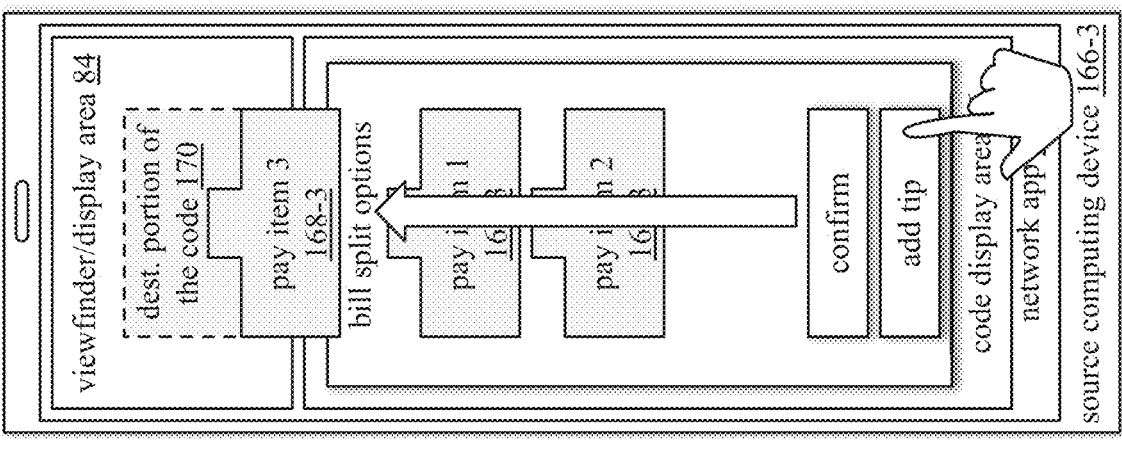
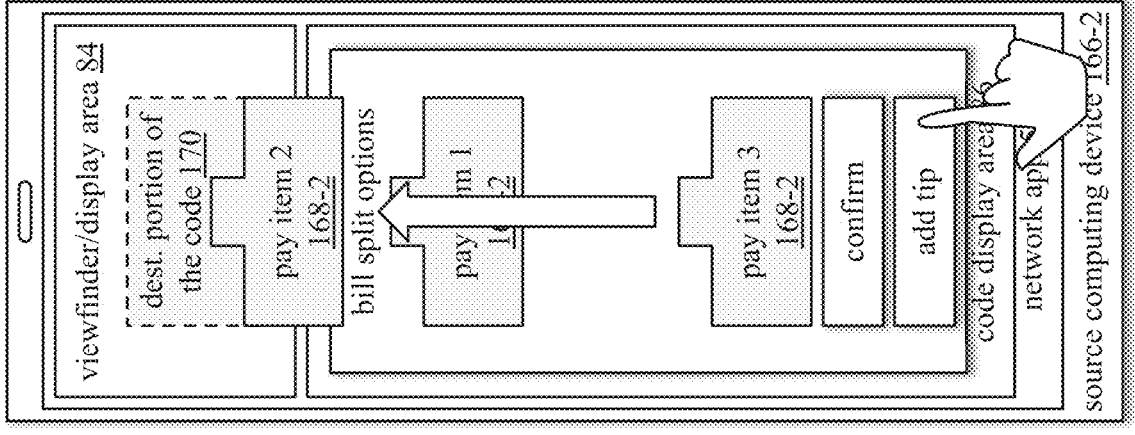
FIG. 27A
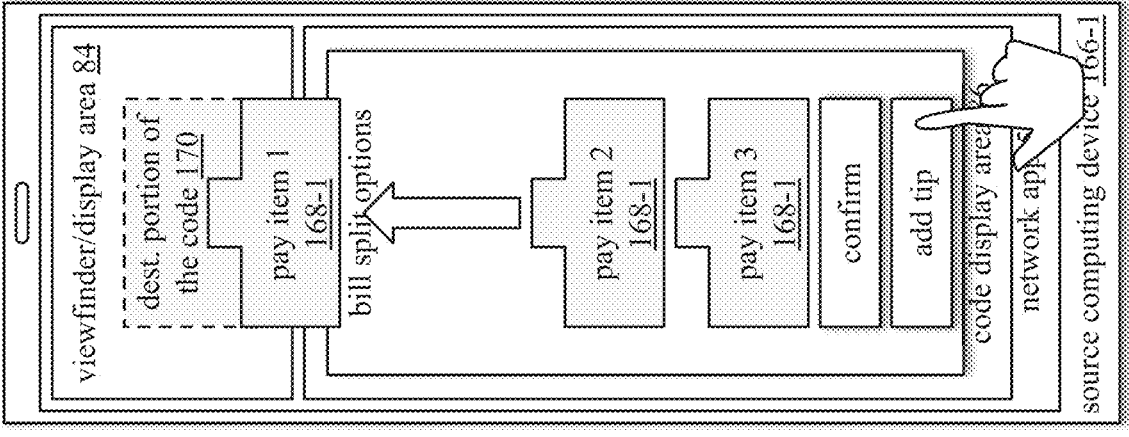

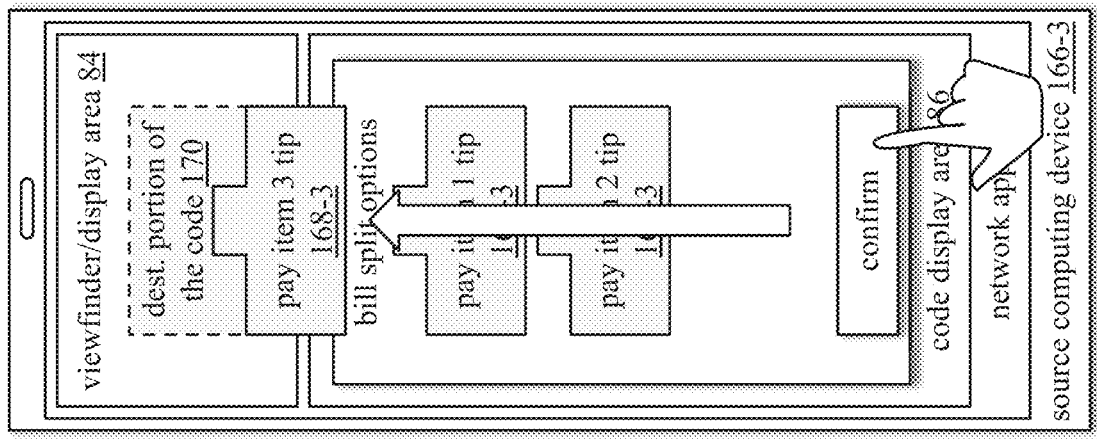
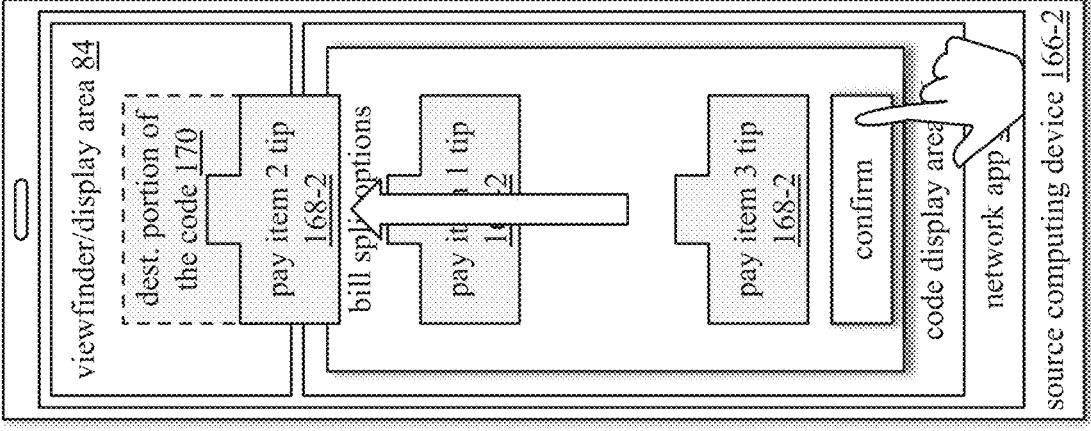
FIG. 27B
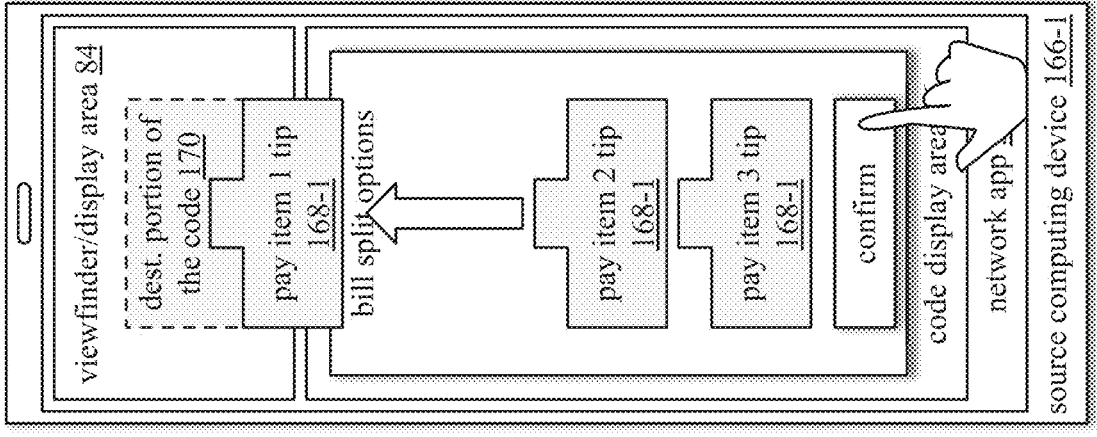

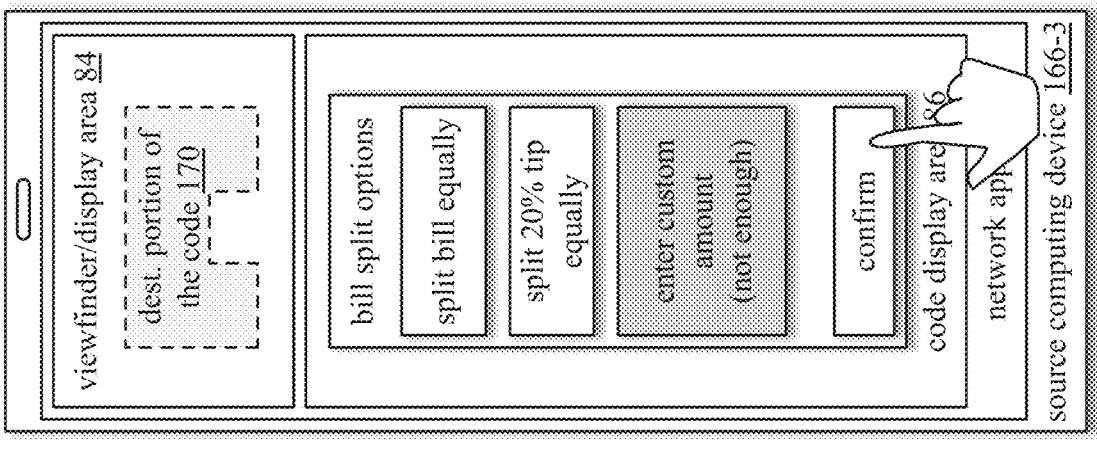
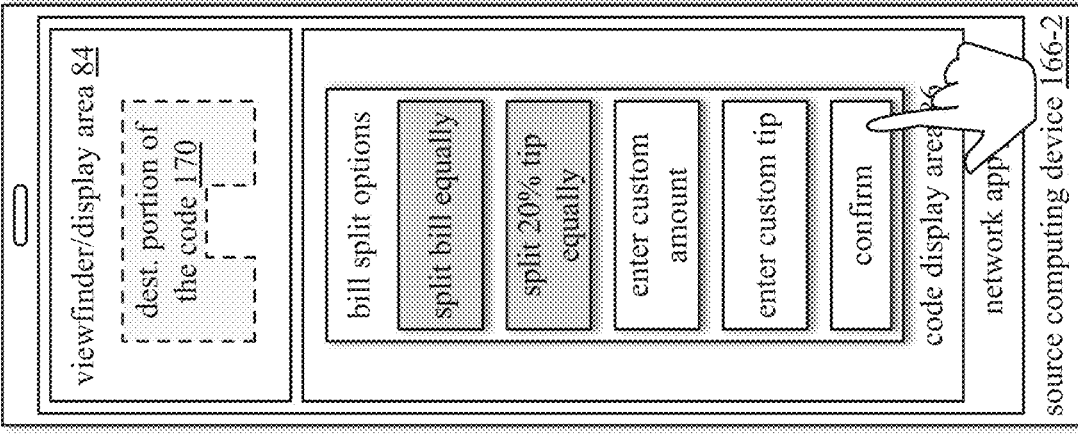
FIG. 28B
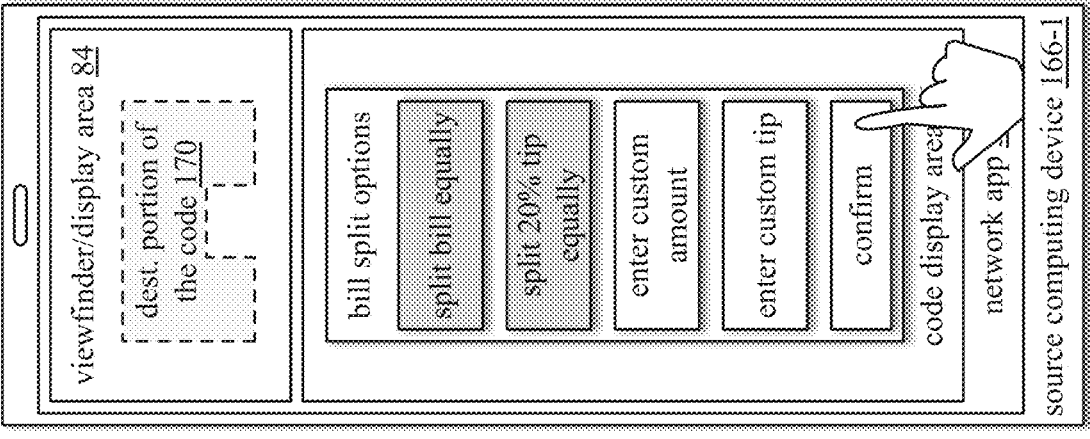

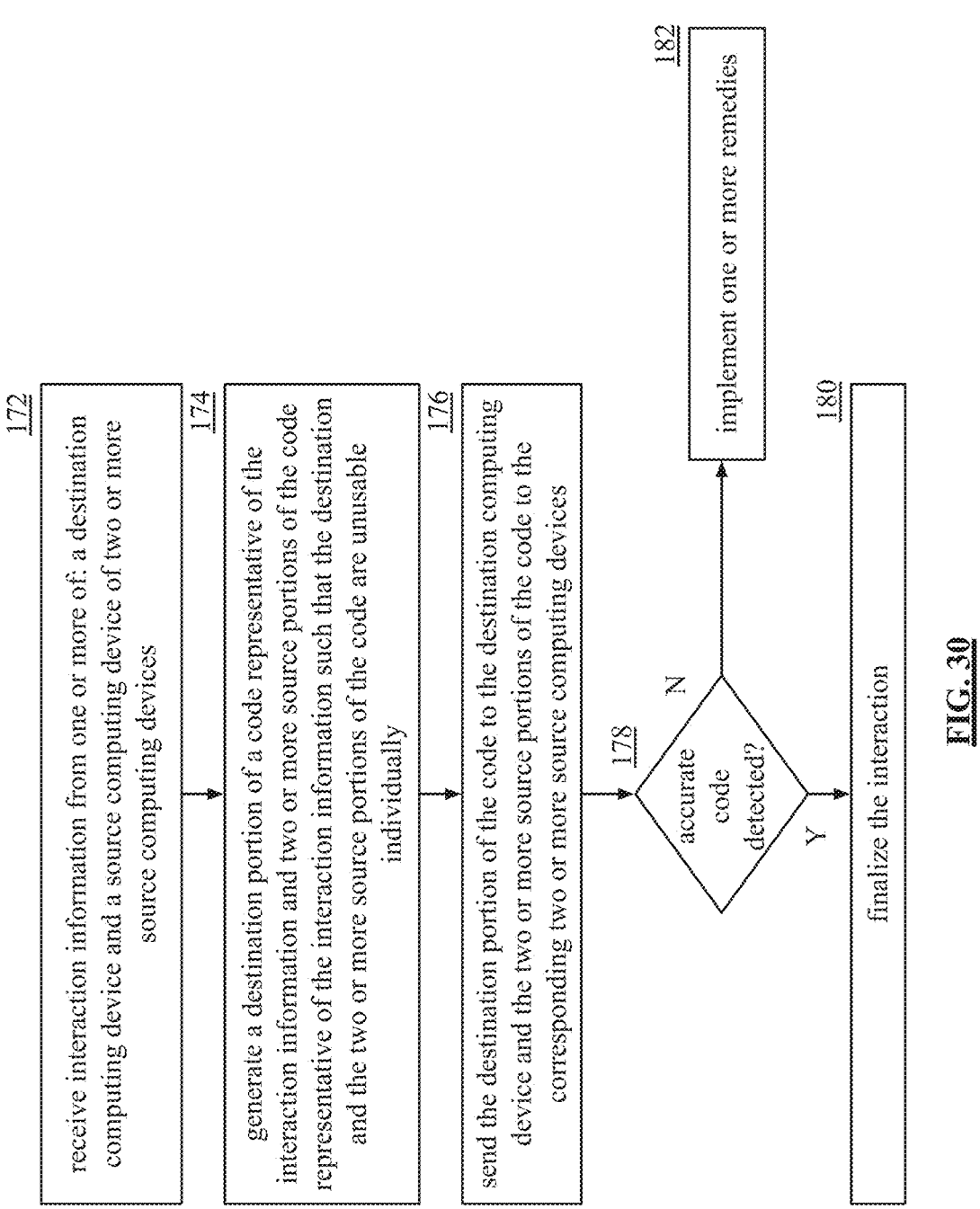

<u>172</u> receive interaction information from one or more of: a destination computing device and a source computing device of two or more source computing devices <u>174</u> generate a destination portion of a code representative of the interaction information and two or more source portions of the code representative of the interaction information such that the destination and the two or more source portions of the code are unusable individually <u>176</u> send the destination portion of the code to the destination computing device and the two or more source portions of the code to the corresponding two or more source computing devices <u>178</u> accurate code detected?

N

<u>182</u> implement one or more remedies

Y

<u>180</u> finalize the interaction

FIG. 30

MULTI-PART CODE SYSTEM

CROSS-REFERENCE TO RELATED APPLICATIONS

The present U.S. Utility Patent Application claims priority pursuant to 35 U.S.C. § 120 as a continuation of U.S. Utility application Ser. No. 18/214,319, entitled "MULTI-PART CODE SYSTEM", filed Jun. 26, 2023, which is a continuation of U.S. Utility application Ser. No. 17/378,433, entitled "DRAG AND DROP ALIGNMENT FUNCTION OF A MULTI-PART CODE SYSTEM", filed Jul. 16, 2021, issued as U.S. Pat. No. 11,694,049 on Jul. 4, 2023, which is a continuation of U.S. Utility application Ser. No. 16/871, 689, entitled "MULTI-PART CODE SYSTEM", filed May 11, 2020, issued as U.S. Pat. No. 11,194,981 on Dec. 7, 2021, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to code generation for data exchange and more particularly to a multi-part code system for an interaction where portions of the multi-part code are unusable individually.

Description of Related Art

A code converts information from one format into another format or representation. The process of encoding converts information into symbols for communication or storage. Encryption is a type of security that converts data, programs, images, or other information into unreadable cypher. Encryption keys are typically random strings of bits generated using algorithms to ensure each key is unique and unpredictable. Encryption keys are used to encrypt, decrypt, or carry out both functions based on the type of encryption software used. For example, asymmetric encryption uses an encryption key pair consisting of a public encryption key to encrypt data and a private encryption key to decrypt data. A passphrase is generally required to use the private encryption key.

Graphical coded representations of data are used to convey data via optical scanning technology. Optical scanning technology uses light or camera imaging to detect graphical coded representations of data. Optical scanning technology often includes decoder circuitry to decode the graphical coded representations of data and send the decoded data to an output port or to additional processing circuitry. A barcode is a type of graphical coded representation of data. Linear or one-dimensional (1D) barcodes consist of parallel lines and spaces of varying widths to represent text information.

Two-dimensional (2D) barcodes consist of horizontal and vertical patterns and can include more information than 1D barcodes such as price, quantity, web address, image, etc. A quick response (QR) code is a type of 2D barcode used in many applications. For example, a consumer generates a QR code in order to complete an in-store purchase where the QR code contains the consumer's payment information (e.g., a pre-paid account, debit or credit account, etc.). Temporary QR codes can be used for one-time verification codes or other time varying data. As another example, QR codes can provide marketing information for a product such as a website link. As another example, QR codes are used in sending and receiving various cryptocurrencies.

Optically scannable codes such as QR codes can hold sensitive consumer data such as payment information and personal account data making them vulnerable to theft and fraud. For example, a data thief can upload a screen shot of a QR code from an airline boarding pass to an online QR code reader and obtain personal information such as frequent flier number, loyalty program information, flight confirmation number, personal data associated with airline account, etc. Further, codes associated with event tickets can be reproduced and resold many times over.

To prevent fraud associated with optically scanned codes, a code can be tied to a specific user via a device, encrypted, and/or refreshed every few seconds. Further, facial recognition and blockchain technology assist in linking a code to the right user and maintaining secure chain of custody of the code.

BRIEF DESCRIPTION OF THE SEVERAL VIEWS OF THE DRAWING(S)

FIGS. 1A-1C are schematic block diagrams of an example of a one-dimensional barcode;

FIGS. 4A-4D are examples of multi-part codes where the individual portions do not contain meaningful data;

FIGS. 5A-5D are examples of multi-part codes where the individual portions include unreadable data in accordance with the present invention;

FIG. 7 is a flowchart of an example of a method for execution by a network computing device of a multi-part code system in accordance with the present invention;

FIG. 12 is a flowchart of an example of a method for a drag and drop alignment function of a multi-part code system in accordance with the present invention;

FIGS. 13A-13B are schematic block diagrams of an example of a move to align function of a multi-part code system in accordance with the present invention;

FIG. 15 is a flowchart of an example of a method for a move to align function of a multi-part code system in accordance with the present invention;

FIG. 18 is a flowchart of an example of a method for a move to align function of a multi-part code system in accordance with the present invention;

FIG. 23 is a flowchart of an example of a method of selecting a code portion option of a plurality of code portion options for an interaction in accordance with the present invention;

FIGS. 25A-25E are schematic block diagrams of an embodiment of a multi-source multi-part code system in accordance with the present invention;

FIGS. 26A-26D are schematic block diagrams of an example of bill splitting options of a multi-source multi-part code system in accordance with the present invention;

FIGS. 27A-27B are schematic block diagrams of an example of bill splitting options of a multi-source multi-part code system in accordance with the present invention;

FIGS. 28A-28B are schematic block diagrams of examples of bill splitting errors of a multi-source multi-part code system in accordance with the present invention;

FIG. 30 is a flowchart of an example of a method for execution by a network computing device of a multi-source multi-part code in accordance with the present invention.

Figures 2A, 2B, 2C, 2D:
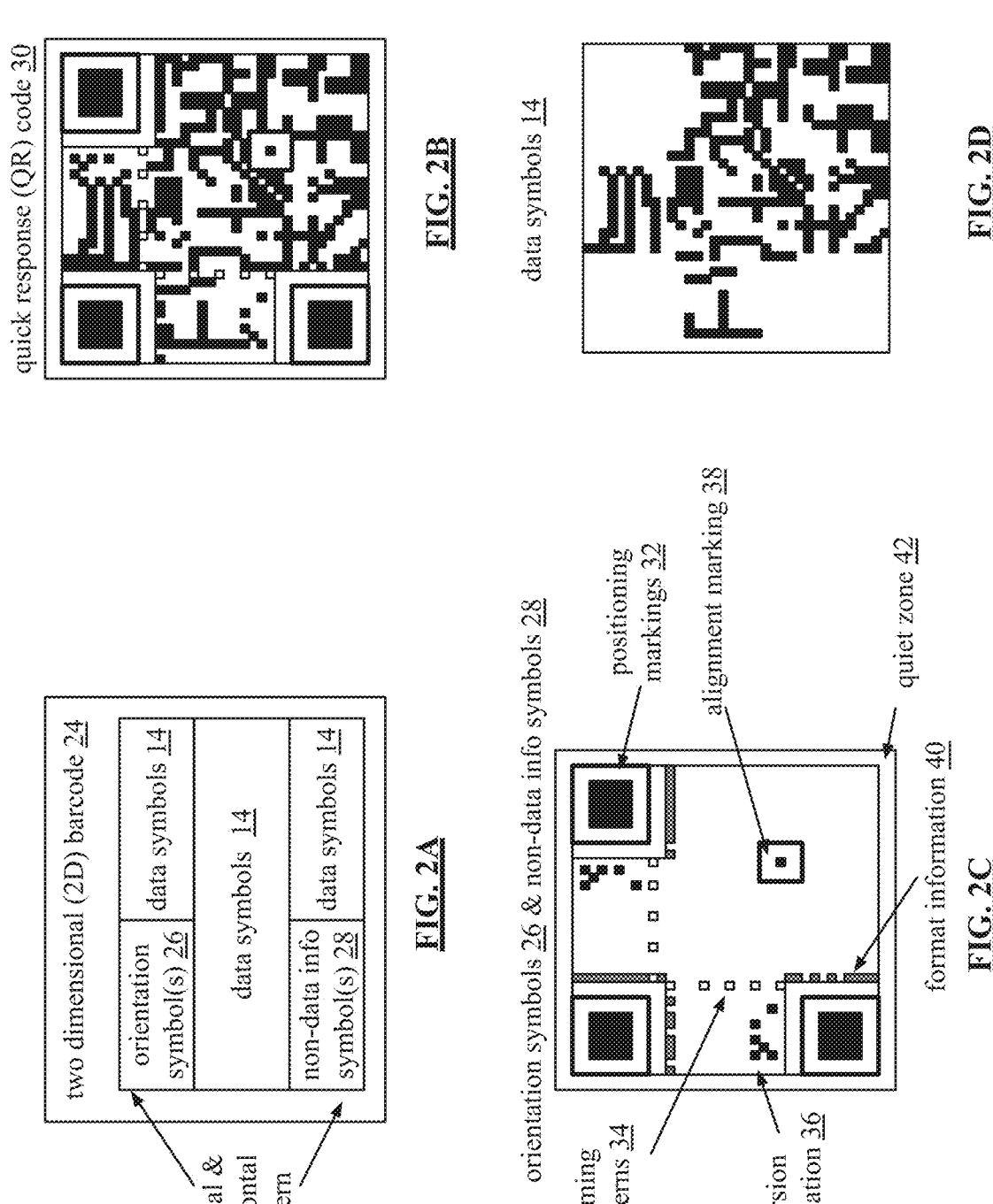
FIGS. 2A-2D are schematic block diagrams of an example of a two-dimensional barcode.

DETAILED DESCRIPTION OF THE
INVENTION

FIGS. 1A-1C are schematic block diagrams of an example of a one-dimensional barcode 10. Linear or one-dimensional (1D) barcodes consist of parallel lines and spaces of varying widths to represent text information (e.g., numerical digits, characters, etc.). As shown in FIG. 1A, a typical 1D barcode 10 includes a start symbol 12 followed by data symbols 14 and ending with a stop symbol 16. The symbols 12-16 consist of parallel lines ("bars") and spaces 18. A barcode reader reads a 1D barcode 10 horizontally and identifies when to read the data symbols 14 based on the location of the start and stop symbols 12 and 16.

FIGS. 1B-1C are examples of a universal product code-A (UPC-A) barcode 20. A UPC-A barcode 20 is a 1D barcode that represents a 12-digit number. Each digit is represented by a unique pattern of two bars and two spaces of variable width. The width variations include 1, 2, 3, and 4 modules wide and each digit include seven total modules. In FIG. 1B, the UPC-A code 20 includes a start symbol(S), six left digits (L), a middle symbol (M), six right digits (R), and an end symbol (E). Each digit and symbol includes a pattern of bars and spaces 18. The start(S), middle (M), and end (E) are guard patterns that are the same on every UPC-A code. The "L" and "R" sections represent the 12-digit code and the guard patterns separate the two groups and establish timing. The first "L" digit indicates a first number system to be used by the following digits. The last "R" digit is an error detecting check digit.

FIG. 1C includes an example encoding table 22 for the UPC-A barcode 20 of FIG. 1B. The black parallel lines are bars and the white parallel lines are spaces. The quiet zones are blank spaces to help separate the code from its surroundings. The "L" section digits have odd parity (e.g., the total bar width is an odd number of modules) and the "R" section digits have even parity (e.g., the total space width is an odd number of modules).

For example, a zero in the left section is represented by a three module-width space, a two module-width bar, a one module-width space, and a one module bar (i.e., four module total space width and three module total bar width). A zero in the right section has a three module-width bar, a two module-width space, a one module-width bar, and a one module space (i.e., three module total space width and four module total bar width). A UPC barcode scanner determines whether it is scanning from left-to-right or right-to-left (i.e., upside down) based on the difference in parity of the sections.

FIGS. 2A-2D are schematic block diagrams of an example of a two-dimensional barcode 24. As shown in FIG. 2A, a two-dimensional (2D) barcode 24 includes encoded information based on a vertical and horizontal arrangement of a pattern (dots, pixels, bars, honeycomb structures, multi-row barcodes, etc.) allowing it to include more information than a 1D barcode such as price, quantity, web address, image, etc. The horizontal and vertical arrangement of the pattern includes data symbols 14 which represent actual data and error correction keys, orientation symbol(s) 26, and a variety of non-data information symbols 28 (e.g., version information, formatting information, etc.).

FIGS. 2B-2D are examples of a quick response (QR) code 30. A QR code 30 is a type of 2D barcode used in many applications. FIG. 2B shows a complete QR code 30 and FIGS. 2C-2D show incomplete versions of the QR code 30 in order to highlight its different components. FIG. 2C includes the orientation symbol(s) 26 and the non-data information symbols 28 of the QR code 30.

The orientation symbol(s) 26 and the non-data information symbols 28 of the QR code 30 includes positioning markings 32, timing patterns 34, version information 36, an alignment marking 38, format information 40, and a quiet zone 42. The positioning markings 32 (in three corners) indicate the direction in which the code is printed. The timing patterns 34 (shown as white squares) help the scanner determine how large the QR code is.

The version information 36 (shown as a collection of black squares) specifies the QR version used (e.g., there are more than 40 different QR versions). The alignment marking 38 provides additional orientation information for the scanner. The alignment marking 38 is helpful when scanning large QR codes. The format information 40 (shown as dark gray markings) includes information about fault tolerance and data mask pattern. The quiet zone 42 is a blank border that distinguishes the QR code from its surroundings.

FIG. 2D shows the remainder of the QR code pattern not included in FIG. 2C which includes the data symbols 14. The data symbols 14 are encoded data representing actual data and error correction keys. The data symbols 14 represent up to 7089 digits or 4296 characters including special characters. The data symbols 14 include redundancies so that up to 30% of a QR code can by destroyed and still be readable.

Figure 3:
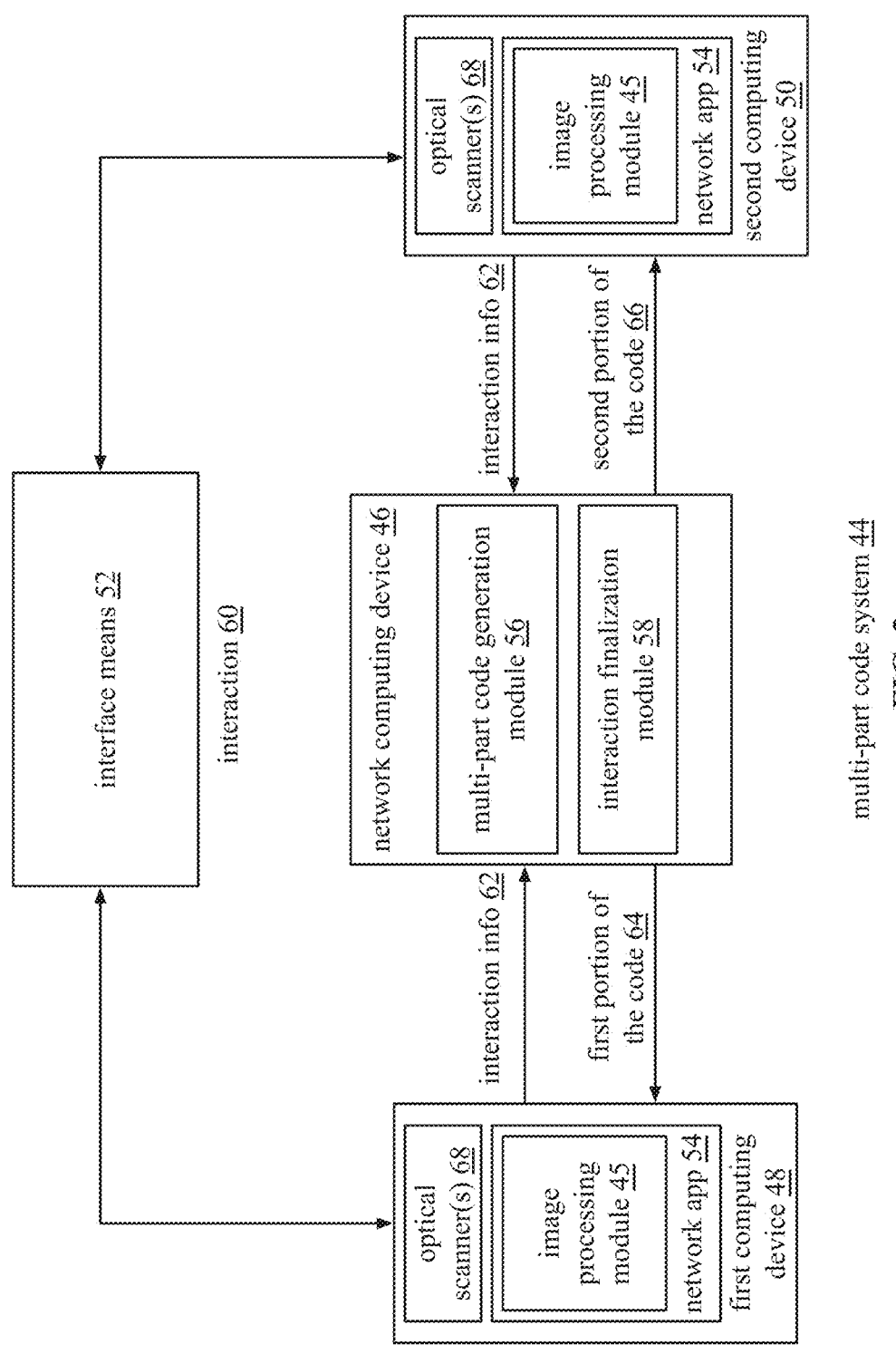
FIG. 3 is a schematic block diagram of an embodiment of a multi-part code system in accordance with the present invention.

FIG. 3 is a schematic block diagram of an embodiment of a multi-part code system 44 that includes a network computing device 46, a first computing device 48, a second computing device 50, and an interface means 52. The multi-part code system 44 facilitates the use of multi-part code to complete an interaction 60 between two or more parties.

The multi-part code is any type of optically readable code consisting of at least two portions that are unusable individually. Unusable means the portions cannot be optically read by an optical reader/scanner or the information obtained from an optical reader is incomplete and/or contains no meaningful information. An optically readable code includes one or more of a one-dimensional (1D) barcode, a two-dimensional (2D) barcode, a numerical code, an alphanumeric code, an image, and any graphical pattern representative of data such that optically scanning, decoding, and processing the optically readable code yields information.

The network computing device 46, the first computing device 48, and the second computing device 50 may be portable computing devices and/or a fixed computing devices. A portable computing device may be a social networking device, a gaming device, a cell phone, a smart phone, a digital assistant, a digital music player, a digital video player, a laptop computer, a handheld computer, a tablet, a video game controller, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., cash register), and/or any type of home or office computing equipment.

The first computing device 48 and the second computing device 50 include one or more optical scanners 68 that are operable to optically scan/detect/read graphically coded representations of data and/or image data. The optical scanners 68 use light and/or camera imaging to detect graphical coded representations of data. The optical scanners 68 may include one or more of a pen-type reader, a laser scanner, an omni-directional barcode scanner, a charge-coupled device (CCD) reader, a camera based reader, and a large field-of-view reader.

A pen-type reader consists of a light source and a photodiode placed next to each other in the tip of a pen-like device. To read a code, the pen is moved across the code so that the photodiode measures the intensity of light reflected back from the light source as the tip crosses the coded information. For example, with a barcode, dark bars absorb light and white spaces reflect light. The photodiode generates a waveform (e.g., a voltage waveform) as a representation of the bar and space pattern.

A laser scanner works similarly to a pen-type reader except that it uses a laser beam as the light source and typically uses either a reciprocating mirror or a rotating prism to scan the laser back and forth across a code. A photodiode is used to measure the light intensity reflected from the code and generate a waveform representative of the pattern. Omnidirectional code scanners use a series of straight or curved scanning lines (e.g., lasers) of varying directions to project on an image such that all areas of the image will be scanned regardless of the orientation or angle.

A CCD reader (or a light emitting diode (LED) scanner) uses an array of hundreds of small light sensors lined in a row at the head of the reader. In contrast to the pen and laser scanners, each sensor measures emitted ambient light from the code to generate a digital image of the graphical code.

Camera-based readers use image processing and decoding algorithms to locate a graphical code within a captured image and decode the information in the detected code. As an example, many smartphones include code scanning applications that rely on the smartphone's camera to capture images of the graphical code. Auto-focus technology assists in the accuracy of smartphone camera optical scanning.

Video camera readers use small video cameras to implement the same CCD technology as a CCD reader except the video camera has hundreds of rows of sensors arranged in a two dimensional area to generate an image. Large field of view readers use high resolution industrial cameras to capture multiple codes simultaneously. All the codes that appear in an image are decoded instantly or by the use of plugins.

The first computing device 48 and the second computing device 50 include a network application ("app") 54 that associates the respective devices to the network computing device 46. The network computing device 46 includes a multi-part code generation module 56 and an interaction finalization module 58. The network application 54 includes an image processing module 45 that includes image processing and encoding/decoding circuitry to analyze optically scanned (e.g., via optical scanner(s) 68), saved (e.g., a screenshot of a code, a code stored in a memory) or otherwise detected image data such as graphical coded representations of data.

The first computing device 48 and the second computing device 50 engage in an interaction 60 via an interface means 52. The interaction 60 is an exchange of data. For example, the interaction 60 is a digital payment transaction between the first and second computing devices 48-50. As another example, the interaction 60 an agreement (e.g., signing a contract) between the first and second computing devices 48-50. As another example, the interaction 60 is an identity verification between the first and second computing devices 48-50 (e.g., a security check point interaction). As another example, the interaction 60 is a ticket verification between the first and second computing devices 48-50 for entry into an event. As another example, the interaction 60 is sharing confidential information between the first and second computing devices 48-50.

The interface means 52 includes one or more of: the optical scanner(s) 68 of one or more of the first or second computing device, a direct link (e.g., near-field communication (NFC)), and a network connection. The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

As an example, the first computing device 48 is a smartphone, the second computing device 50 is a fixed merchant POS device (e.g., a POS register) and the interface means 52 is the fixed merchant POS device's optical scanner 68. As another example, the first computing device 48 is a smartphone, the second computing device 50 is a fixed merchant POS device (e.g., a POS register) and the interface means 52 is the first computing device 48's optical scanner 68 in the form of a smartphone camera.

As another example, the first computing device 48 is a smartphone, the second computing device 50 is an e-commerce platform, and the interface means 52 is a network connection. For example, a smartphone uses an internet browser application (via cellular or wireless internet connection) to access the e-commerce platform. As another example, the first computing device 48 is a smartphone, the second computing device 50 is a smartphone, and the interface means 52 is a Bluetooth connection.

In an example of operation, the network computing device 46 receives interaction information ("info") 62 from one or more of the first and second computing devices 48-50. The interaction information 62 is regarding an interaction 60 between the first and second computing devices 48-50. Interaction information 62 includes one or more of a first computing device identifier (ID), a second computing device identifier (ID), a payment amount, a data file, a signature page, event information, a desired payment method, payment account information, discount information, promotion information, loyalty account information, and personal information (e.g., email, phone number, address, social security number, etc.).

As an example, the interaction 60 is a digital payment transaction from the first computing device 48 to the second computing device 50. The first computing device 48 sends the network computing device 46 interaction information 62 (e.g., via the network app 54 where the network app 54 is a digital wallet application downloaded on the first computing device 48) pertaining to the first computing device 48 and regarding the payment transaction such as a first computing device 48 identifier (ID), an amount of payment, a desired currency and/or payment method to use, customer loyalty information, a promo code, billing address, personal information, a data file, etc.

The second computing device 50 sends the network computing device 46 interaction information 62 (e.g., via the network app 54 where is the network app 54 is payment software associated with the network computing device 46 installed on the second computing device 50 (e.g., a POS device)) pertaining to the second computing device 50 and regarding the payment transaction such as a second computing device 50 identifier (e.g., a merchant ID), an amount of payment, a desired form of payment method, discounts offered, etc.

The multi-part code generation module 56 of the network computing device 46 generates a first portion of a code 64 and a second portion of the code 66 such that the first and second portions of the code 64-66 are unusable individually. Alignment of the first and second portions of the code 64-66 optically produces the code representative of the interaction information 62. The image processing module 45 of the network application 54 of one or more of the first and second computing devices 48-50 is operable to detect, capture, and process the optically produced code.

In this example, the network computing device 46 sends the first portion of the code 64 to the first computing device 48 and sends the second portion of the code 66 to the second computing device 50. The first and second portions of the code 64-66 must be aligned through an alignment function of the network application 54 (e.g., a manual action of one or more of the first and second computing devices 48-50) such that the full code is optically produced. With traditional optically readable codes, a code can be accidentally scanned or fraudulently reproduced. Requiring an alignment function to produce the full code shows user intent to complete the interaction 60 and reduces fraudulent use. Alignment functions are discussed in greater detail with reference to FIGS. 8A-18.

When the optically produced code has been captured (e.g., via the image processing module 45 of the network application 54), the network application 54 communicates with the interaction finalization module 58 of the network computing device 46 to finalize the interaction 60. For example, the captured and decoded full code contains information instructing the interaction finalization module 58 to transfer an amount of money from an account associated with the first computing device 48 to an account associated with the second computing device 50.

If the optically produced code has not been captured, (e.g., after an amount of time has passed before the alignment function is completed, through an error, etc.), the network computing device 46 may implement one or more remedies. For example, the network computing device 46 generates and delivers a new first and second portion of the code after a certain amount of time has lapsed before proper alignment (e.g., a new first and second portion of the code are generated and sent every 30 seconds to one minute prior to alignment).

As another example, the network computing device 46 notifies one or more of the first and second computing devices 48-50 regarding the alignment (e.g., a notification to retry alignment is sent, a query regarding whether to regenerate a new code is sent, a notification of an error pertaining to one or more of the first and second portions of the code is sent, etc.).

Figures 4C, 4D:
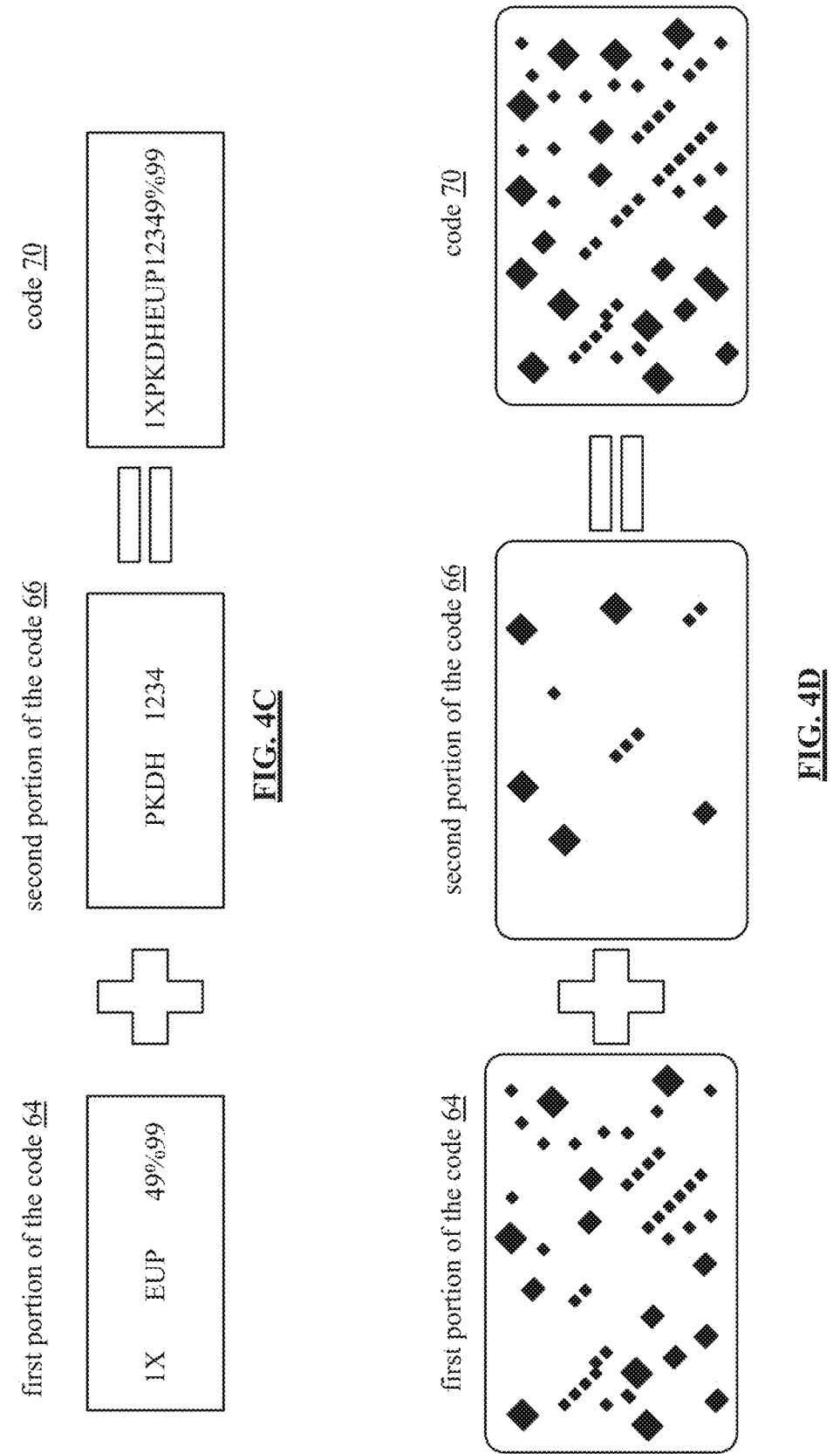

FIGS. 4A-4D are examples of multi-part codes where the individual portions do not contain meaningful data. FIG. 4A includes a multi-part code where a first portion of the code 64 and a second portion of the code 66 include incomplete data of a quick response (QR) code 30. While the portions can be read by a QR scanner (e.g., the orientation markings and non-data information is present in both portions), the actual data read holds no meaningful information. When the first and second portions of the code 64-66 are aligned (e.g., one placed on top of another), the full QR code 30 is produced and meaningful data can be read.

FIG. 4B includes a multi-part code where a first portion of the code 64 and a second portion of the code 66 include incomplete data of a UPC-A barcode 20. While the portions can be read by a barcode scanner (e.g., the barrier symbols are present), the actual data is incomplete and meaningless. When the first and second portions of the code 64-66 are aligned (e.g., one placed on top of another), the UPC-A barcode 20 is produced and the data can be optically read.

FIG. 4C includes a multi-part code where a first portion of the code 64 and a second portion of the code 66 include incomplete data of an alpha-numeric code such as an encryption key. The first and second portions of the code 64-66 do not include enough data for the code to have meaning according to the encryption key type used and the gaps in between the code may cause optical reading errors. When the first and second portions of the code 64-66 are aligned (e.g., one placed on top of another), the full alpha-numeric code 70 is produced and the data can be read accurately.

FIG. 4D is an example depicting that any graphical pattern can be used to represent data. The code 70 in FIG. 4D includes a first portion of the code 64 and a second portion of the code 66 that are each missing pieces of the full graphical code. The first and second portions of the code 64-66 do not include enough data for the portions of the code to have meaning. When the first and second portions of the code 64-66 are aligned (e.g., one placed on top of another), the full graphical code 70 is produced and the data can be optically read.

Figures 5C, 5D:
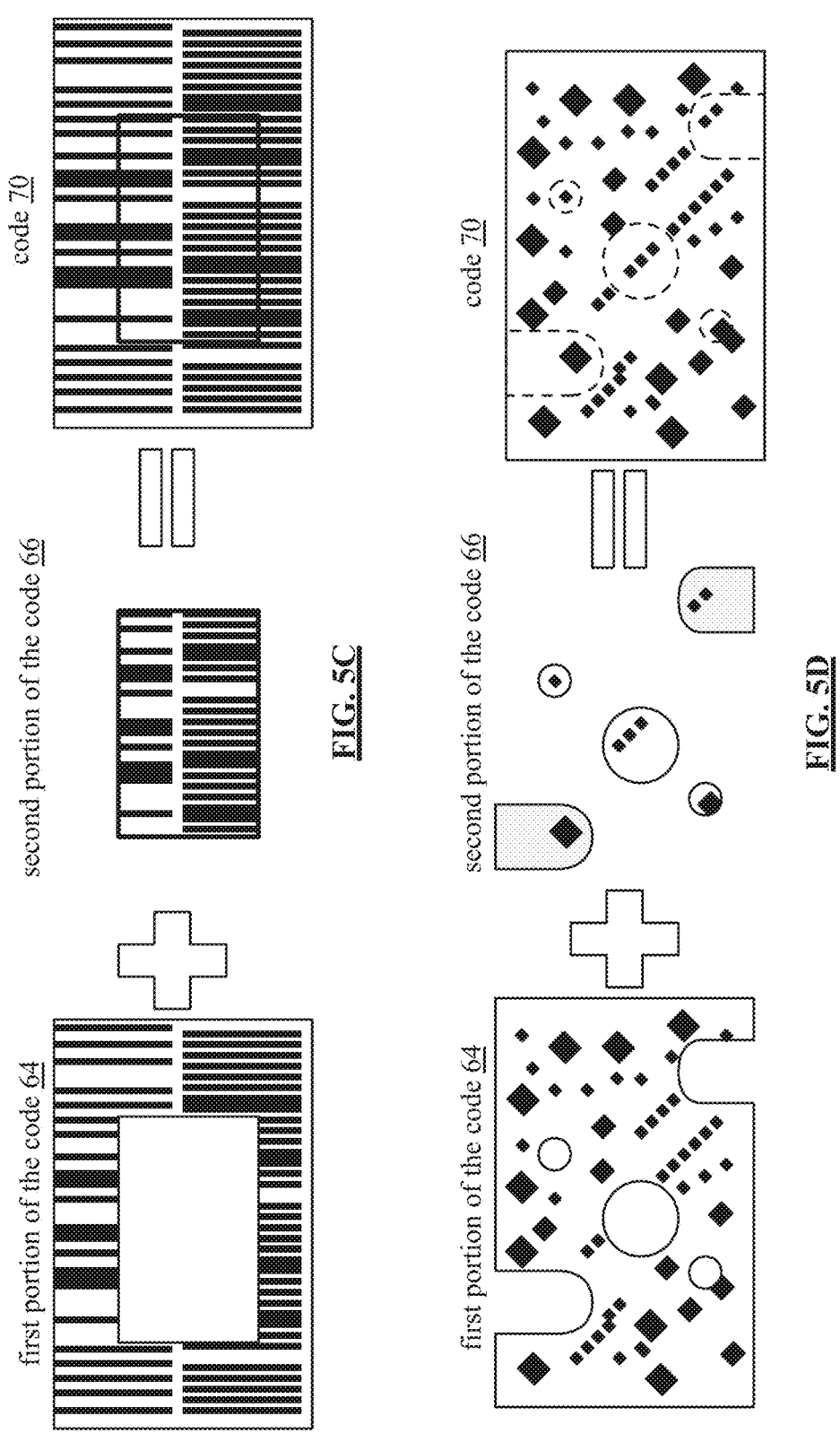

FIGS. 5A-5D are examples of multi-part codes where portions include unreadable data. FIG. 5A includes a multi-part code where a first portion of the code 64 and a second portion of the code 66 include unreadable data of a quick response (QR) code 30. Because the portions spilt the orientation information, a QR scanner cannot properly read the individual portions. When the first and second portions of the code 64-66 are aligned (e.g., placed next to one another), the full QR code 30 with proper orientation symbols is produced and the data can be read properly.

FIG. 5B includes a multi-part code where a first portion of the code 64 and a second portion of the code 66 include unreadable data of a UPC-A barcode 20. Because the portions spilt the barrier symbols and break up symbols throughout, a barcode scanner cannot properly read the individual portions. When the first and second portions of the code 64-66 are aligned (e.g., placed next to one another), the UPC-A barcode 20 is produced and the data can be read properly.

FIGS. 5C and 5D are examples showing that any graphical pattern can be used to represent data and that any segmenting is possible to create unreadable portions of code. FIG. 5C includes a multi-part code where a first portion of the code 64 and a second portion of the code 66 include unreadable data of graphical coded data representation resembling a dual barcode. Because the first portion of the code 64 is missing the interior area and the second portion of the code is missing the perimeter area, a scanner cannot properly read the individual portions. When the first and second portions of the code 64-66 are aligned (e.g., by positioning one piece on top of another), the full code 70 is produced and the data can be optically read accurately.

In FIG. 5D, a first portion of the code 64 contains holes where data is missing and a second portion of the code 66 includes the missing holes from the first portion. When a scanner is looking for a particular shape of code to scan such as a rectangle, the first portion and second portions of the code 64-66 will not be read since there is no recognizable rectangular border in either. When the first and second portions of the code 64-66 are aligned, the full graphical code 70 in the required shape is produced and the data can be read accurately.

Figure 6A:
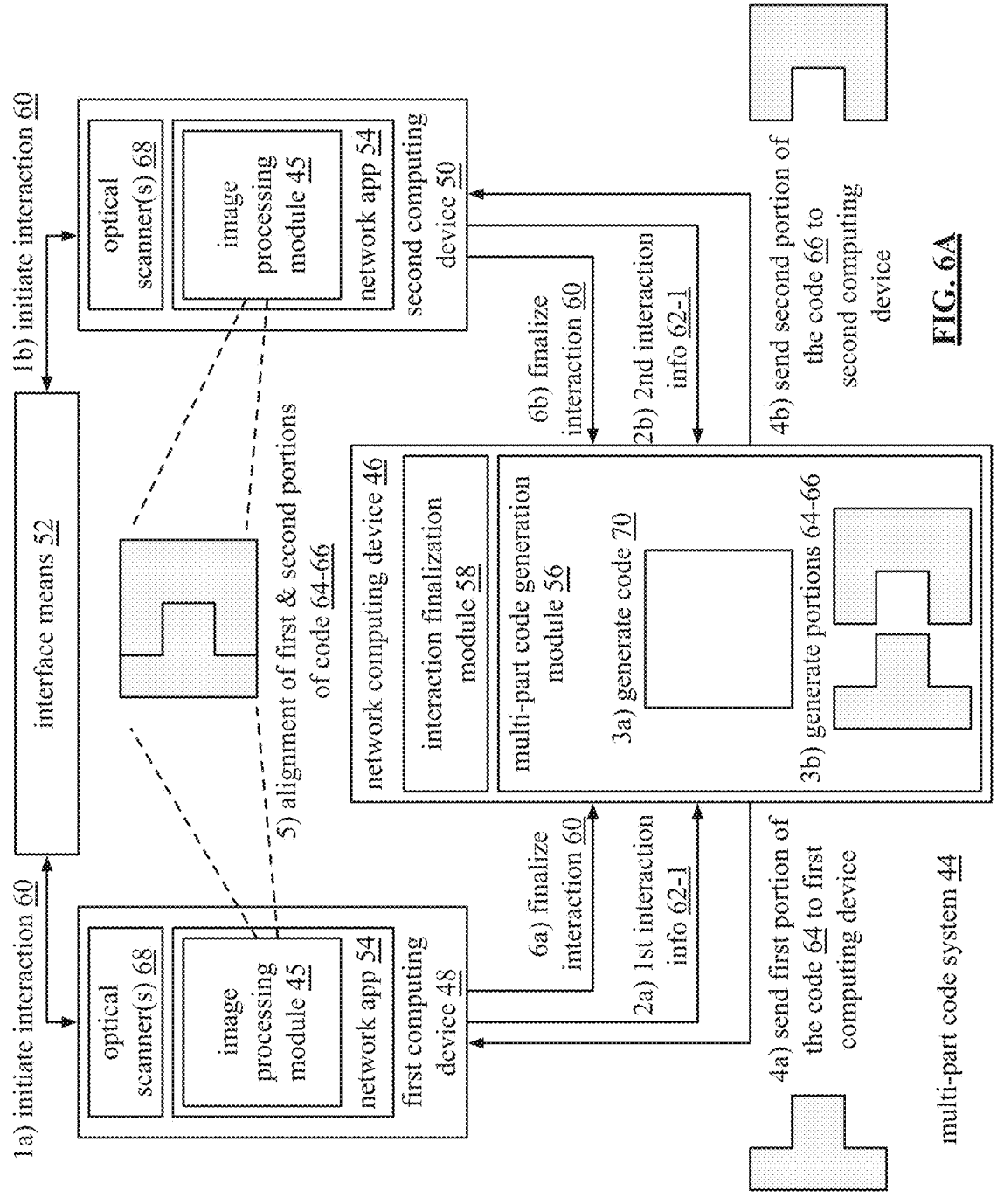
FIGS. 6A-6C are schematic block diagrams of embodiments of a multi-part code system in accordance with the present invention.
Figure 6B:
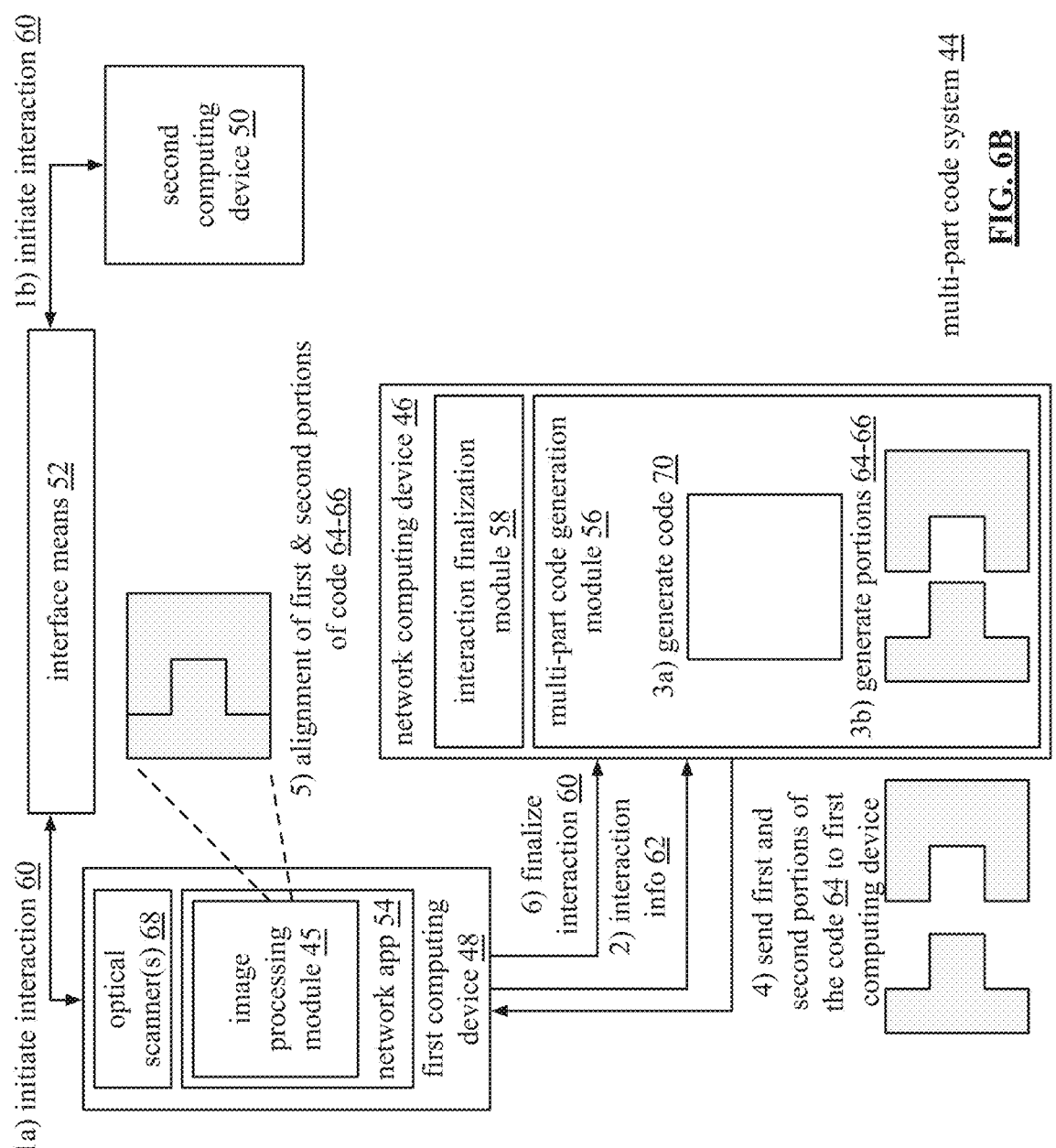
Figure 6C:
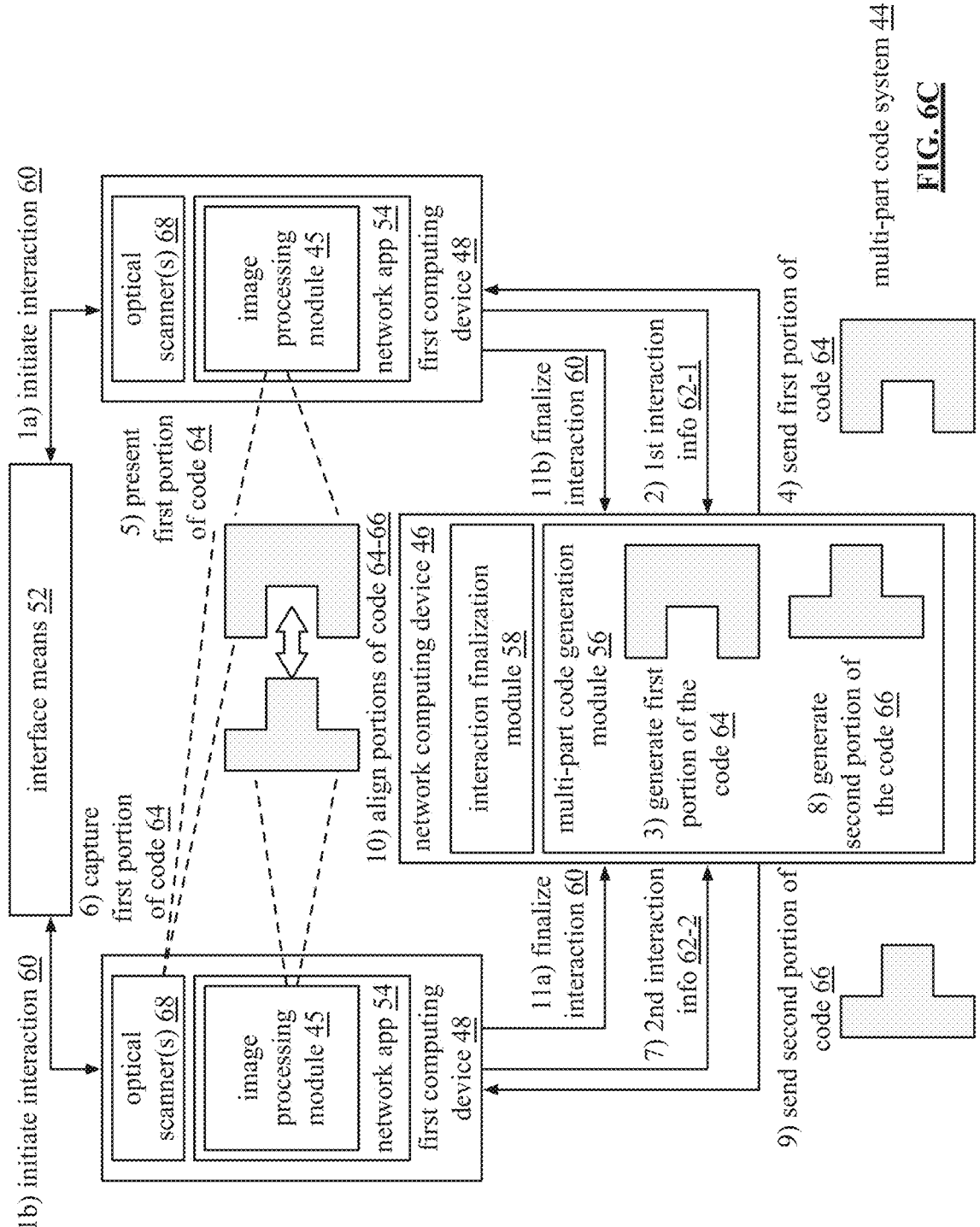

FIGS. 6A-6C are schematic block diagrams of embodiments of a multi-part code system 44 that includes a network computing device 46, a first computing device 48, a second computing device 50, and an interface means 52. FIGS.

6A-6C depict examples of delivery of the portions of the code to one or more of the first and second computing devices 48-50.

In FIG. 6A, the first and second computing devices 48-50 have the network application 54 for connecting to the network computing device 46 and optical scanner(s) 68. The network application 54 includes the image processing module 45. At steps 1a and/or 1b, one or more of the first computing device 48 and the second computing device 50 initiate an interaction 60 via the interface means 52 or other means.

As an example, the interaction 60 is a payment transaction where the first computing device 48 is paying the second computing device 50 for a good or service, the interface means 52 is a network connection, the second computing device is a merchant e-commerce platform device, and the first computing device 48 is a smartphone. To initiate the interaction 60 at step 1a, the first computing device 48 uses the interface means 52 (e.g., the network connection) to access the e-commerce website using an internet browser application. A user of the first computing device 48 selects items from the e-commerce website for purchase and places the items into an online cart for checkout. The checkout process triggers the next steps of the Figure.

As another example, the interaction 60 is signing a contract, the interface means 52 is a network connection, and the first and second computing devices 48-50 are smartphones. To initiate the interaction 60, at step 1a, the first computing device 48 shares the contract with the second computing device 50 via the interface means 52 (e.g., via email). Alternatively, at step 1b, the second computing device 50 shares the contract with the first computing device 48 via the interface means 52 (e.g., via email). Sharing the contract triggers the next steps of the Figure.

At step 2a, the first computing device 48 sends first interaction information 62-1 regarding the interaction 60 to the network computing device 46 via its network application 54. At step 2b, the second computing device 50 sends the second interaction information 62-2 regarding the interaction 60 to the network computing device 46 via its network application 54. Steps 2a and 2b may occur concurrently or at different times.

Continuing the example from above where the interaction 60 is a payment transaction, at step 2a, when the user of the first computing device 48 selects a checkout option on the e-commerce website to use the network application 54 to facilitate the payment, the network application 54 (e.g., a digital wallet application) of the first computing device 48 opens. The first interaction information 62-1 is sent to the network computing device 46 via the network application 54. The first interaction information 62-1 pertains to the first computing device 48's information regarding the payment such as a first computing device 48 identifier (ID), an amount of payment, a desired currency and/or payment method to use, customer loyalty information, a promo code, billing address, etc.

Likewise, at step 2b, when the user of the first computing device 48 selects the checkout option to use its network application 54, the second computing device 50 accesses the network computing device 46 via its network application 54 (e.g., software installed in the e-commerce platform) and the second interaction information 62-2 is sent to the network computing device 46 via its network application 54. The second interaction information 62-2 pertains to the second computing device 50's information regarding receiving the payment such as a second computing device 50 identifier (e.g., a merchant ID), an amount of payment, bank routing information, a desired form of payment method, discounts offered, etc.

Continuing the example from above where the interaction 60 is signing a contract, at steps 2a and/or 2b, the first and/or second computing devices 48-50 sends first and second interaction information to the network computing device 46 via their respective network applications 54. For example, one or more of the first and second computing devices 48-50 uploads a full copy of the contract onto its network application 54. Alternatively, the first and/or second computing devices 48-50 may provide one or more of: a contract summary, personal information (e.g., address, email, social security number, etc.), signature information (e.g., a copy of a signature, a digital signature, etc.), selected terms, selected clauses, signature pages, and security information (e.g., a private key, encrypted information, etc.) as the first and second interaction information.

At steps 3a-3b, the multi-part code generation module 56 of the network computing device 46 generates a first and second portion of a code 64-66. For example, the multi-part code generation module 56 generates a code 70 representative of the first and second interaction information 62-1 and 62-2 received from the first and second computing devices 48-50 at step 3a. The code 70 may include some or all of the first and second interaction information 62-1 and 62-2. Alternatively, the code 70 may be randomly generated (e.g., a temporary alphanumeric code) to represent the information received by the network computing device 46 such that the code 70 does not contain any of the first and second interaction information 62-1 and 62-2.

At step 3b, the multi-part code generation module 56 generates a first portion of the code 64 and a second portion of the code 66 such that the first and second portions of the code 64-66 are unusable individually. As discussed in FIGS. 4A-5D, unusable means that the portions contain no meaningful data, incomplete data, and/or that the portions cannot be read properly by an optical scanner.

As an alternative example, at step 3a the multi-part code generation module 56 of the network computing device 46 generates a first portion of the code 64 based on the first interaction information 62-1 and at step 3b generates a second portion of the code 64 based on the second interaction information 62-2 and the first portion of the code 64 (e.g., the second portion is generated to align with the shape of the first portion).

At step 4a, the network computing device 46 sends the first portion of the code 64 to the first computing device 48. At step 4b, the network computing device 46 sends the second portion of the code 66 to the second computing device 50.

The first and second portions of the code 64-66 are aligned at step 5 through an alignment function of the network application 54 (e.g., a manual action by one or more of the first and second computing devices 48-50) such that the network application of the one or more of the first and second computing devices 48-50 is operable to capture the optically produced code 70 and intent to complete the interaction 60 by the parties is demonstrated. Alignment functions are discussed in greater detail with reference to FIGS. 8A-18.

When the first and second portions of the code 64-66 are aligned at step 5, the image processing module 45 of the network application 54 of the one or more of the first and second computing devices 48-50 detects, captures, and processes the optically produced code 70 and communicates with the network computing device 46 at steps 6a-6b to finalize the interaction 60. The interaction finalization module 58 of the network computing device 46 finalizes the interaction 60.

For example, when the interaction 60 is a payment, the interaction finalization module 58 transfers an amount of money from an account associated with the first computing device 48 to an account associated with the second computing device 50. As another example, when the interaction 60 is signing a contract, the interaction finalization module 58 generates and sends a signed contract to the first and second computing devices 48-50.

FIG. 6B operates similarly to FIG. 6A except that only one device (e.g., the first computing device 48) includes the network application 54 for connecting to the network computing device 46 and capturing the optically produced code. The first computing device 48 and the second computing device 50 initiate an interaction 60 via the interface means 52 or other means (e.g., at steps 1a and 1b).

As an example, the interaction 60 is a payment transaction where the first computing device 48 is paying the second computing device 50, the interface means 52 is a Bluetooth connection, and the first and second computing devices 48-50 are smartphones. To initiate the interaction 60 at steps 1a or 1b, the first computing device 48 or second computing device 50 uses the interface means 52 (e.g., the Bluetooth connection) to initiate a payment. For example, the second computing device 50 sends an invoice to the first computing device 48 where the invoice includes a link to an account for the payment, an amount to be paid, etc.

As another example, the interaction 60 is exchanging sensitive data from the first computing device to the second computing device 50, the interface means 52 is a network connection, and the first and second computing devices 48-50 are smartphones. To initiate the interaction 60, at step 1a, the first computing device 48 shares a data exchange request with the second computing device 50 via the interface means 52 (e.g., via email). Alternatively, at step 1b, the second computing device 50 shares a data exchange request with the first computing device 48 via the interface means 52 (e.g., via a text message).

At step 2, the first computing device 48 sends interaction information 62 regarding the interaction 60 to the network computing device 46 via its network application 54 (e.g., a digital wallet application). For example, when the interaction is a payment from the first computing device 48 to the second computing device 50, the first computing device 48 received any information from the second computing device 50 via the interface means 52 required to proceed with the payment.

The interaction information 62 includes information regarding the payment such as a first computing device 48 identifier (ID), an amount of payment, a desired currency and/or payment method to use, customer loyalty information, a promo code, billing address, a second computing device 50 identifier (e.g., a merchant ID), an amount of payment, bank routing information, a desired form of payment method, discounts offered, etc.

Continuing the example from above where the interaction 60 is sharing sensitive information, at step 2, the first computing device 48 sends the interaction information 62 to the network computing device 46 via its network application 54. For example, the interaction information 62 may include the sensitive data the first computing device would like to share with the second computing device, a summary of the sensitive information, identifying information pertaining to the first and/or second computing devices, a location to send the information (e.g., the second computing device's email address, online cloud storage, etc.), security information, etc.

At steps 3a-3b, the multi-part code generation module 56 of the network computing device 46 generates a first and second portion of a code 64-66. For example, the multi-part code generation module 56 generates a code 70 representative of the interaction information 62 received from the first computing devices 48 at step 3a. The code 70 may include some or all of the interaction information 62. Alternatively, the code 70 may be randomly generated (e.g., a temporary alphanumeric code) to represent the information received by the network computing device 46 such that the code 70 does not contain any of the interaction information 62.

At step 3b, the multi-part code generation module 56 generates a first portion of the code 64 and a second portion of the code 66 such that the first and second portions of the code 64-66 are unusable individually. As discussed in FIGS. 4A-5D, unusable means that the portions contain no meaningful data, incomplete data, and/or that the portions cannot be read properly by an optical scanner.

As an alternative example, at step 3a the multi-part code generation module 56 of the network computing device 46 generates a first portion of the code 64 based on the interaction information 62 and at step 3b generates a second portion of the code 64 based on the interaction information 62 and the first portion of the code 64 (e.g., the second portion is generated to align with the shape of the first portion).

At step 4, the network computing device 46 sends the first and second portions of the code 64-66 to the first computing device 48. In this example, because the second computing device 50 is not associated with the network computing device 46, the intent to complete the interaction 60 relies solely on the first computing device 48.

The first and second portions of the code 64-66 are aligned at step 5 through an alignment function of the network application 54 (e.g., a manual action by the first computing device 48) such that the image processing module 45 of the network application 54 of the first computing devices 48 is operable to detect, capture, and process the optically produced code 70 and intent to complete the interaction 60 by the parties is demonstrated. Alignment functions are discussed in greater detail with reference to FIGS. 8A-18.

When the first and second portions of the code 64-66 are aligned at step 5, the image processing module 45 of the network application of the first computing devices 48 detects, captures, and processes the optically produced code 70 and communicates information obtained in the code with the network computing device 46 at step 6 to finalize the interaction 60. The interaction finalization module 58 of the network computing device 46 finalizes the interaction 60.

For example, when the interaction 60 is a payment, the interaction finalization module 58 transfers an amount of money from an account associated with the first computing device 48 to an account associated with the second computing device 50 (as indicated in the interaction information). As another example, when the interaction 60 is sharing information, the interaction finalization module 58 sends (and optionally encrypts) the information to the location identified in the interaction information 62 (e.g., the second computing device's 50 email address).

FIG. 6C operates similarly to FIG. 6A except that the multi-part generation module 56 of the network computing device 46 generates the portions of the code 64-66 individually and at different times. The first and second computing devices 48-50 include the network application 54 for connecting to the network computing device 46 and for capturing the optically produced code. At steps 1a and/or 1b, one or more of the first computing device 48 and the second computing device 50 initiate an interaction 60 via the interface means 52 or other means (e.g., steps 1a and 1b).

As an example, the interaction 60 is a payment transaction where the first computing device 48 is receiving a payment from the second computing device 50 for a good or service, the first computing device is a merchant point-of-sale (POS) device (e.g., a register), the second computing device 50 is a smartphone, and the interface means 52 is a direct link (e.g., NFC, Bluetooth, etc.). To initiate the interaction 60 at steps 1a and/or 1b, the first and/or second computing devices 48-50 begins a checkout process. For example, the user of the second computing device 48 initiates the checkout via the NFC link.

At step 2, the first computing device 48 sends first interaction information 62-1 regarding the interaction 60 to the network computing device 46 via its network application 54. For example, when the interaction 60 is a payment from the second computing device 50, the first interaction information 62-1 includes a first computing device 48 (e.g., a merchant) identifier (ID), item(s) selected for purchase, an amount owed, payment account information, a desired form of payment method, discounts offered, etc.

At step 3, the multi-part code generation module 56 of the network computing device 46 generates a first portion of a code 64 representative of the first interaction information 62-1 received from the first computing devices 48. The first portion of the code 64 may include some or all of the first interaction information 62-1. Alternatively, the first portion of the code 64 may be randomly generated (e.g., a temporary alphanumeric code) to represent the first interaction information 62-1 such that the first portion of the code 64 does not contain any of the first interaction information 62-1.

At step 4, the network computing device 46 sends the first portion of the code 64 to the first computing device 48. At step 5, the first computing device 48 displays the first portion of the code 64 to the second computing device 50. For example, the first portion of the code 64 is displayed on a digital display of the first computing device 48. As another example, the first computing device 48 prints the first portion of the code 64 on paper (e.g., a receipt) to present to the second computing device 50. As another example, the first computing device 48 delivers the first portion of the code 64 to the second computing device 50 via the interface means 52 (e.g., a network connection (e.g., send to email), a Bluetooth connection, a SMS text message, etc.).

At step 6, the second computing device 50 captures the first portion of the code 64 via an optical scanner 68 (e.g., a smartphone camera) where it is analyzed by the image processing module 45 of the network application 54. As another example, when the second computing device does not scan the first portion of the code 64 (e.g., it is received in email, text message, etc.), the second computing device 50 manually or automatically saves/uploads the first portion of the code 64 to the image processing module 45 of the network application 54. The image processing module 45 of the network application 54 is operable to analyze information from saved or downloaded images (e.g., not just directly from the optical scanner 68) using image detection and decoding technology.

Based on the information obtained from the first portion of the code 64, at step 7, the second computing device 50 sends second interaction information 62-2 to the network computing device 46 via its network application 54. The second interaction information 62-2 may include the first portion of the code 64, a desired currency and/or payment method to use, customer loyalty information, a promo code, billing address, etc.

At step 8, the multi-part code generation module 56 of the network computing device 46 generates a second portion of a code 66 representative of the second interaction information 62-2 received from the second computing devices 50 and based on the first portion of the code 64. The second portion of the code 66 may include some or all of the second interaction information 62-2. Alternatively, the second portion of the code 66 may be randomly generated (e.g., a temporary alphanumeric code) to represent the second interaction information 62-2 such that the second portion of the code 66 does not contain any of the second interaction information 62-2.

The multi-part code generation module 56 generates the first portion of the code 64 and the second portion of the code 66 such that the first and second portions of the code 64-66 are unusable individually. As discussed in FIGS. 4A-5D, unusable means that the portions contain no real data, incomplete data, and/or that the portions cannot be read properly by an optical scanner.

At step 9, the network computing device 46 sends the second portion of the code 66 to the second computing device 50. The first and second portions of the code 64-66 are aligned at step 5 through an alignment function of the network application 54 (e.g., a manual action by one or more of the first and second computing devices 48-50) such the image processing module 45 of the network application of the one or more of the first and second computing devices 48-50 is operable to capture the optically produced code 70 and intent to complete the interaction 60 by the parties is demonstrated. Alignment functions are discussed in greater detail with reference to FIGS. 8A-18.

When the first and second portions of the code 64-66 are aligned at step 10, the image processing module 45 of the network application of the one or more of the first and second computing devices 48-50 captures the optically produced code 70 and communicates with network computing device 46 at steps 11a-11b to finalize the interaction 60. The interaction finalization module 58 of the network computing device 46 finalizes the interaction 60.

For example, when the interaction 60 is a payment, the interaction finalization module 58 transfers an amount of money from an account associated with the second computing device 50 to an account associated with the first computing device 48 based on the interaction information.

FIG. 7 is a flowchart of an example of a method for execution by a network computing device of a multi-part code system. The network computing device facilitates the use of multi-part code to complete an interaction between two or more parties. The multi-part code is any type of optically readable code consisting of at least two portions that are unusable individually. Unusable means the portions cannot be optically read by an optical reader/scanner or the information obtained from an optical reader is incomplete and/or contains no meaningful information. An optically readable code includes one or more of a one-dimensional (1D) barcode, a two-dimensional (2D) barcode, a numerical code, an alpha-numeric code, an image, and any graphical pattern representative of data such that optically scanning, decoding, and processing the optically readable code yields information.

The method begins with step 72 where the network computing device receives interaction information from one or more of a first computing device and a second computing device of the multi-part code system. One or more of the first and second computing devices include a network application that associates the one or more of the first and second computing devices with the network computing device. The network application includes an image processing module that includes image processing and encoding/decoding circuitry to analyze optically scanned (e.g., via an optical scanner(s) of the one or more of the first and second computing devices), saved (e.g., a screenshot of a code, a code stored in a memory of the one or more of the first and second computing devices) or otherwise detected image data (e.g., graphical coded representations of data).

The interaction is an exchange of data. For example, the interaction is a payment transaction between the first and second computing devices. As another example, the interaction is an agreement (e.g., a contract) between the first and second computing devices. As another example, the interaction is an identity verification between the first and second computing devices. As another example, the interaction is a ticket verification between the first and second computing devices for entry into an event. As another example, the interaction is sharing confidential information between the first and second computing devices.

The interaction occurs via an interface means. The interface means includes one or more of an optical scanner of one or more of the first or second computing device (e.g., a smartphone camera), a direct link (e.g., near-field communication (NFC)), and a network connection. The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The interaction information includes one or more of a first computing device identifier (ID), a second computing device identifier (ID), a payment amount, a data file, a signature page, event information, a desired payment method, payment account information, discount information, promotion information, loyalty account information, and personal information (e.g., email, phone number, address, social security number, etc.).

The method continues with step 74 where a multi-part code generation module of the network computing device generates a first portion of a code and a second portion of the code such that the first and second portions of the code are unusable individually. Unusable means the portions cannot be optically read by an optical reader/scanner or the information obtained from an optical reader is incomplete or yields no meaningful data. Alignment of the first and second portions of the code optically produces the code representative of the interaction information. The image processing module of the network application of one or more of the first and second computing devices is operable to detect, capture, and process the optically produced code.

In an example of multi-part code generation, the multi-part code generation module generates the code representative of the interaction information and then divides the code into the first and second portions of the code (e.g., the code is physically segmented into two portions, information is stripped from the portions, etc.). As another example, the multi-part code generation module generates the first portion of the code based on first interaction information of the interaction information received from the first computing device. The multi-part code generation module then generates the second portion of the code based on second interaction information of the interaction information received from the second computing device and the first portion of the code (e.g., the second portion of the code is generated to align with the shape of the first portion of the code).

The method continues with step 76 where the network computing device sends the first and second portions of the code to one or more of the first and second computing devices. For example, the network computing device sends the first portion of the code to the first computing device and the second portion of the code to the second computing device. As another example, the network computing device sends the first and second portions of the code to the first computing device. As another example, the network computing device generates and sends the first portion of the code to the first computing device. The first portion of the code is provided to the second computing device (e.g., the second computing device scans the first portion of the code with an optical scanner) and the second computing device generates and sends second interaction information to the network computing device based on the first portion of the code. The network computing device generates the second portion of the code based on the second interaction information and sends the second portion of the code to the second computing device.

The first and second portions of the code must be aligned through an alignment function of the network application of the one or more of the first and second computing devices such that the full code is optically produced indicating intent to complete the interaction. Alignment functions are discussed in greater detail with reference to FIGS. 8A-18.

When the optically produced code has been captured (e.g., via the image processing module of a network application of the one of more of the first and second computing devices) at step 78, the method continues with step 80 where the network computing device finalizes the interaction. For example, the network application of the one of more of the first and second computing devices communicates the captured code information with the interaction finalization module of the network computing device to finalize the interaction. As an example, the captured and decoded code contains information instructing the interaction finalization module to transfer an amount of money from an account associated with the first computing device to an account associated with the second computing device.

If the optically produced code has not been captured at step 78 (e.g., after an amount of time has passed, through an error of the first or second computing device, etc.), the network computing device implements one or more remedies at step 82. For example, the network computing device generates and delivers a new first and second portion of the code after a certain amount of time has lapsed before the optically produced code has not been captured. As another example, the network computing device queries the one or more of the first and second computing devices regarding whether to create the one or more new first and second portions of the code. As another example, the network computing device notifies the one or more of the first and second computing devices regarding the alignment (e.g., a notification to retry alignment is sent, a notification to correct an error pertaining to the alignment, etc.).

Figure 8A:
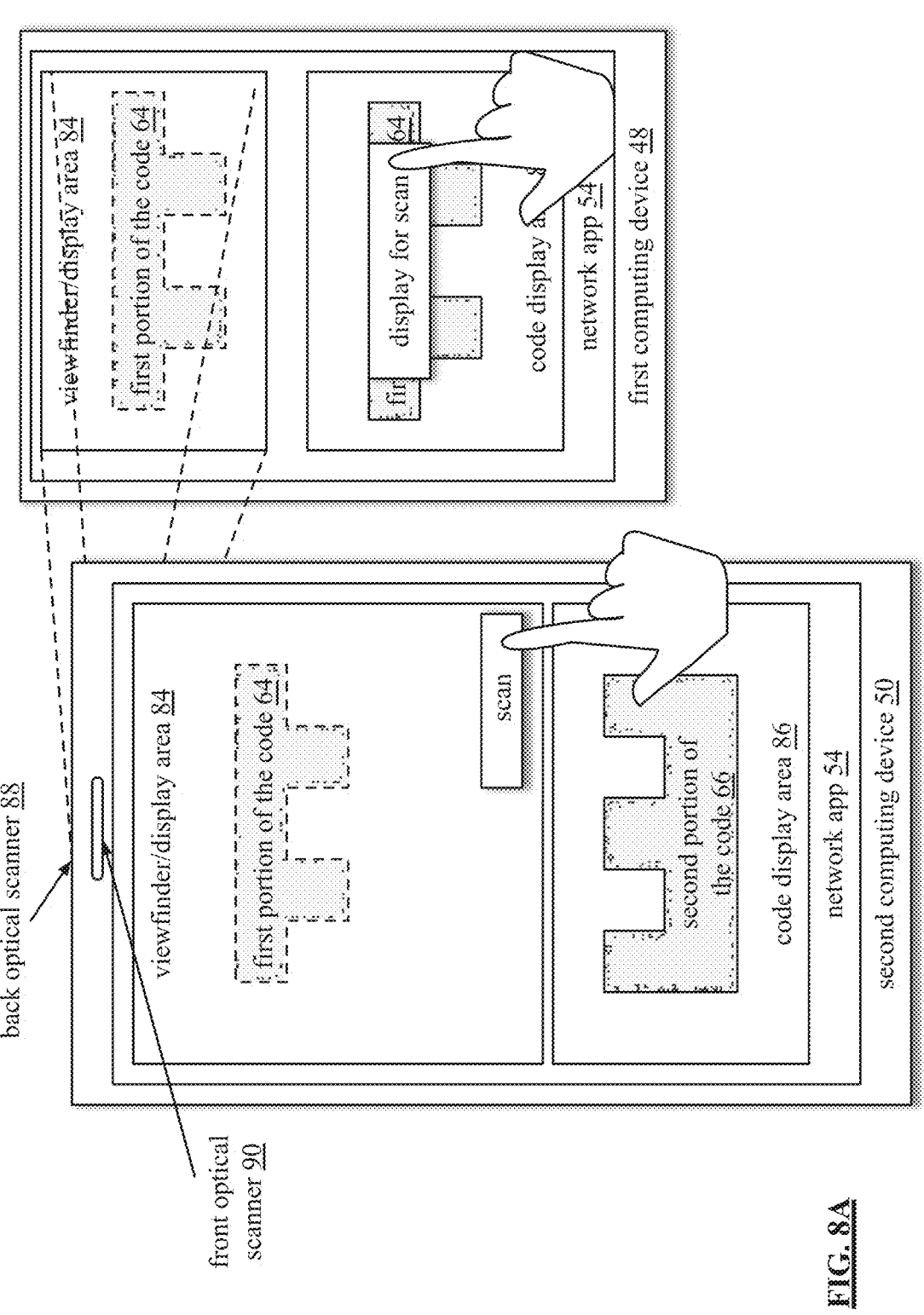
FIGS. 8A-8B are schematic block diagrams of an example of a drag and drop alignment function of a multi-part code system in accordance with the present invention.
Figure 8B:
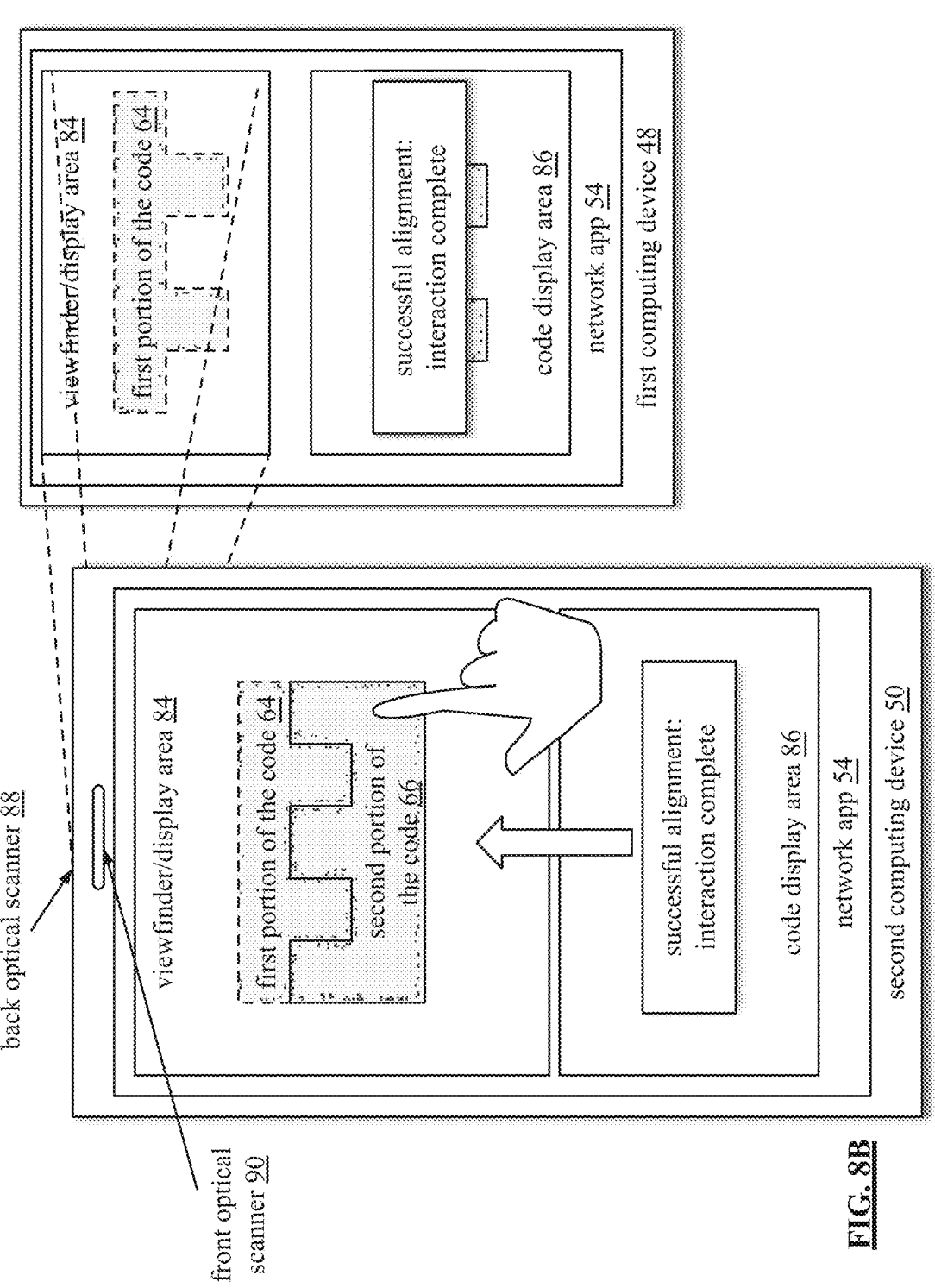

FIGS. 8A-8B are schematic block diagrams of an example of a drag and drop alignment function of a multipart code system that includes a first computing device 48 and a second computing device 50. The first and second computing devices 48-50 includes a network application ("app") 54 and one or more optical scanners 88-90. The network application 54 that associates the respective devices with the network computing device. The network application 54 includes an image processing module that includes image processing and encoding/decoding circuitry to analyze optically scanned (e.g., via optical scanner(s) 68), saved (e.g., a screenshot of a code, a code stored in a memory) or otherwise detected image data such as graphical coded representations of data.

When opened on the device, the network application 54 displays an interactive display area featuring a code display area 86 and a viewfinder/display area 84. In this example, the interactive display area of the first and second computing devices 48-50 is a touchscreen display. The code display area 86 displays the code portions generated by the network computing device and is for private use by the user of the device. The viewfinder/display area 84 displays images captured by the optical scanner(s) 88-90, images selected from the code display area 86 for display, and images selected for upload from device storage and/or other device applications (e.g., a screenshot from a website, an image saved to device memory (e.g., a camera roll or photo album), an image from a saved email, etc.). The viewfinder/display area 84 is operable to recognize, capture, and detect optically produced codes aligned within viewfinder/display area 84 through the image processing and encoding/decoding circuitry of the network application 54.

In FIG. 8A, the first computing device 48 receives a first portion of a code 64 from the network computing device. The first portion of the code 64 is displayed in the code display area 86 of the first computing device 48. A user of the first computing device 48 selects an option to display the first portion of the code 64 in the viewfinder/display area 84 of the first computing device 48 to allow the user of the second computing device 50 to scan the first portion of the code 64.

The second computing device 50 receives a second portion of a code 66 from the network computing device. The second portion of the code 66 is displayed in the code display area 86 of the second computing device 50. A user of the second computing device 50 selects a scan option to scan the viewfinder/display area 84 of the first computing device 48 using a back optical scanner 88 of the second computing device 50 (e.g., a smartphone camera application).

The viewfinder/display area 84 of the first computing device 48 is scanned by the back optical scanner 88 of the second computing device 50 and the first portion of the code 64 is displayed in the viewfinder/display area 84 of the second computing device 50.

In FIG. 8B, the user of the second computing device 50 drags the second portion of the code 66 into the viewfinder/display area 84 to align with the first portion of the code 64. Once aligned, the user "drops" (e.g., releases touch) the second portion of the code 66 into the viewfinder/display area 84 to produce the full code. The viewfinder/display area 84 is operable to capture the full code when aligned properly and communicate the successful alignment and full code with the network computing device. The network computing device then finalizes the interaction. When the alignment is successful, and the interaction is finalized, a message appears to notify the user of the second computing device 50 that the interaction is complete.

Figure 9A:
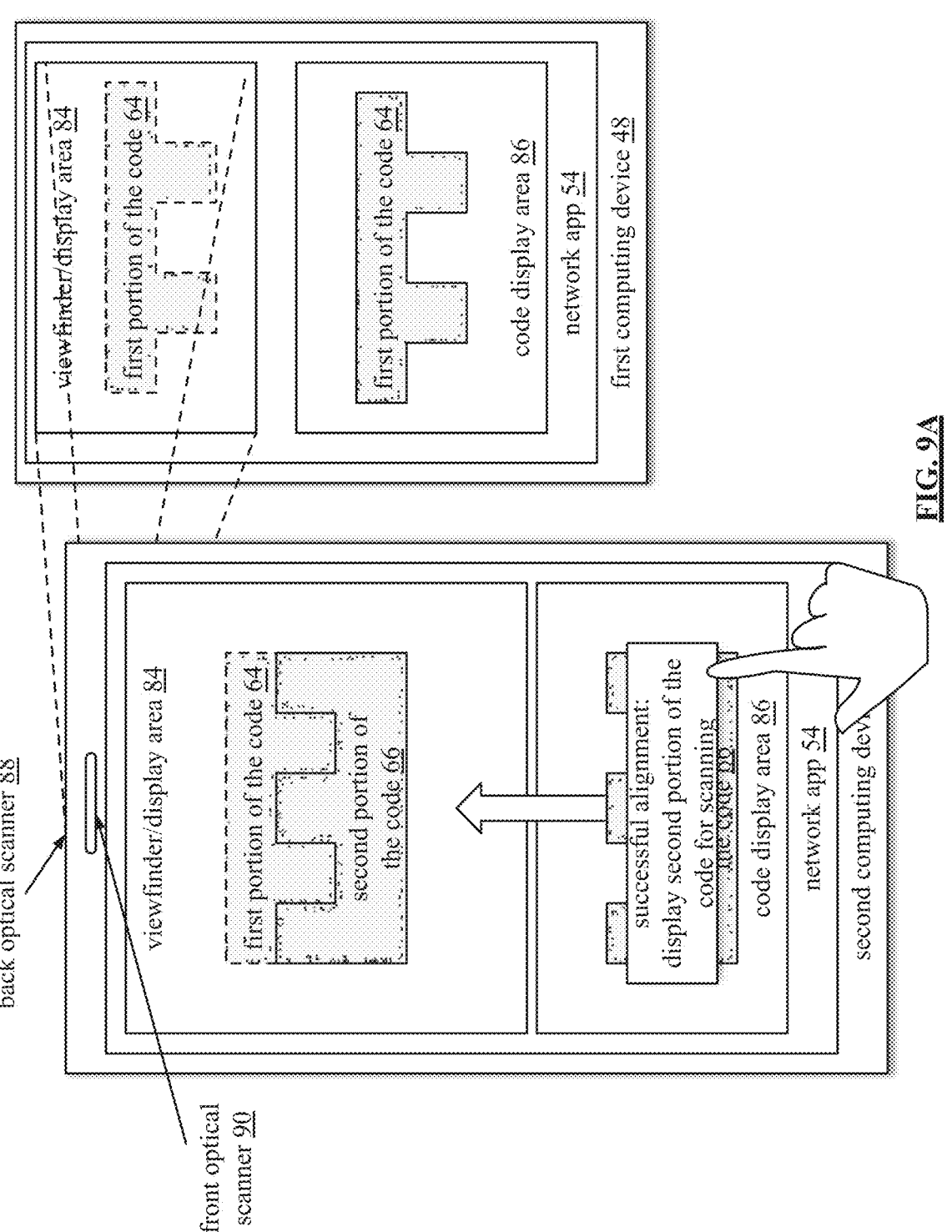
FIGS. 9A-9C are schematic block diagrams of another example of a drag and drop alignment function of a multi-part code system in accordance with the present invention.
Figure 9B:
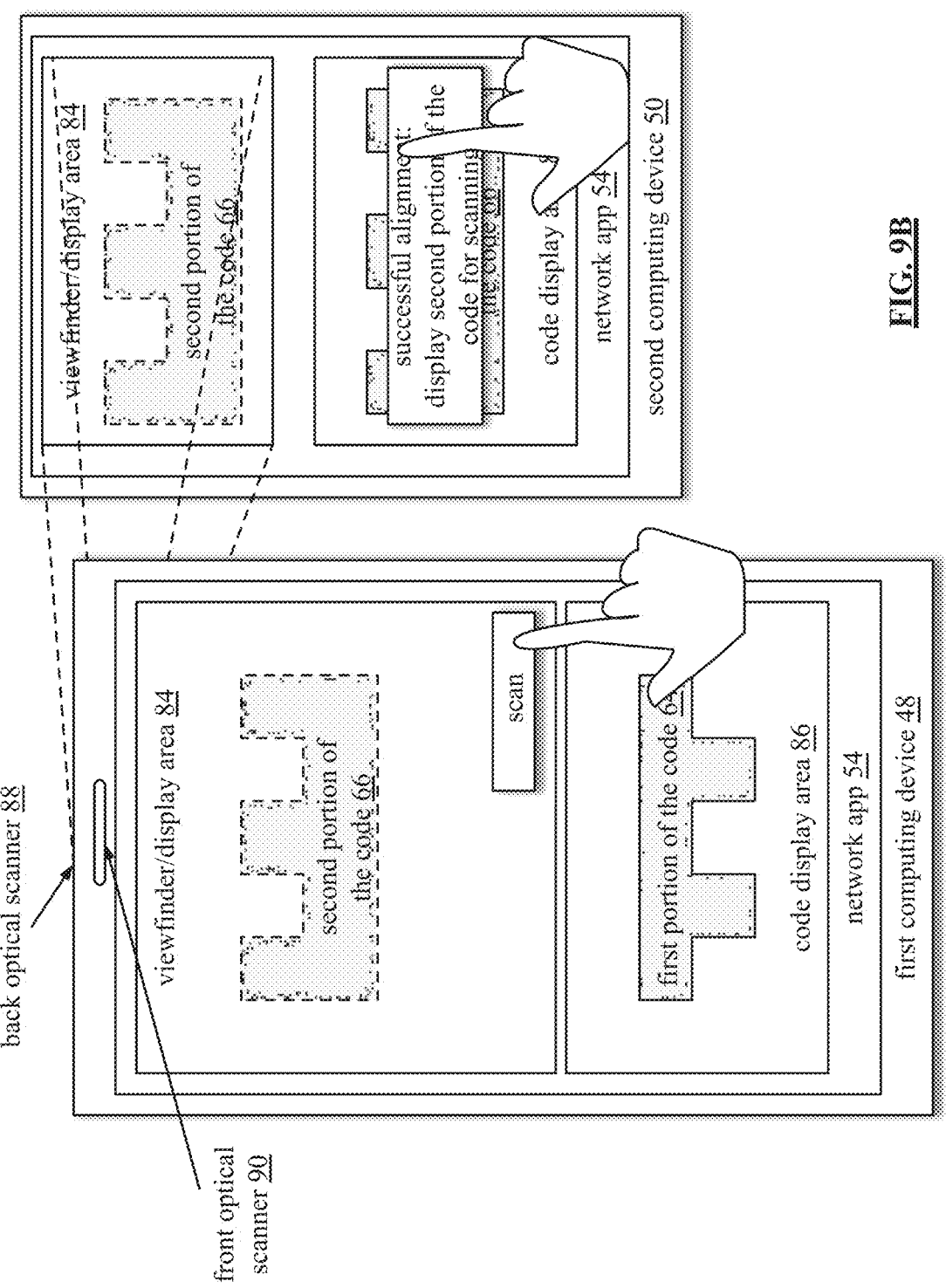
Figure 9C:
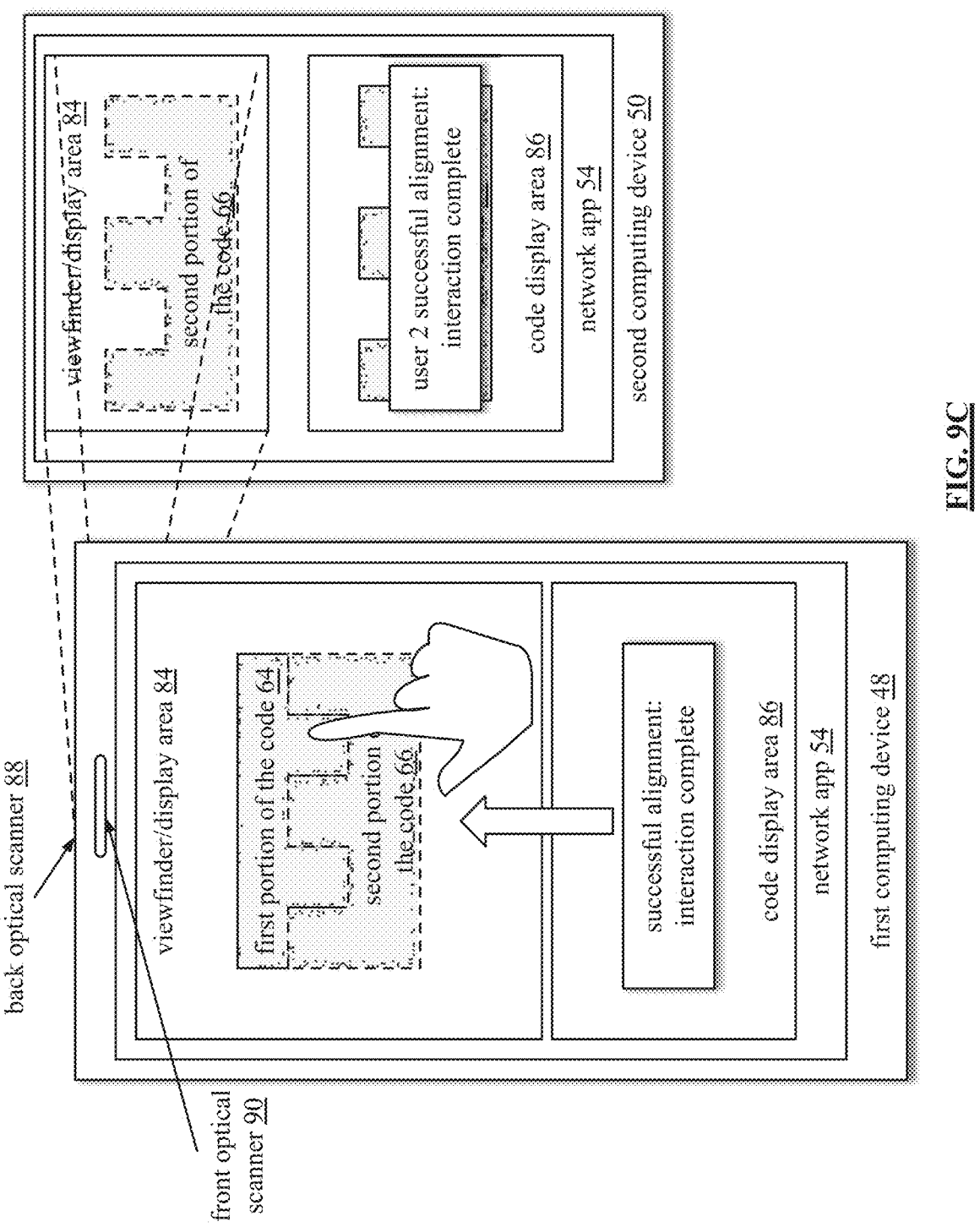

FIGS. 9A-9C are schematic block diagrams of another example of a drag and drop alignment function of a multipart code system that includes a first computing device 48 and a second computing device 50. FIGS. 9A-9C continues the example of FIGS. 8A-8B. In FIGS. 8A-8B, the user of the second computing device aligns the second portion of the code with the first portion of the code in the viewfinder/display area 84 of the second computing device 50 to complete the interaction with the first computing device 48. In FIGS. 9A-9C, the user of the first computing device must also align the portions of the code to complete the interaction.

FIG. 9A continues the example of FIG. 8B, except that instead of receiving the message that the interaction is complete, the user of the second computing device 50 receives a request to display the second portion of the code 66 for the first computing device 48 to scan. In FIG. 9B, the user of the second computing device 50 displays the second portion of the code 66 in the viewfinder/display area 84 of the second computing device 50.

A user of the first computing device 48 selects a scan option within the viewfinder/display area 84 of the first computing device 48 to scan the viewfinder/display area 84 of the second computing device 50 using a back optical scanner 88 of the first computing device 48 (e.g., a smartphone camera application).

The viewfinder/display area 84 of the second computing device 50 is scanned by the back optical scanner 88 of the first computing device 48 and the second portion of the code 66 is displayed in the viewfinder/display area 84 of the first computing device 48.

In FIG. 9C, the user of the first computing device 48 drags the first portion of the code 64 into the viewfinder/display area 84 to align with the second portion of the code 66. Once aligned, the user "drops" (e.g., releases touch) the first portion of the code 64 into the viewfinder/display area 84 to produce the full code. The viewfinder/display area 84 is operable to capture the full code when aligned properly and communicate the successful alignment and full code with the network computing device. The network computing device then finalizes the interaction. When the alignment is successful, and the interaction is finalized, a message appears to notify the users of the first and second computing devices 48-50 that the interaction is complete.

Figure 10A:
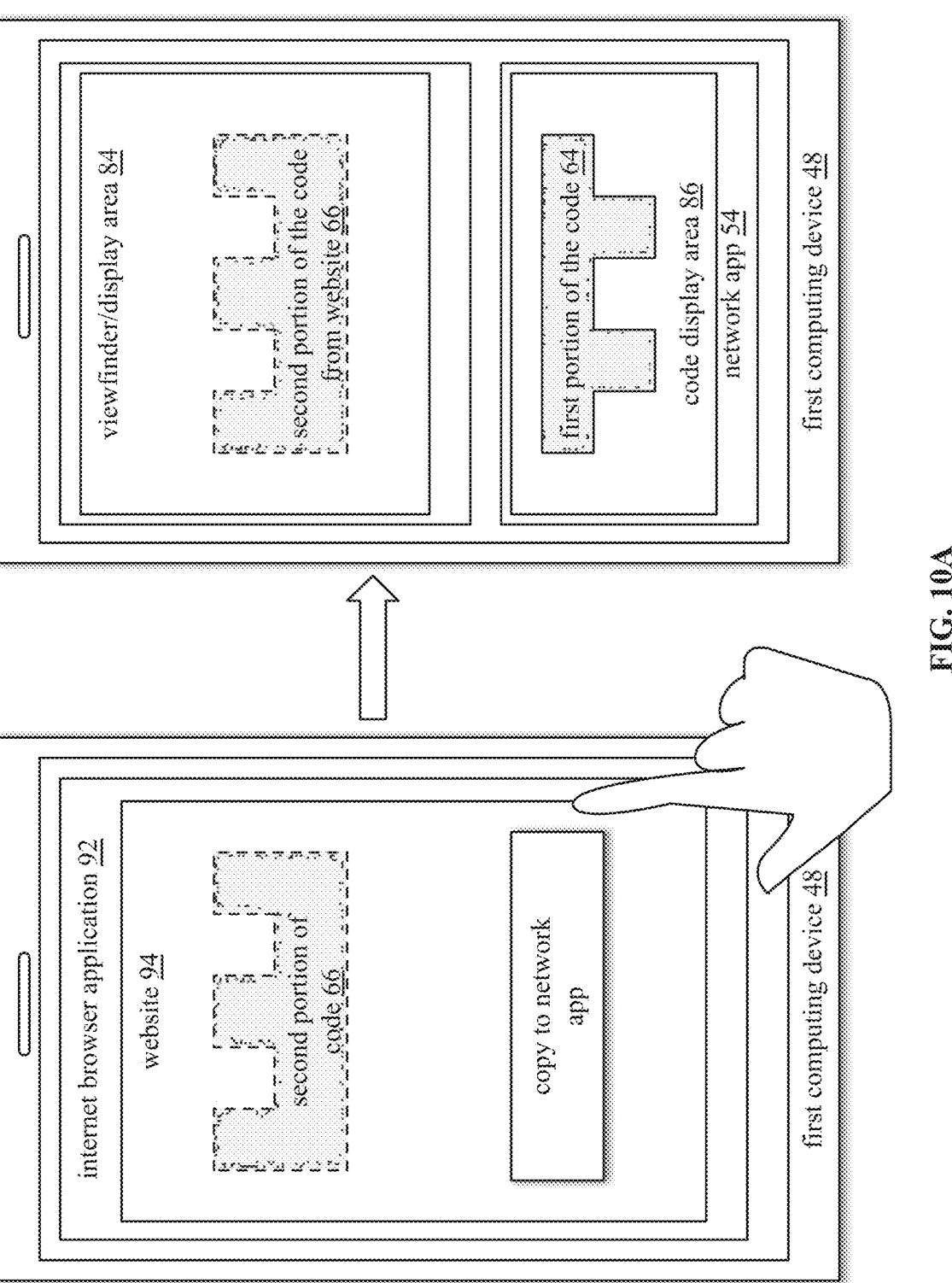
FIGS. 10A-10B are schematic block diagrams of another example of a drag and drop alignment function of a multi-part code system in accordance with the present invention.
Figure 10B:
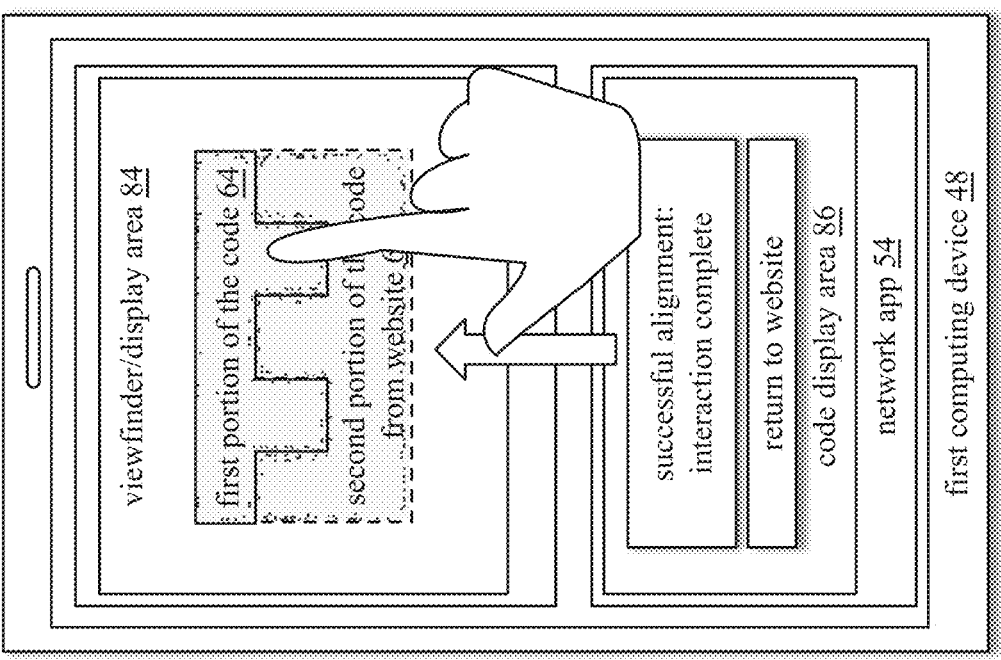

FIGS. 10A-10B are schematic block diagrams of another example of a drag and drop alignment function of a multi-part code system that includes a first computing device 48. FIGS. 10A-10B are similar to the examples of FIGS. 8A-9C except that FIGS. 10A-10B show an example where a first computing device 48 connects with a second computing device 50 via a network connection (e.g., WiFi, cellular, etc.) and the second computing device 50 is not physically near the first computing device 48.

For example, in FIG. 10A, the second computing device 50 is an e-commerce platform device and the first computing device 48 is a smartphone. The user of the first computing device 48 opens an e-commerce website 94 associated with the second computing device 50 via an internet browser application 92 and a network connection. After an interaction initiation (e.g., adding items to an online cart), a checkout area of the website displays a second portion of a code 66 generated by the network computing device based on the interaction.

As another example, the user of the first computing device 48 opens a website 94 to access email via an internet browser application 92 and a network connection. An email displays the second portion of a code 66 generated by the network computing device based on the interaction with the second computing device 50.

The image processing module of the network application 54 may automatically detect portions of code displayed in other applications of the first computing device 48 and automatically open the first computing device's network application 54 to show the detected portion of the code in the viewfinder/display area 84. Alternatively, a user of the first computing device 48 screenshots or otherwise copies the second portion of the code 66 and saves it to the first computing device 48's memory (e.g., photo storage, network application memory, etc.) where the user can later upload it to the network application if desired. As another option, when a portion of code is detected via the image processing module of the network application 54, the user of the first computing device 48 is queried as to whether to copy/upload the detected portion of the code to the device's network application 54 (as shown).

When the second portion of the code 66 is uploaded to the network application 54 is opened (e.g., automatically or manually), the second portion of the code 66 is produced in the viewfinder/display area 84 of the first computing device 48. The first computing device 48 receives a first portion of a code 64 from the network computing device representative of the interaction with the second computing device 50. The first portion of the code 64 is displayed in the code display area 86 of the first computing device 48.

In FIG. 10B, the user of the first computing device 48 drags the first portion of the code 64 into the viewfinder/display area 84 to align with the second portion of the code 66. Once aligned, the user "drops" (e.g., releases touch) the first portion of the code 64 into the viewfinder/display area 84 to produce the full code. The viewfinder/display area 84 is operable to capture the full code when aligned properly and communicate the successful alignment and full code with the network computing device.

The network computing device then finalizes the interaction (e.g., connects with the second computing device to finalize a payment). When the alignment is successful, and the interaction is finalized, a message appears notifying the user of the first computing device 48 that the interaction is complete. Additional options or messages may be displayed in the code display area 86 such as a "return to website" option. The "return to website" option exits out of the network application 54 and returns to the page of the website last visited.

Figure 11A:
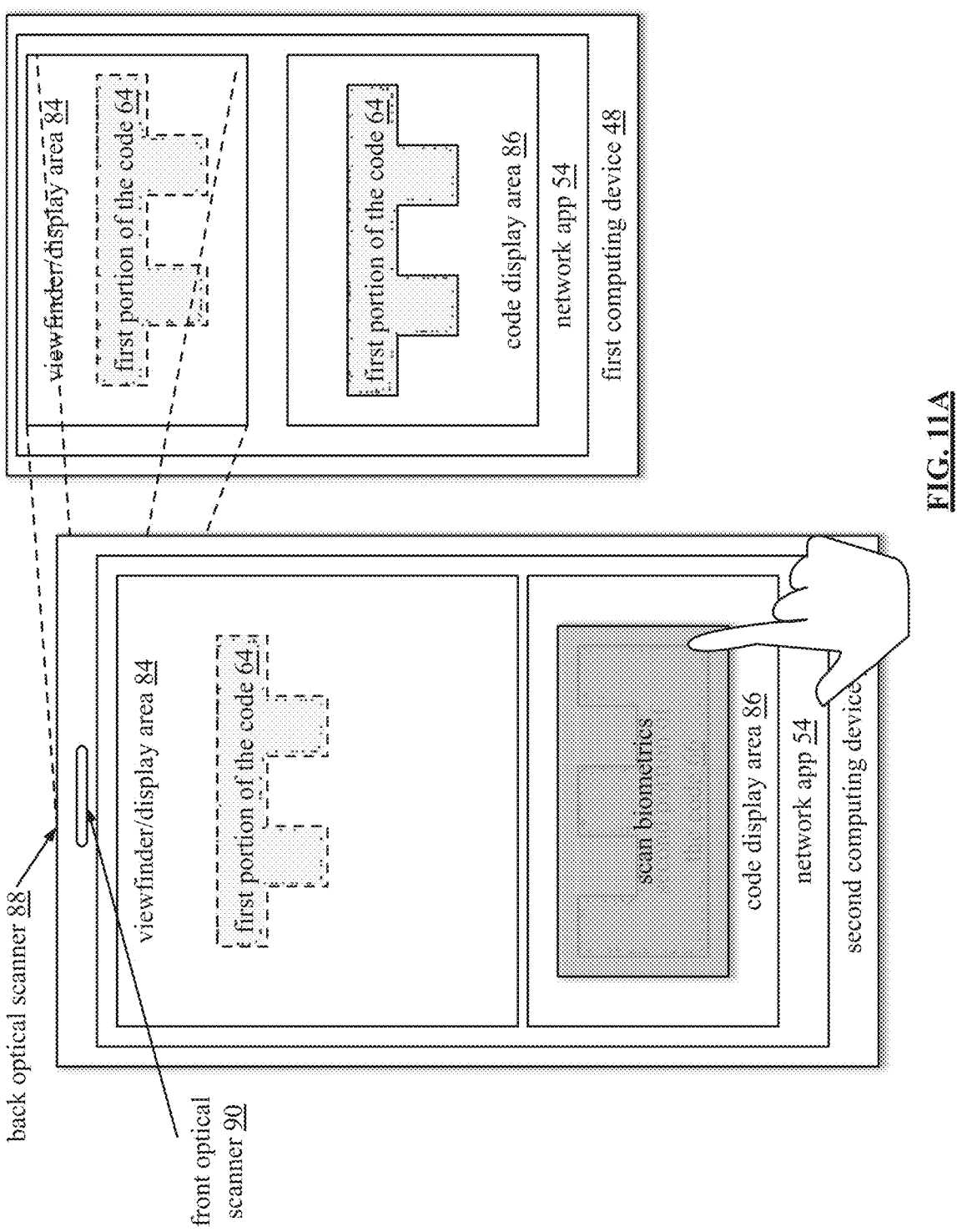
FIGS. 11A-11B are schematic block diagrams of an example of a drag and drop alignment function with a biometric scan in accordance with the present invention.
Figure 11B:
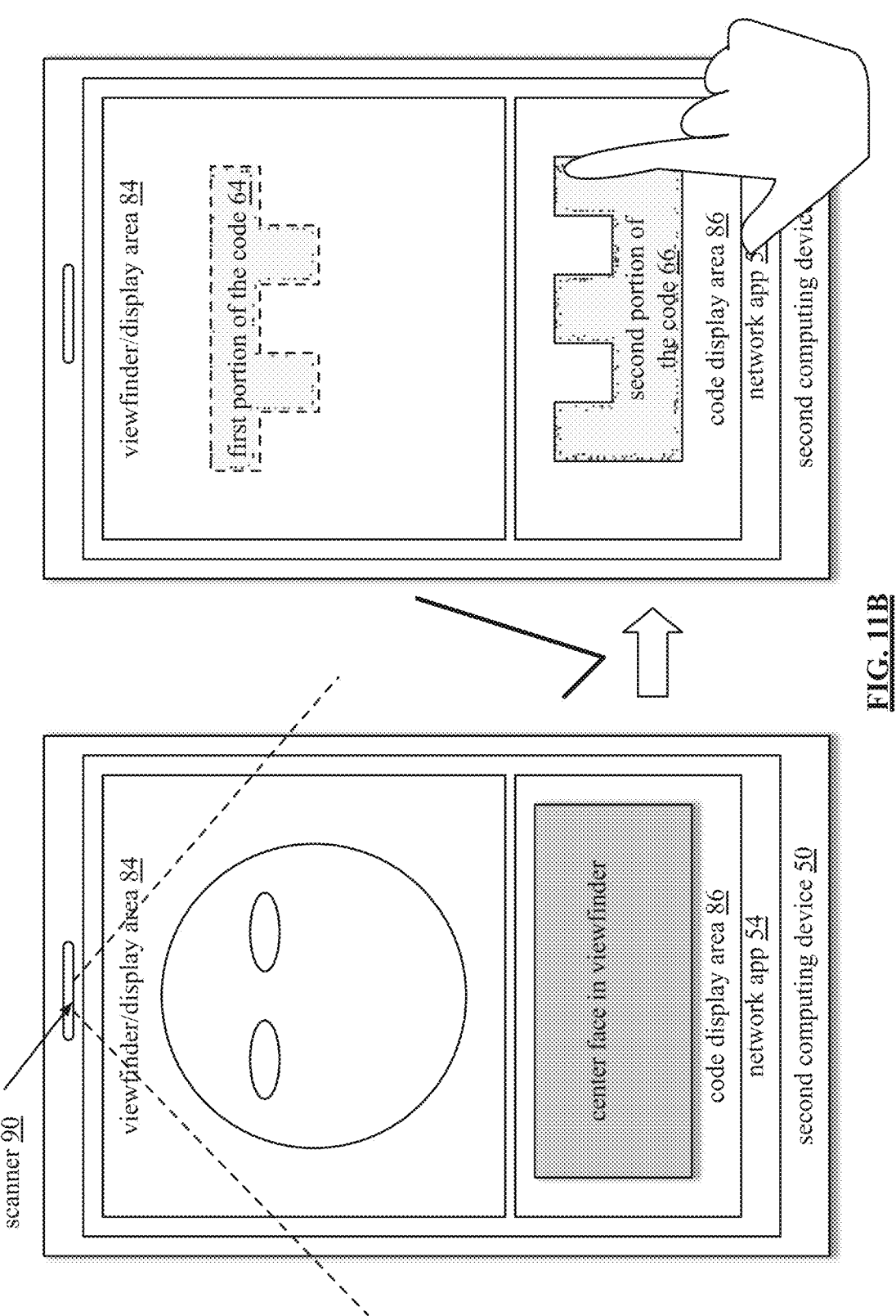

FIGS. 11A-11B are schematic block diagrams of an example of a drag and drop alignment function with a biometric scan. FIGS. 11A-11B operate similarly to FIGS. 8A-8B except that based on the type of interaction between the first and second computing devices, additional security such as a biometric scan for identification verification is required by one or more of the first and second computing devices. For example, the interaction is an event or airline ticket that requires identification to get through a security checkpoint.

In FIG. 11A, the first computing device 48 displays the first portion of the code 64 in the viewfinder/display area 84 of the first computing device 48. The second computing device 50 scans the viewfinder/display area 84 of the first computing device 48 using a back optical scanner 88 of the second computing device 50 (e.g., a smartphone camera application). The first portion of the code 64 is displayed in the viewfinder/display area 84 of the second computing device 50.

The second computing device 50 receives a second portion of a code 66 from the network computing device. The second portion of the code 66 is displayed in the code display area 86 of the second computing device 50. Based on information in the first portion of the code 64 detected by the image processing module of the network application or a message received from the network computing device regarding the interaction, the second portion of the code 66 is locked to the user of the second computing device 50. To unlock the second portion of the code 66 for use, the user of the second computing device must conduct a biometric scan to verify identity.

The biometric scan may include a fingerprint scan, a retina and/or face identification scan (e.g., using the front optical scanner 90 of the second computing device 50), and/or any other identifying feature scan. The network application 54 stores identifying information of the user of the second computing device (e.g., the user conducted a biometric scan as part of the network application 54 setup), such that when identifying features are recognized, the user's identity is verified.

FIG. 11B, shows an example where the biometric scan is a face identification (ID) scan using the front optical scanner 90 of the second computing device 50. The user is asked to center his or her face in the viewfinder/display area 84 to complete the scan. If verified, the second portion of the code 66 is unlocked and the user of the second computing device 50 is able to drag and drop the second portion of the code 66 in the viewfinder/display area 84 to align with the first portion of the code 64 and complete the interaction as discussed in previous Figures.

FIG. 12 is a flowchart of an example of a method for a drag and drop alignment function of a multi-part code system. The method begins with step 96 where a first computing device of the multi-part code system obtains a second portion of a code associated with a second computing device of the multi-part code system. For example, the first computing device scans via an optical scanner, a display of the second computing device to retrieve a scanned image of the second portion of the code. As another example, the first computing device screenshots and/or saves the second portion of the code from a website or email opened on an internet browser application of the first computing device.

The method continues with step 98 where the first computing device displays the second portion of the code in a viewfinder/display area of an interactive display of a network application. For example, the user of the first computing device scans the second portion of the code while the network application is open which displays the second portion of the code in the viewfinder/display area. As another example, the user of the first computing device selects the second portion of the code from storage or another application for upload and display in the viewfinder/display area of the network application. As another example, the network application automatically opens and displays the second portion of the code viewfinder/display area when the second portion of the code is detected in storage or another application (e.g., the network application has access to the first computing device's photo storage such that screenshots of codes or code portions can be detected for immediate use).

The network application associates the first computing device with a network computing device of the multi-part code system. The network application includes an image processing module that includes image processing and encoding/decoding circuitry to analyze optically scanned (e.g., via optical scanner(s)), saved (e.g., a screenshot of a code, a code stored in a memory) or otherwise detected image data such as graphical coded representations of data.

The method continues with step 100 where the first computing device receives a first portion of the code for display in a code display area of the interactive display. The network computing device generated the first and second portions of the code for an interaction between the first and second computing devices. For example, the network computing device generated a code based on interaction information from one or more the first and second computing devices and divided the code to produce the first and second portions of the code. As another example, the network computing device generated the second portion of the code based on second interaction information of the interaction information received from the second computing device, and then generated the first portion of the code based on first interaction information of the interaction information received from the first computing device and the second portion of the code scanned by the first computing device.

The method continues with step 102 where a user of the first computing device drags the first portion of the code from the code display area to the viewfinder/display area to align the first portion of the code with the second portion of the code. The method continues with step 104 where, when the first portion of the code is aligned with the second portion of the code, the user drops the first portion of the code in the viewfinder/display area to optically produce the full code.

The method continues with step 106 where the first computing device sends a finalize interaction notification to the network computing device. For example, the viewfinder/display area is operable to capture the full code when aligned properly and communicate the successful alignment and full code with the network computing device.

Figure 13B:
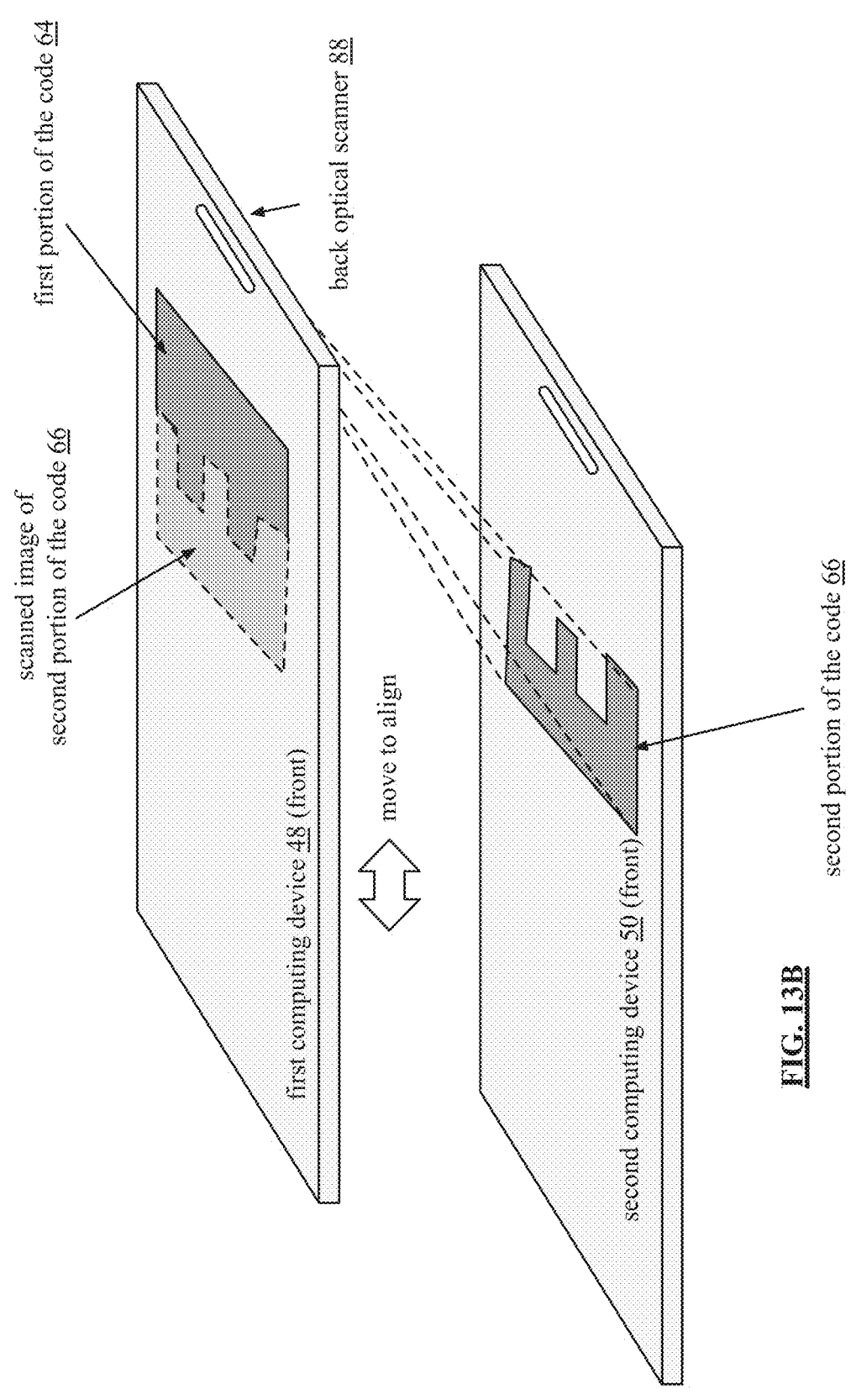

FIGS. 13A-13B are schematic block diagrams of an example of a move to align function of a multi-part code system that includes the first computing device 48 and the second computing device 50. The first and second computing devices 48-50 includes a network application ("app") 54 and one or more optical scanners 88-90. The network application 54 associates the respective devices with the network computing device. The network application 54 includes an image processing module that includes image processing and encoding/decoding circuitry to analyze optically scanned (e.g., via optical scanner(s) 88-90), saved (e.g., a screenshot of a code, a code stored in a memory) or otherwise detected image data such as graphical coded representations of data.

When opened on the device, the network application 54 displays an interactive display area featuring a code display area 86 and a viewfinder/display area 84. In this example, the interactive display area of the first and second computing devices 48-50 is a touchscreen display. However, with the move to align function, a touchscreen display is not necessary to complete the interaction. The code display area 86 displays the code portions generated by the network computing device and is for private use by the user of the device.

The viewfinder/display area 84 displays images captured by the optical scanner(s) 88-90, images selected from the code display area 86 for display, and images selected for upload from device storage and/or other device applications (e.g., a screenshot from a website, an image saved to device memory (e.g., a camera roll or photo album), an image from a saved email, etc.). The viewfinder/display area 84 is operable to recognize, capture, and detect optically produced codes aligned within viewfinder/display area 84 through the image processing and encoding/decoding circuitry of the network application 54.

In FIG. 13A, the first computing device 48 receives a first portion of a code 64 from the network computing device. The first portion of the code 64 is displayed in the code display area 86 of the first computing device 48. A user of the first computing device 48 selects an option within the code display area 86 to display the first portion of the code 64 in the viewfinder/display area 84 of the first computing device 48. In an embodiment where the first computing device is not a touchscreen device, the first portion of the code 64 may be automatically displayed.

The second computing device 50 receives a second portion of a code 66 from the network computing device. The second portion of the code 66 is displayed in the code display area 86 of the second computing device 50. A user of the second computing device 50 selects an option within the code display area 86 to display the second portion of the code 66 in the viewfinder/display area 84 of the second computing device 50. In an embodiment where the second computing device is not a touchscreen device, the second portion of the code 66 may be automatically displayed.

FIG. 13B shows an example where first computing device 48 is placed near (e.g., on top of, hovering over, within a scannable range) the second computing device 50 such that the back optical scanner 88 of the first computing device 48 scans the viewfinder/display area 84 of the second computing device 50 to capture the second portion of the code 66 for display in the viewfinder/display area 84 of the first computing device 48.

While continuing to scan the viewfinder/display area 84 of the second computing device 50 to display the second portion of the code 66, the user of the first computing device 48 moves the first computing device 48 until the scanned image of the second portion of code 66 displayed in the viewfinder/display area 84 aligns with the first portion of the code 64. For example, the first portion of the code 64 is displayed in the viewfinder/display area 84 of the first computing device 48 in a fixed position. Moving the first computing device 48 moves the back optical scanner 88 of the first computing device 48 such that the scanned image of the second portion of the code 50 moves on the viewfinder/display area 84 of the first computing device 48.

The viewfinder/display area 84 of the first computing device 48 is operable to capture the full code when the portions are aligned properly and communicate the successful alignment and full code with the network computing device. The network computing device then finalizes the interaction. When the alignment is successful, and the interaction is finalized, a message appears to notify the user of the first computing device 48 that the interaction is complete.

Figure 14A:
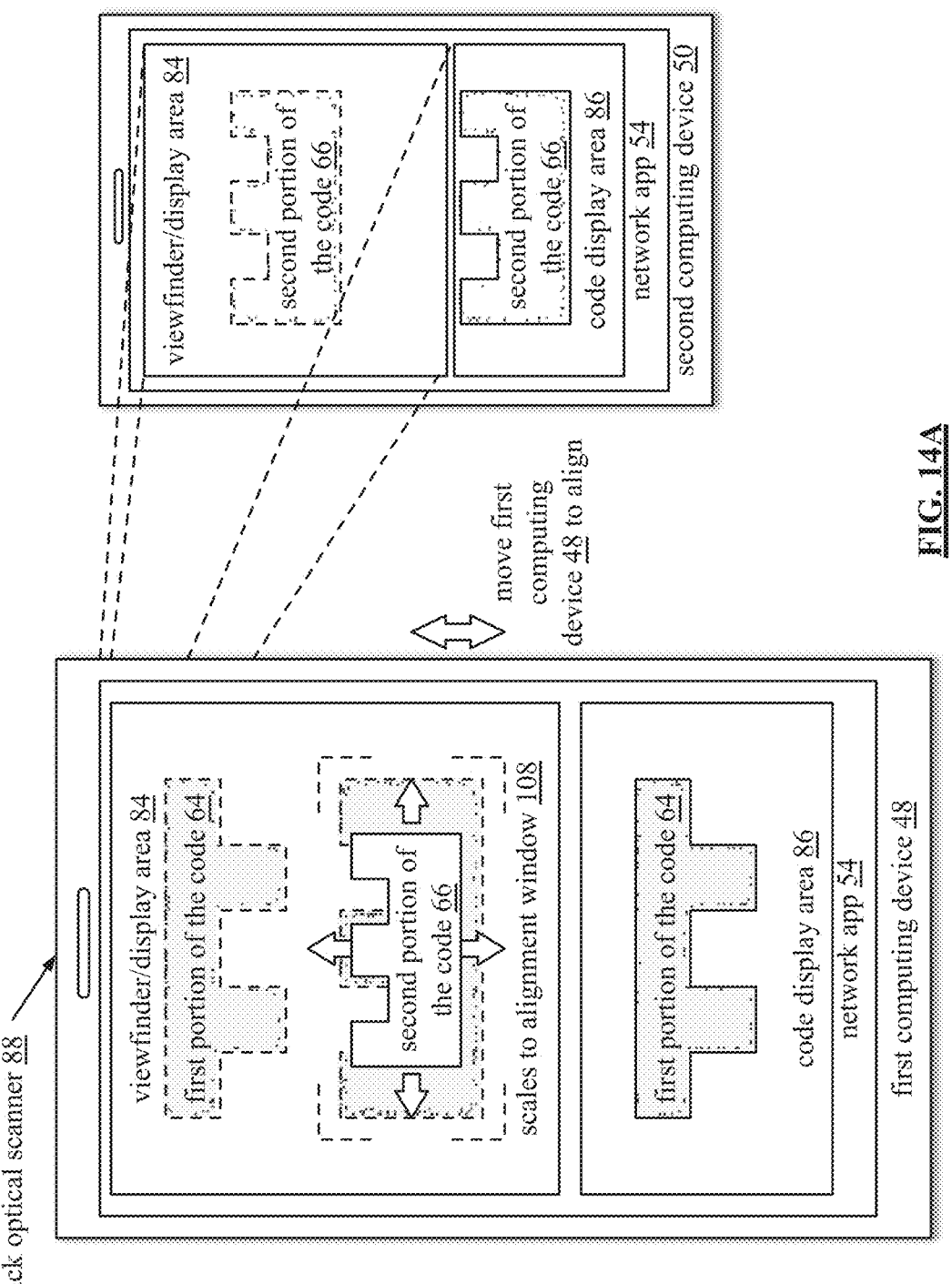
FIGS. 14A-14B are schematic block diagrams of an example of a move to align and scaling function of a multi-part code system in accordance with the present invention.
Figure 14B:
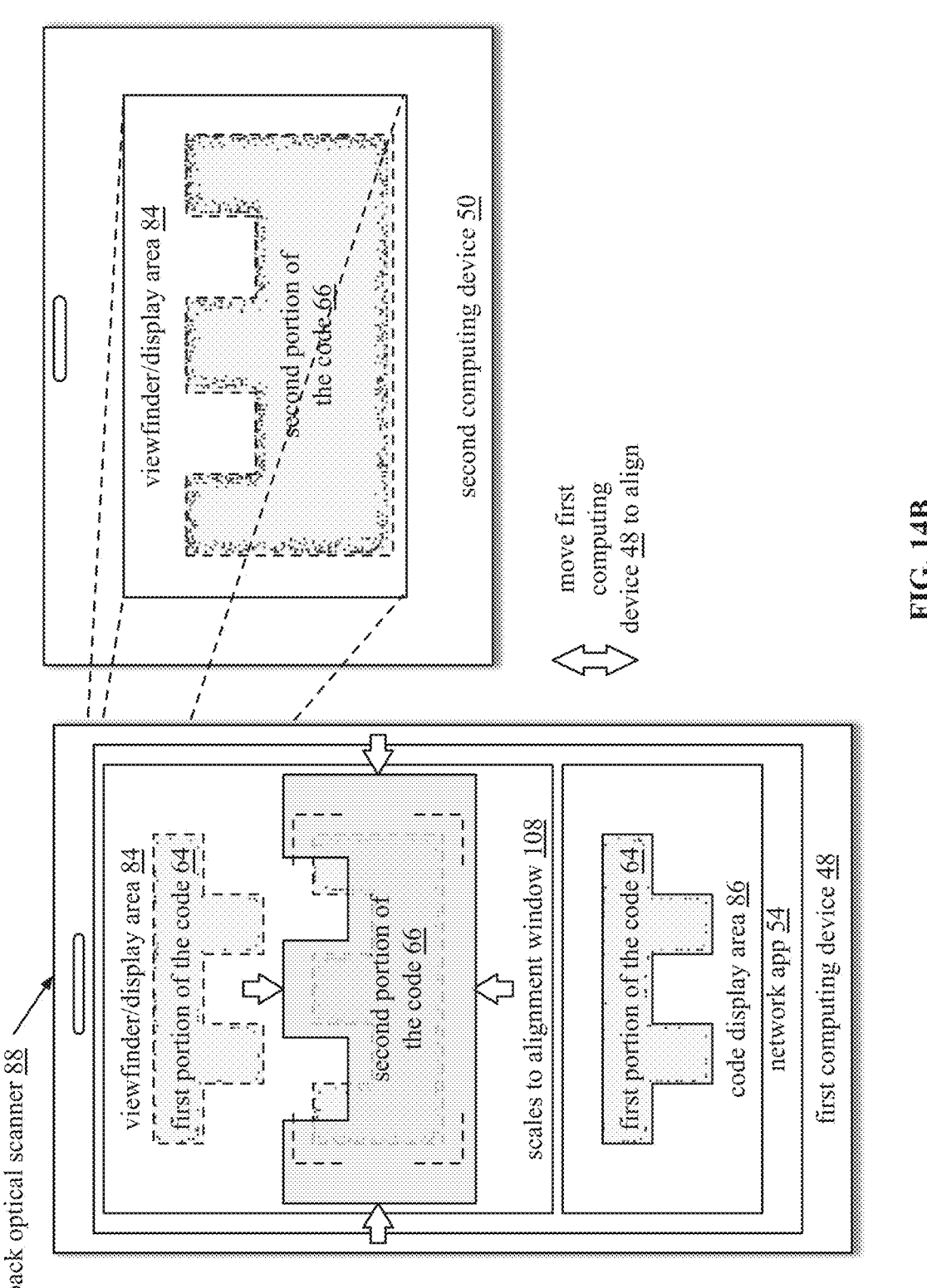

FIGS. 14A-14B are schematic block diagrams of an example of a move to align and scaling function of a multi-part code system that includes the first and second computing devices 48-50. FIG. 14A is similar to the example of FIGS. 13A-13B except that the viewfinder/display area 84 of the first computing device 48 includes an alignment window 108 and the viewfinder/display area 84 of the second computing device 50 is smaller than the viewfinder/display area 84 of the first computing device 48. When the back optical scanner 88 of the first computing device 48 scans the viewfinder/display area 84 of the second computing device 50, the second portion of the code 66 is too small to align properly with the first portion of the code 64.

The image processing module of the network application 54 auto scales the second portion of the code 66 within the alignment window 108 of the viewfinder/display area 84 of the first computing device 48. The size of the alignment window 108 depends on the dimensions of the first portion of the code 64. In another embodiment, a user of the first computing device manually scales the second portion of the code 66 to the size of the alignment window 108 through a touch command (e.g., a two finger touch and expand).

With the second portion of the code 66 scaled to the alignment window 108, the user of the first computing device 48 is able to move the first computing device 48 until the scanned image of the second portion of code 66 displayed in alignment window 108 aligns with the stationary first portion of the code 64. For example, the alignment window 108 moves with the second portion of the code 66 to maintain proper scaling as the first computing device 48 moves.

FIG. 14B is similar to the example of FIG. 14A except that the viewfinder/display area 84 of the second computing device 50 is larger than the viewfinder/display area 84 of the first computing device 48. When the back optical scanner 88 of the first computing device 48 scans the viewfinder/display area 84 of the second computing device 50, the second portion of the code 66 is too large to align properly with the first portion of the code 64.

The image processing module of the network application 54 auto scales the second portion of the code 66 within the alignment window 108 of the viewfinder/display area 84 of the first computing device 48. In another embodiment, a user of the first computing device manually scales the second portion of the code 66 to the size of the alignment window 108 through a touch command (e.g., a two finger touch and reduce).

With the second portion of the code 66 scaled to the alignment window 108, the user of the first computing device 48 is able to move the first computing device 48 until the scanned image of the second portion of code 66 displayed in alignment window 108 aligns with the stationary first portion of the code 64. The alignment window 108 moves with the second portion of the code 66.

FIG. 15 is a flowchart of an example of a method for a move to align function of a multi-part code system. The method begins with step 110 where a first computing device of the multi-part code system receives a first portion of a code from a network computing device of the multi-part code system via a network application. The network application associates the first computing device with the network computing device of the multi-part code system.

The network application includes an image processing module that includes image processing and encoding/decoding circuitry to analyze optically scanned (e.g., via optical scanner(s)), saved (e.g., a screenshot of a code, a code stored in a memory) or otherwise detected image data such as graphical coded representations of data. The network computing device generated the first portion of the code for an interaction between the first and second computing devices.

The method continues with step 112 where the first computing device displays the first portion of the code in a viewfinder/display area of an interactive display of the network application for a move to align function. For example, the first portion of the code is displayed in a code display area of the interactive display of the network application. A user of the first computing device selects the first portion of the code from the code display area for the move to align function where the selection displays the first portion of the code in the viewfinder/display area of the first computing device. As another example, the first portion of the code is automatically displayed in the viewfinder/display area of the first computing device based on the interaction information (e.g., the first portion of the code was specifically generated for a move to align function).

The method continues with step 114 where the user positions an optical scanner (e.g., a back smartphone camera) of the first computing device near a viewfinder/display area of an interactive display of a network application of the second computing device. The second computing device displays a second portion of the code in a viewfinder/display area. The network computing device generated the second portion of the code for the interaction between the first and second computing devices.

The positioning scans and displays the second portion of the code in the viewfinder/display area of the first computing device. Displaying the second portion of the code may include scaling the second portion of the code to an alignment window such that the first and second portions of the code are sized correctly for alignment. The method continues with step 116 where the user positions the first computing device near the second computing device such that the first and second portions of the code align in the viewfinder/display area of the first computing device.

The method continues with step 118 where the first computing device sends a finalize interaction notification to the network computing device. For example, the viewfinder/display area is operable to capture the full code when the first and second portions are aligned properly and communicate the successful alignment and full code with the network computing device.

Figure 16:
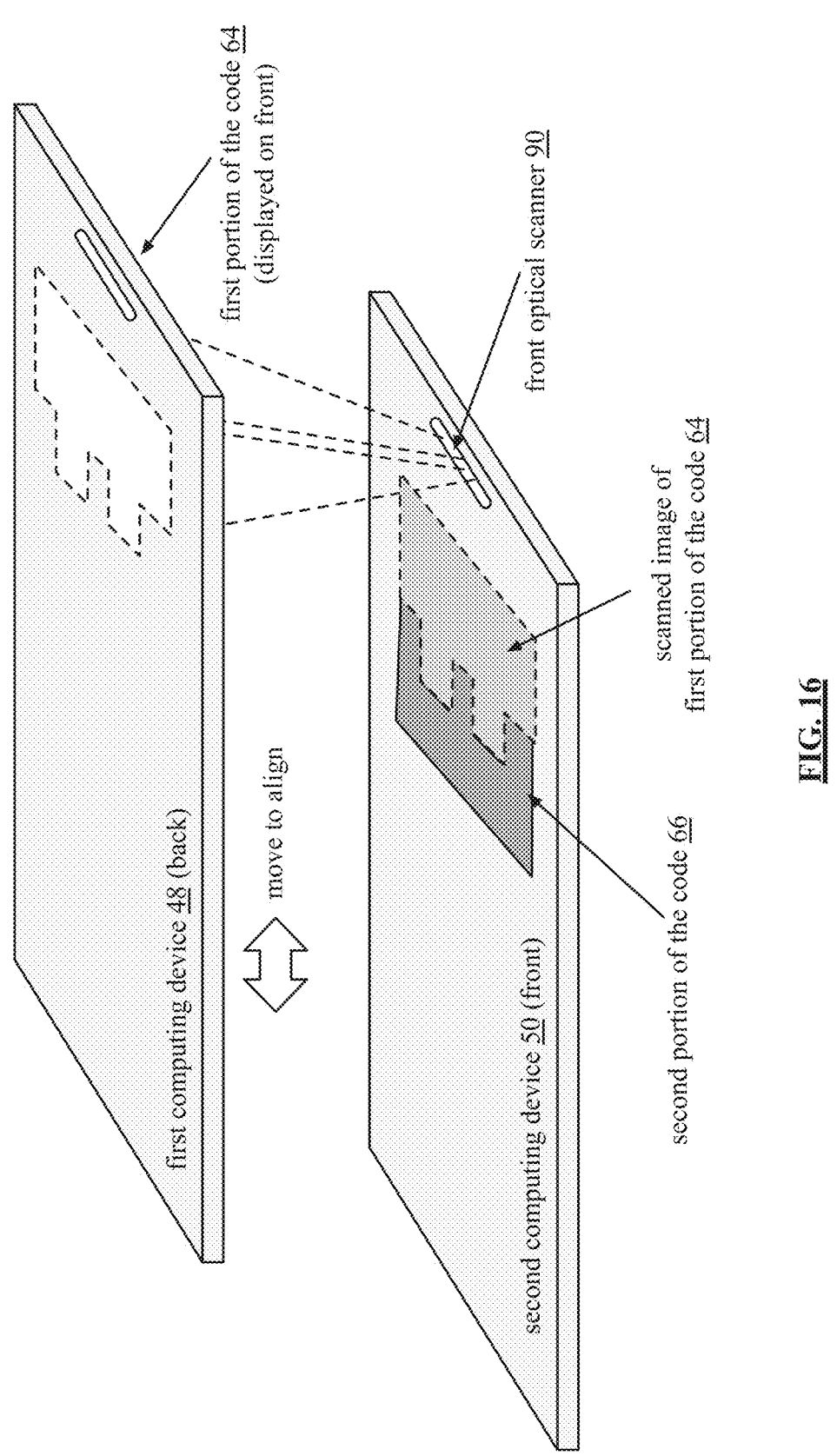
FIG. 16 is a schematic block diagram of an example of a move to align function of a multi-part code system in accordance with the present invention.

FIG. 16 is a schematic block diagram of an example of a move to align function of a multi-part code system that includes the first computing device 48 and the second computing device 50. FIG. 16 operates similarly to FIGS. 13A-15 except that the first computing device 48 completes the move to align function using the using the viewfinder/display area of the second computing device 50 for alignment reference and the viewfinder/display area of the second computing device 50 captures the full code.

In an example of operation, the first computing device 48 receives a first portion of a code 64 from the network computing device. The first portion of the code 64 is displayed in the code display area 86 of the first computing device 48. A user of the first computing device 48 selects an option to display the first portion of the code 64 in the viewfinder/display area 84 of the first computing device 48. In another embodiment, the first portion of the code 64 may be automatically displayed in the viewfinder/display area 84 of the first computing device 48 for the move to align function.

The second computing device 50 receives a second portion of a code 66 from the network computing device. The second portion of the code 66 is displayed in the code display area 86 of the second computing device 50. A user of the second computing device 50 selects an option within the code display area 86 to display the second portion of the code 66 in the viewfinder/display area 84 of the second computing device 50. In another embodiment, the second portion of the code 66 may be automatically displayed in the viewfinder/display area 84 of the second computing device 50 for the move to align function.

The first computing device 48 is placed near (e.g., on top of, hovering over, within a scannable range) the second computing device 50 and face down (e.g., viewfinder/display area 84 to viewfinder/display area 84) such that the front optical scanner 90 of the second computing device 50 scans the viewfinder/display area 84 of the first computing device 50 and a scanned first portion of the code 64 is displayed in the viewfinder/display area 84 of the second computing device 50.

While continuing to scan the viewfinder/display area 84 of the first computing device 48 to display the scanned first portion of the code 64, the user of the first computing device 48 moves the first computing device 48 until the scanned image of the first portion of code 64 aligns with the second portion of the code 66 (e.g., the user is looking at the viewfinder/display area 84 of the second computing device 50 for reference).

For example, the second portion of the code 66 is displayed in the viewfinder/display area 84 of the second computing device 50 in a fixed position. Moving the first computing device 48 moves how the front optical scanner 90 of the second computing device 50 scans the first portion of the code 64 such that the scanned image of the first portion of the code 48 moves on the viewfinder/display area 84 of the second computing device 50.

The viewfinder/display area 84 of the second computing device 50 is operable to capture the full code when the portions are aligned properly and communicate the successful alignment and full code with the network computing device. The network computing device then finalizes the interaction. When the alignment is successful, and the interaction is finalized, a message appears to notify one or more of the users of the first and second computing devices 48-50 that the interaction is complete.

As a specific example, the first portion of the code 64 is a first portion of a ticket (e.g., an airline ticket, concert ticket, sporting event ticket, etc.) and the second portion of the code 66 is a second portion of the ticket. When the first and second portions of the code are aligned, the ticket is verified. The second portion of the code 66 may be generic and the first portion of the code 64 may be specific to the ticketing information. For example, the second computing device 50 is a transportation security administration (TSA) agent ticket scanning device that generates a new portion of a code for each passenger. The portion of the code is unique as far as time-varying information (e.g., timestamp, agent identity, etc.) but contains generic information such as the airport, security line, etc. that is presented to each passenger.

The first portion of the code contains unique information representative of the user of the first computing device's 48 ticket information. However, the ticket information in the first portion of the code cannot be scanned and read individually (e.g., if the first computing device 48 was stolen the first portion of the code would yield no readable information). Only when the two portions of the code are aligned can the information be read properly. The smartphone (the first computing device 48) is placed face down on the agent's ticket scanning device (the second computing device 50) and the user the of the smartphone aligns the portions by shifting the smartphone and viewing the display of the agent's ticket scanning device to gage when the portions are aligned. Further security features such as a biometric scan may be used prior to displaying the portions of the code to either party.

For example, the first computing device 48 is a smartphone and the second computing device 50 is a transportation security administration (TSA) agent ticket scanning device. The second computing device 50 requires a biometric scan (e.g., a fingerprint scan, a facial identification scan, etc.) prior to generating the second portion of the code. The information gained in the biometric scan is used in the generation of the second portion of the code. The user of the first computing device may then be required to perform another biometric scan to unlock the first portion of the code or the first portion of the code includes biometric information to align with the second portion of the code. In this scenario, the person who is attempting to align the portions of code must have a verifiable identity that is linked to the coded information in order to align the portions.

Figure 17:
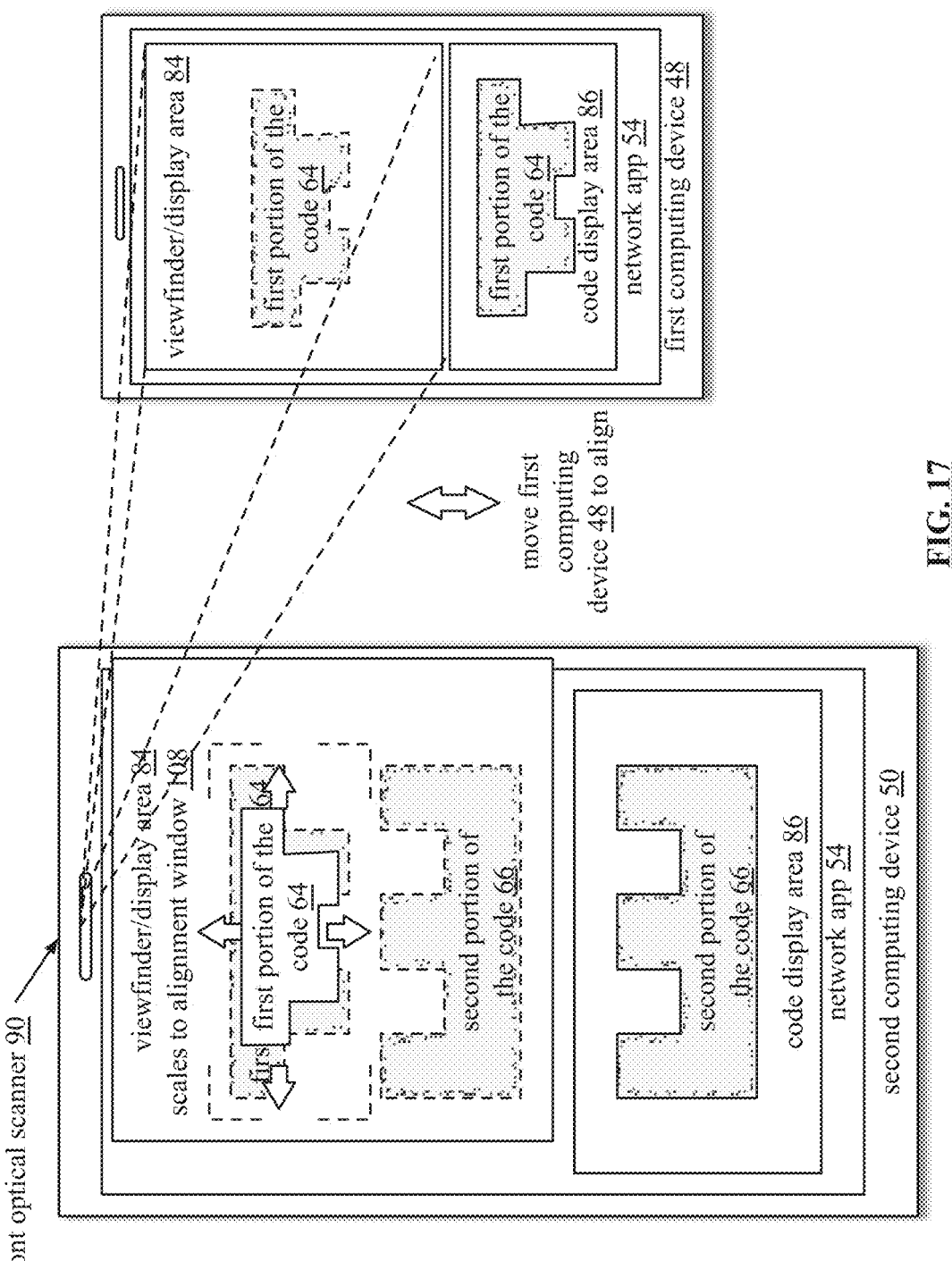
FIG. 17 is a schematic block diagrams of an example of a move to align and scaling function of a multi-part code system in accordance with the present invention.

FIG. 17 is a schematic block diagram of an example of a move to align and scaling function of a multi-part code system that includes the first and second computing devices 48-50. FIG. 17 operates similarly to FIG. 16 except that the viewfinder/display area 84 of the second computing device 50 includes an alignment window 108 and the viewfinder/display area 84 of the first computing device 48 is smaller than the viewfinder/display area 84 of the second computing device 50.

FIG. 17 scales the portion(s) of the code similarly to the example of FIG. 14A except that, the front optical scanner 90 of the second computing device 50 scans the viewfinder/display area 84 of the first computing device 48. In this example, the first portion of the code 64 is too small to align properly with the second portion of the code 66.

The image processing module of the network application 54 auto scales the first portion of the code 64 within the alignment window 108 of the viewfinder/display area 84 of the second computing device 50. The size of the alignment window 108 depends on the dimensions of the second portion of the code 66. In another embodiment, a user of the first or second computing device manually scales the first portion of the code 64 to the size of the alignment window 108 through a touch command (e.g., a two finger touch and expand) conducted in the alignment window of the second computing device 50.

With the first portion of the code 64 scaled to the alignment window 108, the user of the first computing device 48 is able to move the first computing device 48 until the scanned image of the first portion of code 64 displayed in alignment window 108 aligns with the stationary second portion of the code 66. The alignment window 108 moves with the first portion of the code 64.

When the front optical scanner 90 of the second computing device 50 scans the viewfinder/display area 84 of the first computing device 48 and the first portion of the code 64 is too large to align properly with the second portion of the code 66, a similar process occurs to automatically or manually scale the too-large first portion of the code 64 in the alignment window 108 of the second computing device 50.

FIG. 18 is a flowchart of an example of a method for a move to align function of a multi-part code system. The method begins with step 122 where a first computing device of the multi-part code system receives a first portion of a code from a network computing device of the multi-part code system via a network application. The network application associates the first computing device with the network computing device of the multi-part code system.

The network application includes an image processing module that includes image processing and encoding/decoding circuitry to analyze optically scanned (e.g., via optical scanner(s)), saved (e.g., a screenshot of a code, a code stored in a memory) or otherwise detected image data such as graphical coded representations of data. The network computing device generated the first portion of the code for an interaction between the first and second computing devices. The network computing device generated the first portion of the code for an interaction between the first computing device and a second computing devices.

The method continues with step 124 where the first computing device displays the first portion of the code in a viewfinder/display area of an interactive display of the network application for a move to align function. For example, the first portion of the code is displayed in a code display area of the interactive display of the network application. A user of the first computing device selects the first portion of the code from the code display area for the move to align function where the selection displays the first portion of the code in the viewfinder/display area of the first computing device. As another example, the first portion of the code is automatically displayed in the viewfinder/display area of the first computing device based on the interaction information (e.g., the first portion of the code was specifically generated for a move to align function).

The method continues with step 126 where the user positions the viewfinder/display area of first computing device near an optical scanner of the second computing device. For example, the second computing device includes a front optical scanner (e.g., a camera) on the same surface as a viewfinder/display area of the second computing device. The user of the first computing device turns the first computing device over such that the viewfinder/display area of the first computing device is facing the viewfinder/display area and the front optical scanner of the second computing device. The second computing device displays a second portion of the code in the viewfinder/display area of the second computing device. The network computing device generated the second portion of the code for the interaction between the first and second computing devices.

The positioning scans and displays the first portion of the code in the viewfinder/display area of the second computing device. Displaying the first portion of the code may include scaling the first portion of the code to an alignment window of the viewfinder/display area of the second computing device such that the first and second portions of the code are sized correctly for alignment. The method continues with step 128 where the user positions the first computing device near the second computing device such that the first and second portions of the code align in the viewfinder/display area of the second computing device to produce the code.

The method continues with step 130 where the second computing device sends a finalize interaction notification to the network computing device. For example, the viewfinder/display area of the second computing device is operable to capture the full code when aligned properly and communicate the successful alignment and full code with the network computing device.

Figure 19A:
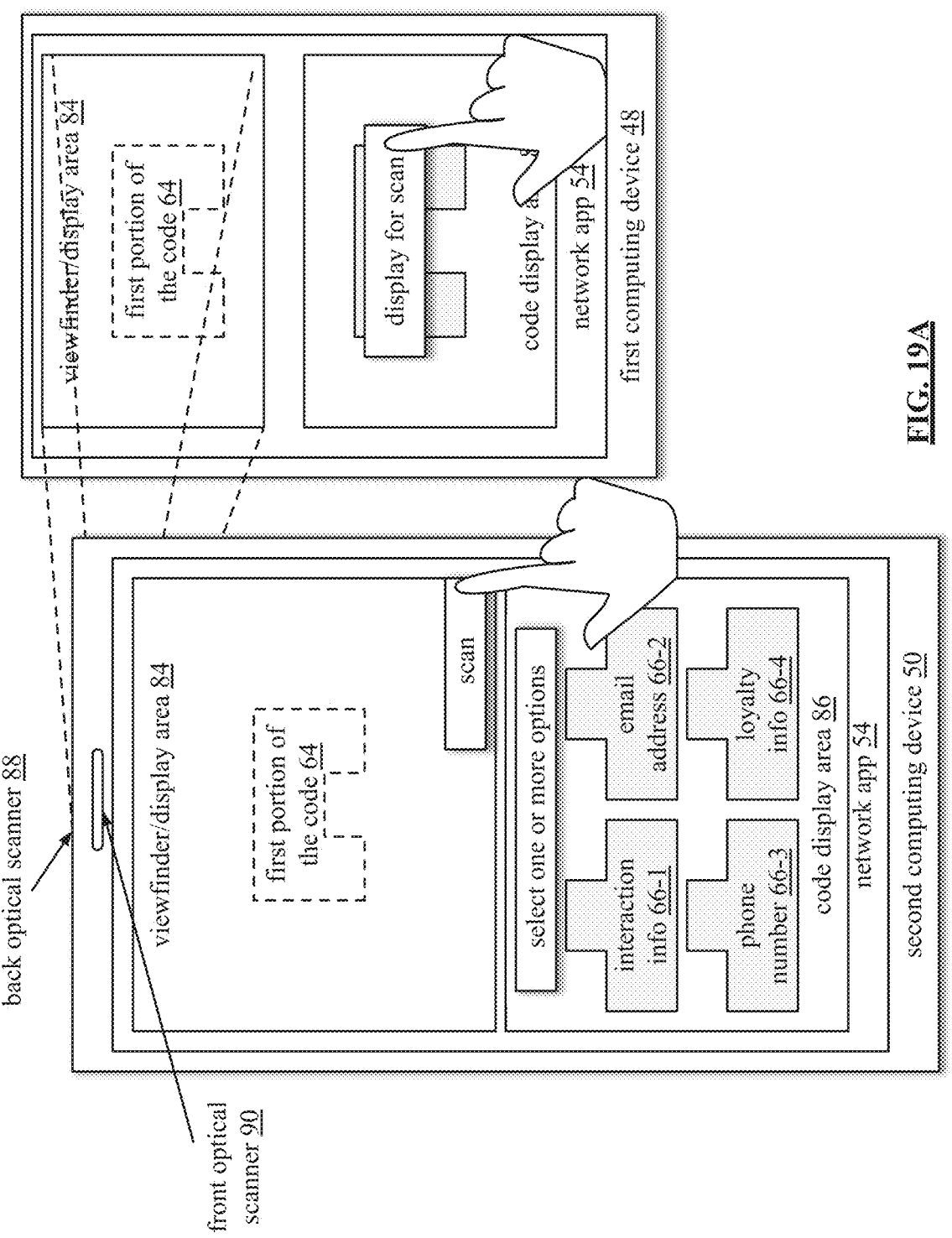
FIG. 19A-19C is a schematic diagram of an example of selecting code portion options for an interaction in accordance with the present invention.
Figure 19B:
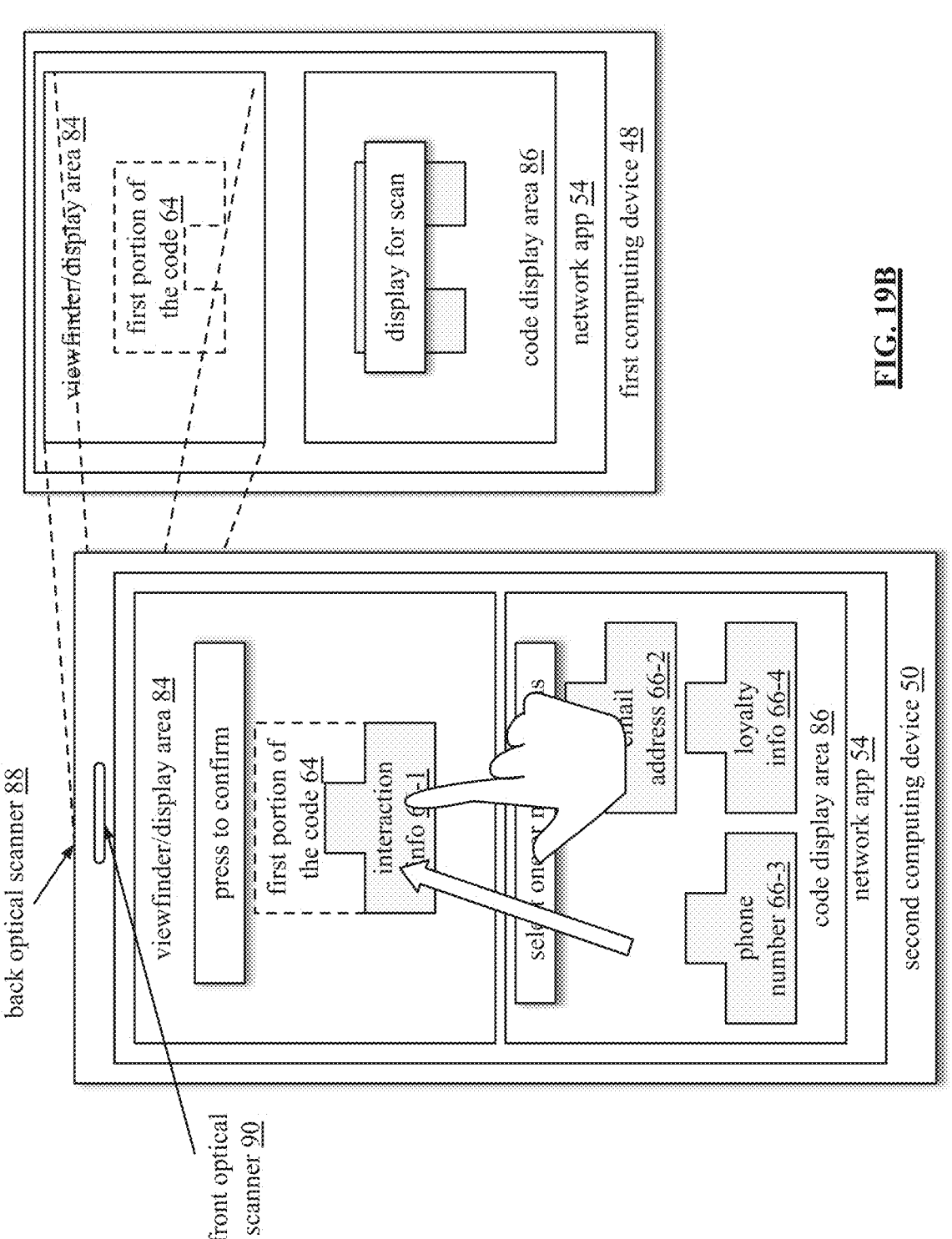
Figure 19C:
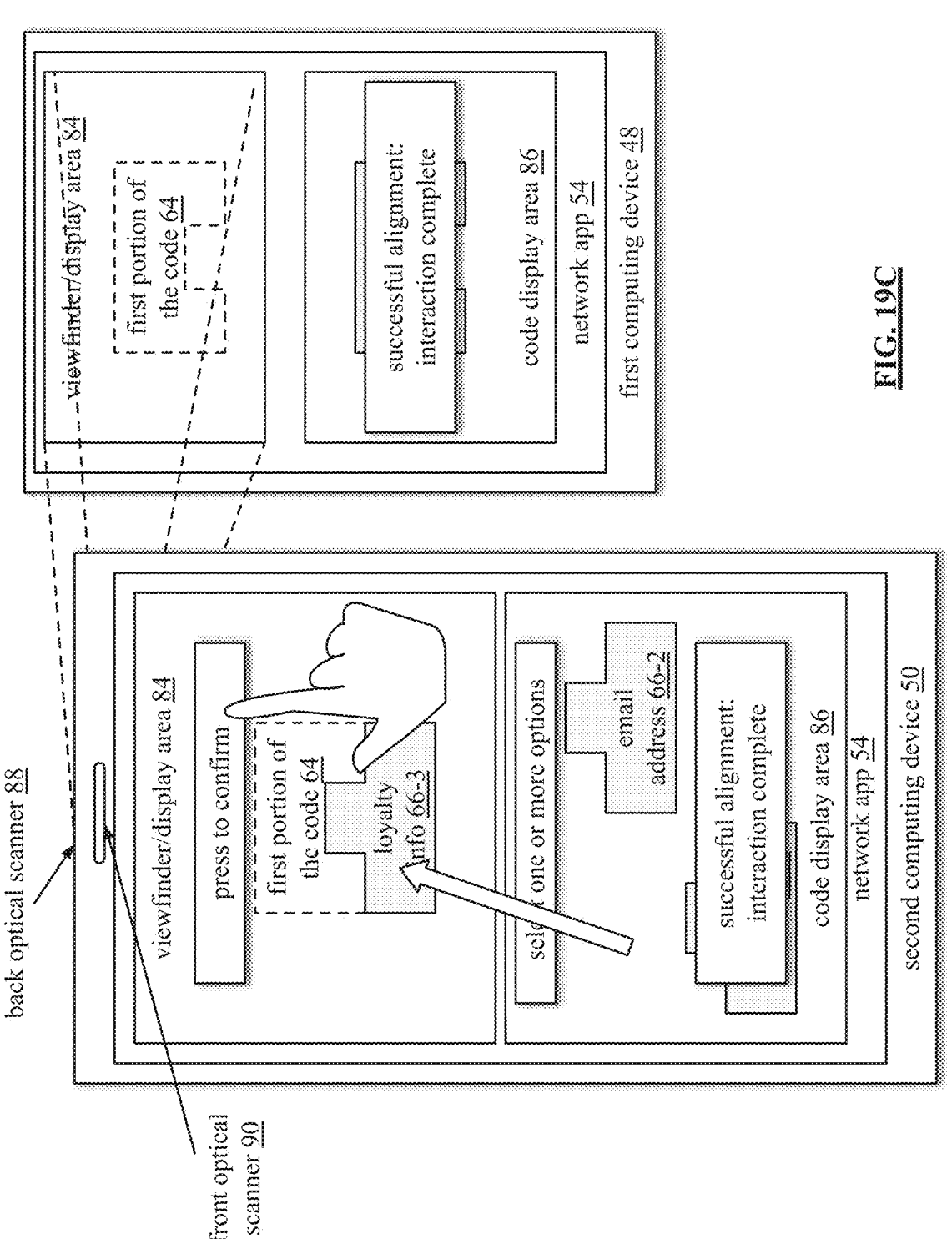

FIGS. 19A-19C are schematic diagrams of an example of selecting code portion options for an interaction. FIGS. 19A-19C operate similarly to the drag and drop alignment function examples of FIGS. 8A-10B except that in FIGS. 19A-19C, the second computing device 50 is presented multiple code portion options to drag and drop with the first portion of the code 64.

In FIG. 19A, the first computing device 48 receives a first portion of a code 64 from the network computing device. The first portion of the code 64 is displayed in the code display area 86 of the first computing device 48. A user of the first computing device 48 selects an option to display the first portion of the code 64 in the viewfinder/display area 84 of the first computing device 48 to allow the user of the second computing device 50 to scan the first portion of the code 64.

A user of the second computing device 50 selects a scan option within the viewfinder/display area 84 of the second computing device 50 to scan the viewfinder/display area 84 of the first computing device 48 using a back optical scanner 88 of the second computing device 50 (e.g., a smartphone camera application). In this example, the viewfinder/display area 84 of the first computing device 48 is scanned by the back optical scanner 88 of the second computing device 50 and the first portion of the code 64 is displayed in the viewfinder/display area 84 of the second computing device 50.

The second computing device 50 receives multiple second portion options of the code 66-1 through 66-4 from the network computing device. The multiple second portion options of the code 66-1 through 66-4 are displayed in the code display area 86 of the second computing device 50. For example, one option is the second portion of the code 66-1 that contains enough information to complete the interaction (e.g., in includes "interaction information"). The other options 66-2 through 66-4 include additional personal information that the user of the second computing device 50 can choose to share.

For example, an optional second portion of the code 66-2 includes an email address, an optional second portion of the code 66-3 includes a phone number, and an optional second portion of the code 66-4 includes loyalty information (e.g., a customer loyalty identifier (ID, frequent flier number, etc.)). Other examples include a known traveler identifier (ID) (e.g., a TSA pre-check number), promotion/discount codes, home address, business address, security information (e.g., answers to a security question), social security number, driver's license number, social media account links, website link, etc. With multiple options, a user can decide how little or how much information he or she would like to share in a particular interaction.

In FIG. 19B, the user of the second computing device 50 drags the interaction information second portion option of the code 66-1 into the viewfinder/display area 84 to align with the first portion of the code 64. Once aligned, the user "drops" (e.g., releases touch) the interaction information second portion option of the code 66-1 into the viewfinder/display area 84 to produce the full code. Because multiple second portion code options are available, the viewfinder/display area 84 displays a confirmation button to the user so that the user can indicate when the code should be captured.

In FIG. 19C, the user of the second computing device 50 drags the loyalty information second portion option of the code 66-3 into the viewfinder/display area 84 on top of the interaction information second portion option of the code 66-1 to align with the first portion of the code 64. Once aligned, the user "drops" (e.g., releases touch) the loyalty information second portion option of the code 66-3 into the viewfinder/display area 84 to produce the full code. In this example, the user does not wish to include any addition information and selects the "press to confirm" button in the viewfinder/display area 84.

The viewfinder/display area 84 is operable to capture the full code when the confirmation is received, the portions are aligned properly, and communicate the successful alignment and full code to the network computing device. The network application verifies that the full code captured contains at least a minimum amount of information to complete the interaction. For example, the user may drag and drop the email address second portion option of the code 66-2 only and attempt to confirm the full code. The viewfinder/display area 84 is operable to capture the full code and recognize that more information is needed. In that scenario, the user would be prompted to drag and drop more options until the minimum amount of information is captured in the full code.

When the full code with at least the minimum amount of information to complete the interaction is captured, the network computing device then finalizes the interaction. When the alignment is successful, and the interaction is finalized, a message appears to notify the user of the second computing device 50 that the interaction is complete.

Figure 20:
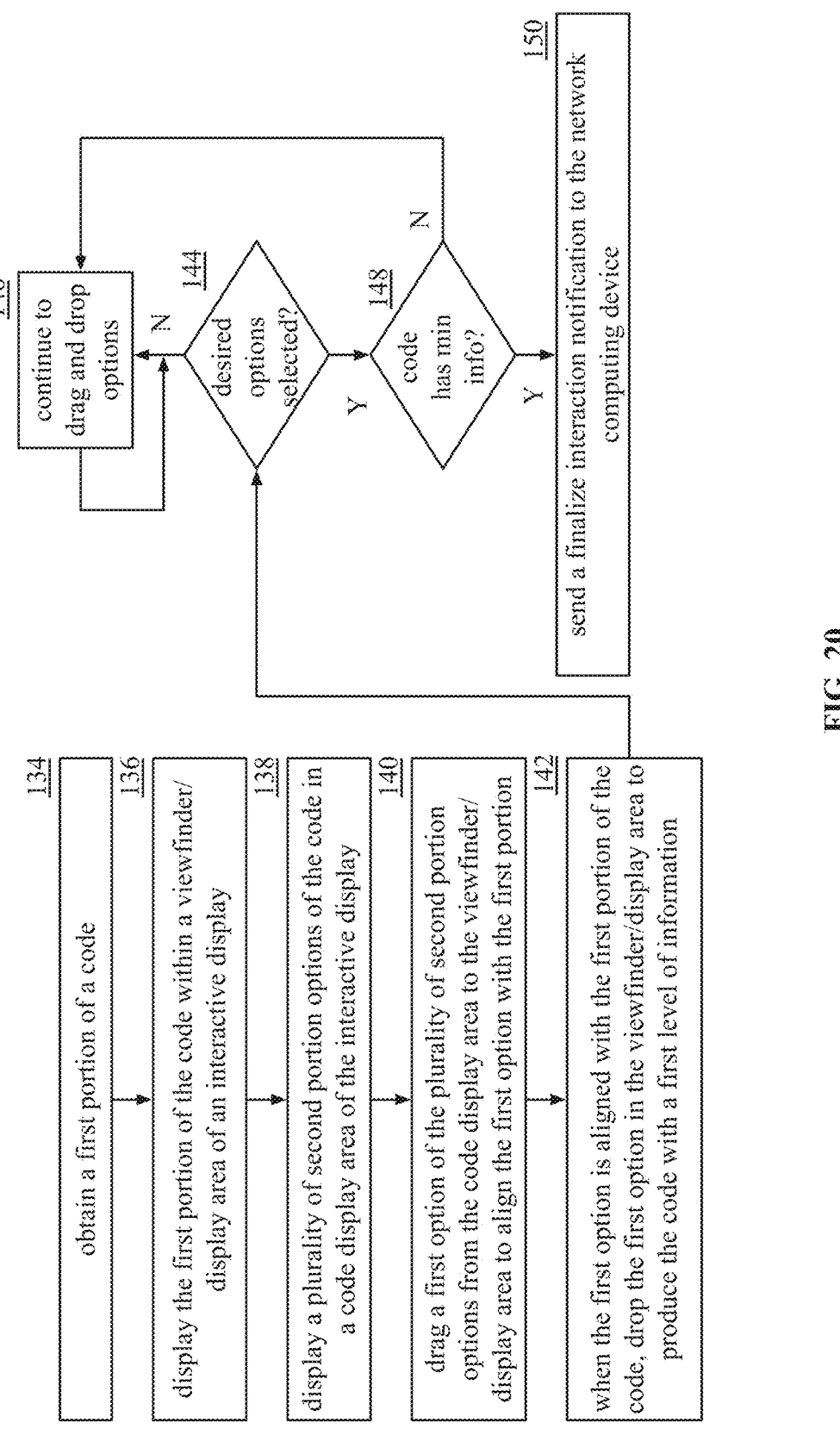
FIG. 20 is a flowchart of an example of a method of selecting code portion options for an interaction in accordance with the present invention.

FIG. 20 is a flowchart of an example of a method of selecting code portion options for an interaction. The method begins with step 134 where a first computing device of the multi-part code system obtains a second portion of a code associated with a second computing device of the multi-part code system. For example, the first computing device scans via an optical scanner, a display of the second computing device to retrieve a scanned image of the second portion of the code. As another example, the first computing device screenshots and/or saves the second portion of the code from a website or email opened on an internet browser application of the first computing device.

The method continues with step 136 where the second computing device displays the first portion of the code in a viewfinder/display area of an interactive display of a network application. For example, the user of the first computing device scans the second portion of the code while the network application is open which displays the second portion of the code in the viewfinder/display area. As another example, the user of the first computing device selects the second portion of the code from storage or another application for upload and display in the viewfinder/display area of the network application. As another example, the network application automatically opens and displays the second portion of the code viewfinder/display area when the second portion of the code is detected in storage or another application (e.g., the network application has access to the first computing device's photo storage such that screenshots of codes or code portions can be detected for immediate use).

The network application associates the second computing device with a network computing device of the multi-part code system. The network application includes an image processing module that includes image processing and encoding/decoding circuitry to analyze optically scanned (e.g., via optical scanner(s)), saved (e.g., a screenshot of a code, a code stored in a memory) or otherwise detected image data such as graphical coded representations of data.

The method continues with step 138 where the second computing device receives a plurality of second portion options of the code for display in a code display area of the interactive display. The network computing device generated the first portion of the code and the plurality of second portion options of the code for an interaction between the first and second computing devices.

The method continues with step 140 where a user of the second computing device drags a first option of the plurality of second portion options of the code from the code display area to the viewfinder/display area to align the first option with the first portion of the code. The first option of the plurality of second portion options of the code includes first information.

The method continues with step 142 where, when the first option is aligned with the first portion of the code, the user drops the first option in the viewfinder/display area to produce the full code with a first level of information. When the desired options are dragged and dropped, the user confirms that the full code with the desired level of information is produced at step 144.

When the desired options have not been dragged and dropped and the user has not confirmed that the full code with the desired level of information has been produced at step 144, the method continues with step 146 where the user continues to drag and drop options. For example, the user of the second computing device drags a second option of the plurality of second portion options of the code from the code display area to the viewfinder/display area to align the second option with the first portion of the code.

The second option of the plurality of second portion options of the code includes second information. When the second option is aligned with the first portion of the code, the user drops the second option in the viewfinder/display area to produce the full code with a second level of information. The second level of information includes the first information and the second information. When a desired amount of options of the plurality of second portion options of the code have been dropped and dragged, the user of the second computing device confirms that the produced code is final at step 144.

The method continues with step 148 where the network application confirms that a minimum amount of information is present in the produced code to complete the interaction. When the produced code does not have the minimum amount of information present to complete the interaction, the method branches to step 146 where the user is prompted to drag and drop further options. In one embodiment, after enough information is added, the network application may automatically confirm that the full code with enough information is produced thus skipping steps 144 and 148 and continuing with 150 to finalize the interaction.

When the produced code does have the minimum amount of information present to complete the interaction, the method continues with step 150 where the second computing device sends a finalize interaction notification to the network computing device. For example, the viewfinder/display area of the network application is operable to capture the final full code when aligned properly and communicate the successful alignment and full code with the network computing device.

Figure 21A:
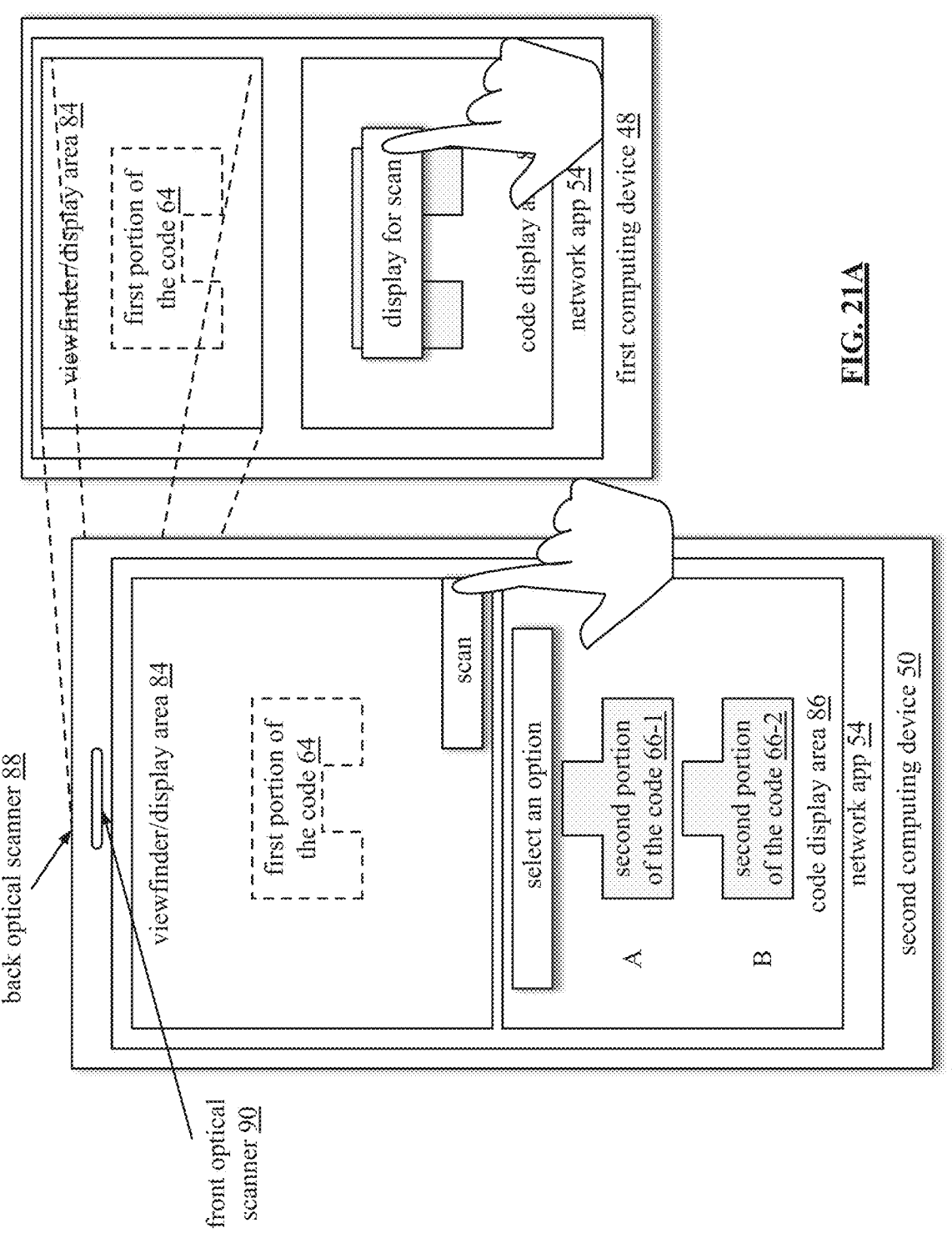
FIGS. 21A-21B are schematic diagrams of an example of selecting a code portion option of a plurality of code portion options for an interaction in accordance with the present invention.
Figure 21B:
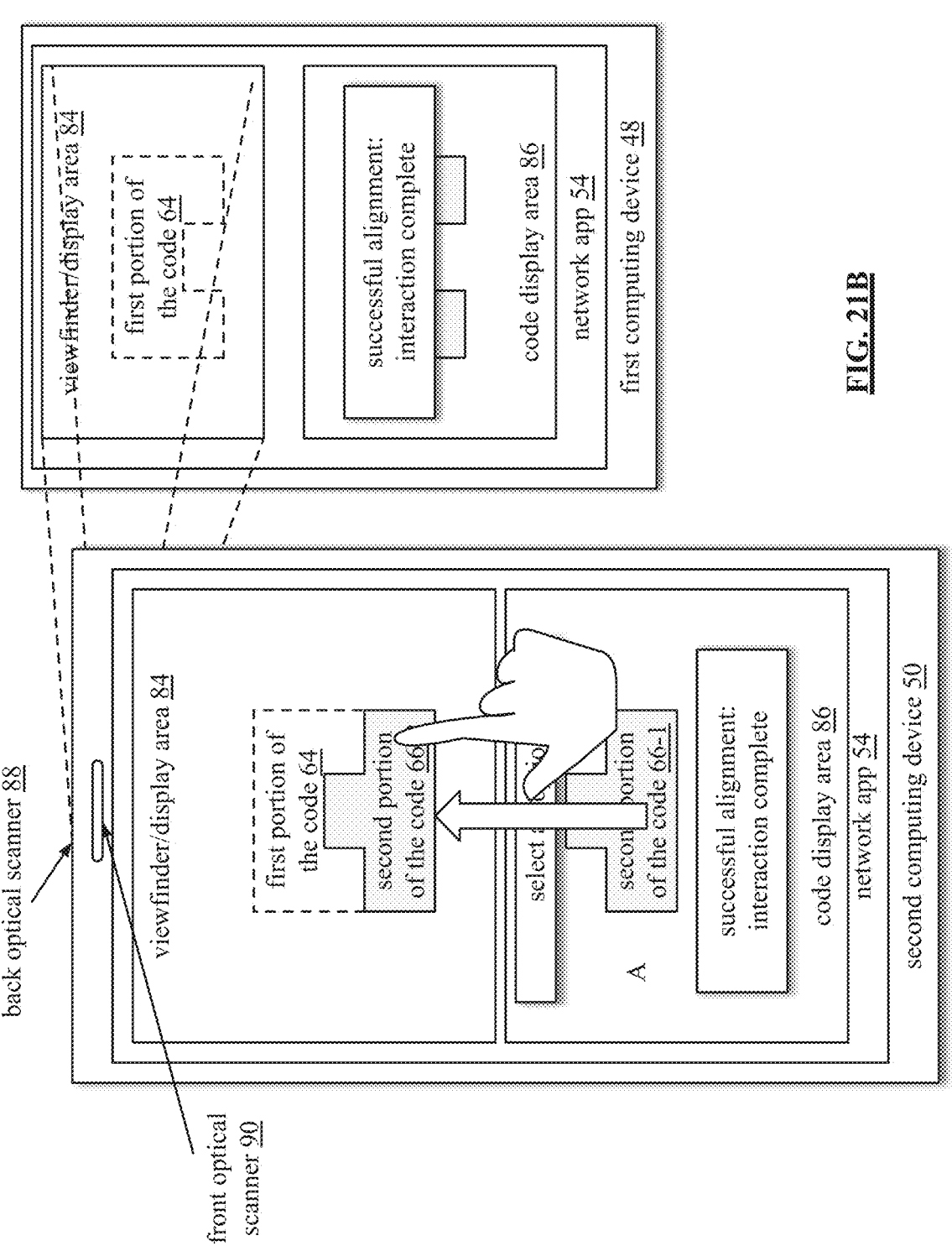

FIGS. 21A-21B are schematic diagrams of an example of selecting a code portion option of a plurality of code portion options for an interaction. FIGS. 21A-21B operate similarly to FIGS. 19A-19C except that a user selects one desired code portion option of multiple code portion options containing varying levels of information.

In FIG. 21A, the first computing device 48 receives a first portion of a code 64 from the network computing device. The first portion of the code 64 is displayed in the code display area 86 of the first computing device 48. A user of the first computing device 48 selects an option within the code display area 86 to display the first portion of the code 64 in the viewfinder/display area 84 of the first computing device 48 to allow the user of the second computing device 50 to scan the first portion of the code 64.

A user of the second computing device 50 selects a scan option within the viewfinder/display area 84 of the second computing device 50 to scan the viewfinder/display area 84 of the first computing device 48 using an optical scanner of the second computing device 50 (e.g., a smartphone camera application). In this example, the viewfinder/display area 84 of the first computing device 48 is scanned by the back optical scanner 88 of the second computing device 50 and the first portion of the code 64 is displayed in the viewfinder/display area 84 of the second computing device 50.

The second computing device 50 receives multiple second portion options of the code 66-1 and 66-2 from the network computing device. The multiple second portion options of the code 66-1 (i.e., option "A") and 66-2 (i.e., option "B") contain varying levels of information. For example, option A is a second portion of the code that contains enough information to complete the interaction and option B includes all of option A's information plus additional personal information such as an email address. The multiple second portion options of the code 66-1 and 66-2 are displayed in the code display area 86 of the second computing device 50.

In FIG. 21B, the user of the second computing device 50 selects the second portion of the code 66-2 (i.e., option B, the second portion of the code containing more information than option A) and drags the second portion of the code 66-2 into the viewfinder/display area 84 to align with the first portion of the code 64. Once aligned, the user "drops" (e.g., releases touch) the second portion of the code 66-2 into the viewfinder/display area 84 to produce the full code. Compared to the example of FIGS. 19A-19C, no confirmation steps are needed to confirm that the desired portions have been selected or to confirm that the produced code contains a minimum amount of information to complete the interaction.

The viewfinder/display area 84 is operable to capture the full code when the portions are aligned properly and communicate the successful alignment and full code to the network computing device. The network computing device then finalizes the interaction. When the alignment is successful, and the interaction is finalized, a message appears to notify the users of one or more of the first and second computing devices 48-50 that the interaction is complete.

Figure 22:
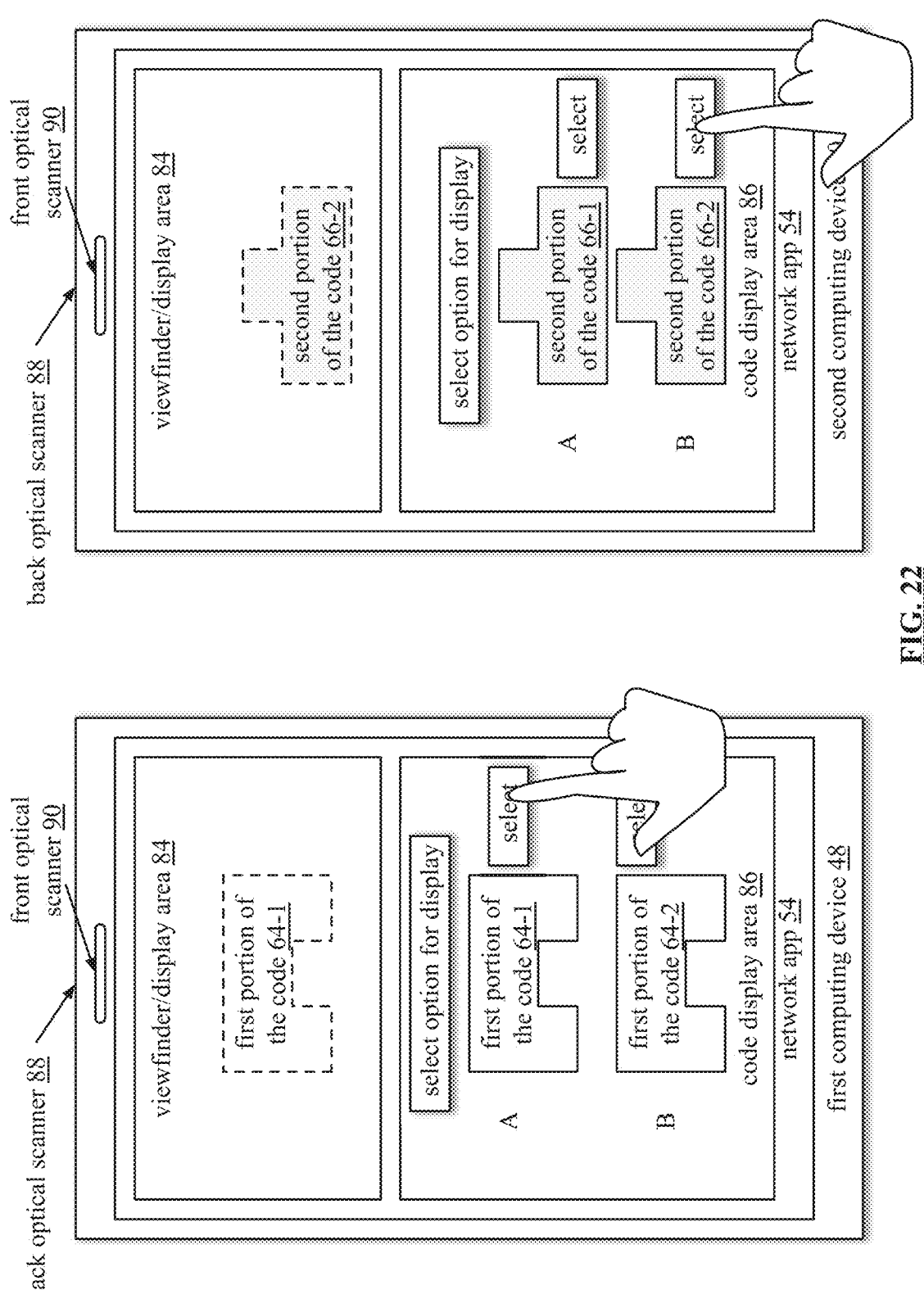
FIG. 22 is a schematic diagram of another example of selecting a code portion option of a plurality of code portion options for an interaction in accordance with the present invention.

FIG. 22 is a schematic diagram of another example of selecting a code portion option of a plurality of code portion options for an interaction. FIG. 22 is similar to FIGS. 21A-21B in that a plurality of code portion options are generated for an interaction between a first and second computing device and one option is selected for alignment. However, FIG. 22 depicts an example of selecting a desired code portion option for a move to align function as opposed to the drag and drop alignment function of previous Figures. The move to align function is discussed in greater detail with reference to FIGS. 13A-18.

In FIG. 22, the first and the second computing devices are sent a plurality of code portion options from the network computing device for an interaction between the first and second computing devices 48-50. In another embodiment, either the first or the second is sent a plurality of code portions options and the other is sent a portion of the code (i.e., only one option). In this example, the first computing device receives a first option of a plurality of first portion options of the code 64-1 (i.e., option "A") and a second option of the plurality of first portion options of the code 64-2 (i.e., option "B"). The plurality of first portion options of the code contain varying levels of information. For example, option A is a first portion of the code that contains enough information to complete the interaction when aligned with a second portion of the code and option B includes all of option A's information plus additional personal information such as an email address.

The first and second options of the plurality of first portion options of the code 64-1 and 64-2 are displayed in the code display area 86 of the first computing device 48. A user of the first computing device 48 selects an option within the code display area 86 for display on the viewfinder/display area 84 of the first computing device 48. For example, the user selects the first portion options of the code 64-1 (i.e., option "A") for display in the viewfinder/display area 84 of the first computing device 48 to engage in a move to align function.

The second computing device receives a first option of a plurality of second portion options of the code 66-1 (i.e., option "A") and a second option of the plurality of second portion options of the code 66-2 (i.e., option "B"). The plurality of second portion options of the code contain varying levels of information. For example, option A is a second portion of the code that contains enough information to complete the interaction with a first portion of the code and option B includes all of option A's information plus additional personal information such as an email address.

The second portion options of the code 66-1 and 66-2 are displayed in the code display area 86 of the second computing device 50. A user of the second computing device 50 selects an option within the code display area 86 for display in the viewfinder/display area 84 of the second computing device 50. For example, the user selects second portion option of the code 66-2 (i.e., option "B") to display in the viewfinder/display area 84 of the second computing device 50 to engage in a move to align function. The move to align function occurs similarly to the examples of either FIG. 13B (where a back optical scanner of one device scans a viewfinder/display area 84 of the other) or FIG. 16 (where a front optical scanner of one device scans a viewfinder/display area 84 of the other).

FIG. 23 is a flowchart of an example of a method of selecting a code portion option of a plurality of code portion options for an interaction. The method begins with step 154 where a first computing device of a multi-part code system receives a plurality of first portion options of a code for display in a code display area of an interactive display area of a network application of the first computing device.

The network application associates the first computing device with the network computing device of the multi-part code system. The network application includes an image processing module that includes image processing and encoding/decoding circuitry to analyze optically scanned (e.g., via optical scanner(s)), saved (e.g., a screenshot of a code, a code stored in a memory) or otherwise detected image data such as graphical coded representations of data. The network computing device generated the plurality of first portion options of the code and a second portion of the code for an interaction between the first computing device and a second computing device.

In another embodiment, the network computing device generated the plurality of first portion options of the code and a plurality of second portion options of the code for an interaction between the first computing device and a second computing device. The second computing device selected and presented its desired second portion option of the code to the first computing device.

The plurality of first portion options of the code individually include enough information to complete the interaction when aligned with the second portion of the code, but different portion options include different levels of additional information. For example, a first option of the plurality of first portion options of the code includes first information (e.g., a minimum amount of information to complete the interaction) and a second option of the plurality of first portion options of the code includes second information. The second information includes the first information plus additional information (e.g., email address, customer loyalty information, phone number, etc.).

The method continues with step 156 where a user of the first computing device selects a desired option of the plurality of first portion options of the code from the code display area for an alignment function based on a desired level of information the user desires to share in the interaction. The alignment function may be a drag and drop alignment or a move to align function. When the alignment function is a drag and drop alignment, the first computing device captures the second portion of the code in the viewfinder/display area of the first computing device (e.g., via a back optical scanner). When the alignment function is the move to align function, the user selects the desired option of the plurality of first portion options of the code from the code display area to display on the viewfinder/display area of the first computing device.

The method continues with step 158 where the desired option of the plurality of first portion options of the code is aligned with the second portion of the code via the alignment function to produce the code having the desired level of information. When the alignment function is the drag and drop alignment, the user of the first computing device drags the desired option to the viewfinder/display area to align with the second portion of the code and drops the desired option in the viewfinder/display area of the first computing device to produce the code having the desired level of information.

When the alignment function is the move to align function, the user of the first computing device positions the first computing device near the second computing device to align the desired option with the second portion of the code. For example, using a back optical scanner of the first computing device to scan the viewfinder/display area of the second computing device and capture the second portion of the code, the user of the first computing device moves the first computing device to align the displayed desired option with the second portion of the code captured in the viewfinder/display area of the first computing device.

As another example, using a front optical scanner of the second computing device to scan the viewfinder/display area of the first computing device and capture the desired option, the user of the first computing device moves the first computing device to align the desired option captured in the viewfinder/display area of the second computing device with the second portion of the code displayed in the viewfinder/display area of the second computing device.

The method continues with step 160 where a finalize interaction notification is sent to the network computing device. For example, the device that captures the produced code having the desired level of information when the portions are aligned properly (e.g., the first or second computing device depending on the alignment function) communicates the successful alignment and produced code to the network computing device.

Figure 24:
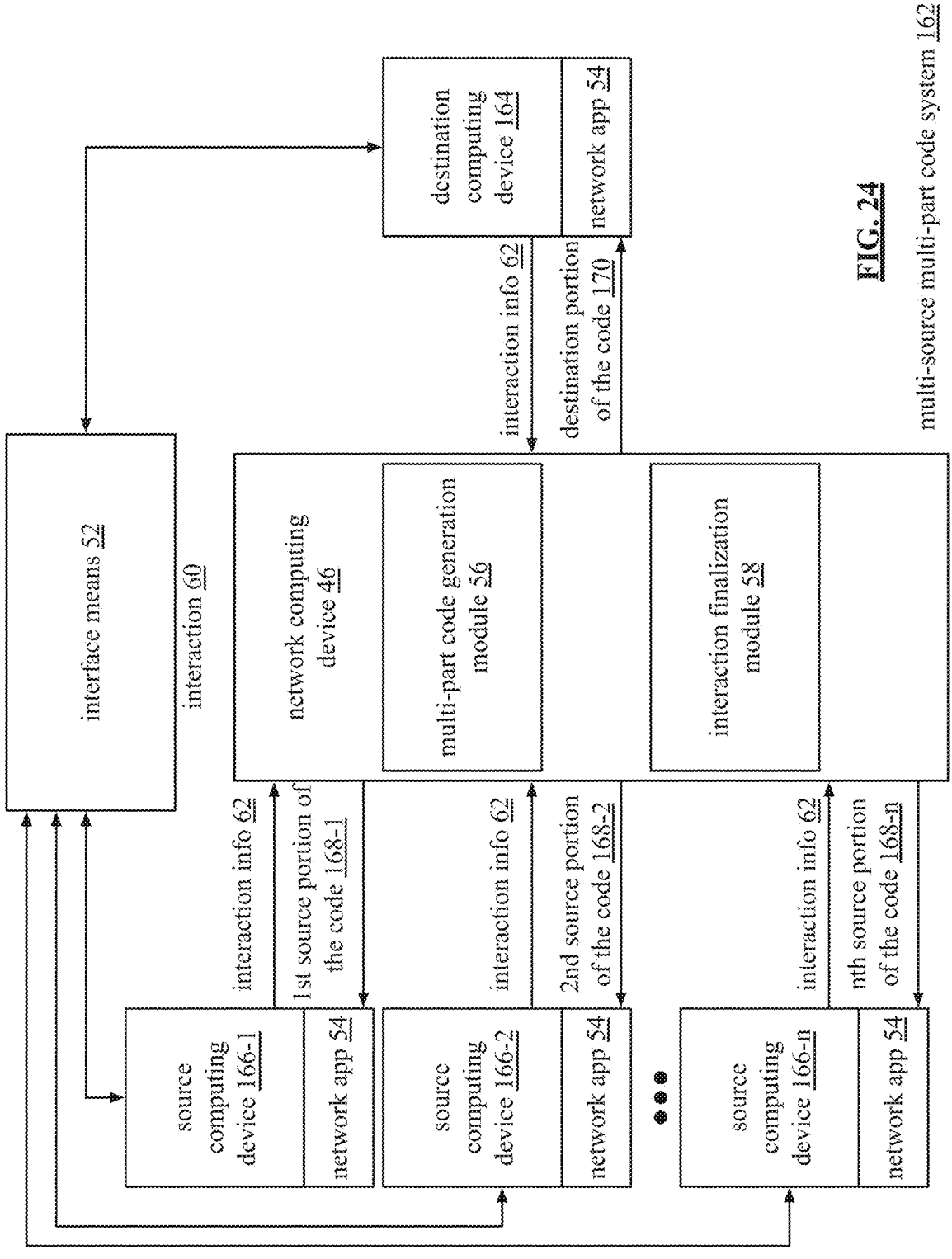
FIG. 24 is a schematic block diagram of an embodiment of a multi-source multi-part code system in accordance with the present invention.

FIG. 24 is a schematic block diagram of an embodiment of a multi-source multi-part code system 162 that includes a network computing device 46, a plurality of source computing devices 166-1 through 166-n, a destination computing device 164, and an interface means 52. FIG. 24 is similar to the multi-part code system of FIG. 3 except that instead of one device (e.g., the first computing device) interacting with another (e.g., a second computing device), here, a plurality of source computing devices 166-1 through 166-n engage in an interaction 60 with the destination computing device 164.

For example, the plurality of source computing devices 166-1 through 166-n are consumer smartphones, the destination computing device 164 is a merchant point-of-sale (POS) device, and the interaction 60 is a split payment from the source computing devices to the destination computing device. As another example, the plurality of source computing devices 166-1 through 166-n are smartphones operated by a married couple or business partners, the destination computing device 164 is a computing device operated by an individual or entity, and the interaction 60 is signing a contract.

In an example of operation, the network computing device 46 receives interaction information ("info") 62 from one or more of source computing devices 166-1 through 166-n and the destination computing device 164. The interaction information 62 is regarding an interaction 60 between the source computing devices 166-1 through 166-n and the destination computing device 164.

For example, the interaction 60 is a payment transaction where the source computing devices 166-1 through 166-*n* are paying the destination computing device 164 for a good or service. One or more of the source computing devices 166-1 through 166-*n* send the network computing device 46 interaction information 62 (e.g., via the network app 54 where the network app 54 is a digital wallet application) such as source computing device identifier(s) (ID), an amount of payment, a desired currency and/or payment method to use, customer loyalty information, a promo code, billing address, etc.

The destination computing device 164 sends the network computing device 46 interaction information 62 (e.g., via the network app 54) such as a destination computing device 164 identifier (e.g., a merchant ID), an amount of payment, a desired form of payment method, discounts offered, etc. The multi-part code generation module 56 of the network computing device 46 generates a plurality of source portions of the code 168-1 through 168-*n* and a destination portion of the code 170 such that the source and destination portions of the code are unusable individually.

Alignment of the destination portion of the code 170 and a plurality of source portions of the code 168-1 through 168-*n* optically produces the code representative of the interaction information 62. The image processing modules of the network applications 54 of one or more of the source computing devices 166-1 through 166-*n* and the destination computing device 164 is operable to detect, capture, and process the optically produced code.

The network computing device 46 sends the source portions of the code 168-1 through 168-*n* to their respective source computing devices 166-1 through 166-*n* and sends the destination portion of the code 170 to the destination computing device 164. The source portions of the code 168-1 through 168-*n* must be aligned with the destination portion of the code 170 through an alignment function of the network application 54 such that the full code is optically produced indicating intent to complete the interaction 60.

The network computing device 46 keeps track of the codes optically produced through the alignment functions such that the interaction 60 is incomplete until the all source portions of the code 168-1 through 168-*n* are aligned properly with the destination portion of the code 170. Alignment of the portions of the code is discussed in greater detail with reference to FIGS. 8A-18 and to FIGS. 24A-24E.

Alternatively, a source computing device 166-1 may be able to complete its particular portion of the interaction with the destination computing device while another source computing device 166-2 is still in the process of completing its interaction with the destination computing device. The overall interaction is incomplete until the all source portions of the code 168-1 through 168-*n* are aligned properly with the destination portion of the code 170, however the source computing device 166-1 receives a notice that the interaction is complete as it does not need to perform any further actions.

For example, when the interaction is signing a contract, the user of the source computing device 166-1 performs an alignment function to complete an interaction indicative of signing the contract. The user of the source computing device 166-1 receives a notification that the signature was successful, but the contract is not complete until the user's spouse or business partner also performs an alignment function to complete the interaction indicative of signing the contract.

As another example, when the interaction is splitting a payment, the user of the source computing device 166-1 performs an alignment function to complete an interaction indicative of paying a portion of the payment. The user of the source computing device 166-1 receives a notification that alignment function was successful, but payment is not withdrawn from the user's account until full payment has been verified (e.g., other source computing devices perform an alignment function to complete the interaction indicative of paying their portion of the payment). For example, if one or more of the other source computing devices do not perform the alignment function to complete the interaction indicative of paying their portion of the payments, the user of the source computing device 166-1 may be notified to pay more or to cancel the shared payment transaction.

When the source portions of the code 168-1 through 168-*n* are aligned properly with the destination portion of the code 170, the optically produced codes have been captured (e.g., via the image processing module of a network application 54), and the codes have been verified to represent all the information necessary to complete the interaction, the interaction finalization module 58 of the network computing device 46 finalizes the interaction 60. For example, the interaction finalization module 58 transfers amounts of money from accounts associated with the source computing devices 166-1 through 166-*n* to an account associated with the destination computing device 164.

If the optically produced code has not been captured, (e.g., after an amount of time has passed before alignment, through an error, etc.), the network computing device 46 may implement one or more remedies. For example, the network computing device 46 generates and delivers a new source and/or destination portion of the code after a certain amount of time has lapsed before proper alignment (e.g., new portions of the code are generated and sent every 30 seconds to one minute prior to alignment).

As another example, the network computing device 46 notifies one or more of the source computing devices 166-1 through 166-*n* and the destination computing device 164 regarding the alignment (e.g., a notification to retry alignment is sent, a query regarding whether to regenerate a new code, a notification of an error pertaining to one or more of the source and destination portions of the code, a notification to perform an alignment function to a device that has failed to complete an alignment function, etc.).

Figure 24A:
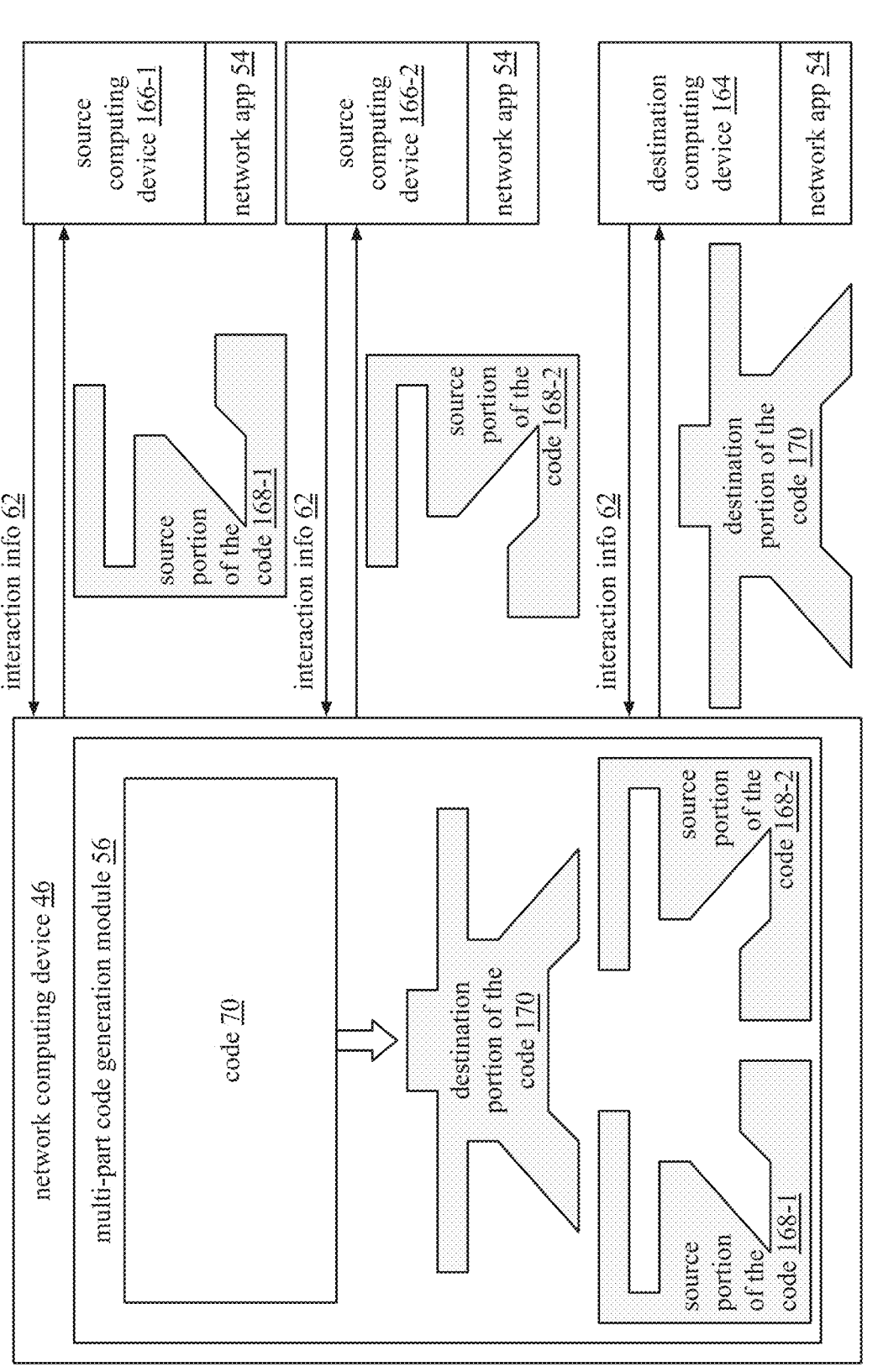
FIGS. 24A-24E are schematic block diagrams of examples of multi-source multi-part codes in accordance with the present invention.

FIGS. 24A-24E are schematic block diagrams of examples of multi-source multi-part codes. In FIG. 24A, the network computing device 46 receives interaction information 62 from the destination computing device 164 and source computing devices 166-1 through 166-2 (where there are only two source computing devices 166-1 through 166-2 in this example). The multi-part code generation module 56 of the network computing device 46 generates a code 70 representative of the interaction information 62.

Based on the number of source computing devices involved and the terms of the interaction information 62, the multi-part code generation module 56 divides the code 70 such that each device has unique pieces that fit together to produce the full code 70. The network computing device 46 sends the destination portion of the code 170 to the destination computing device 164 and the source portions of the code 168-1 through 168-2 to the corresponding source computing devices 166-1 through 166-2.

Figure 24B:
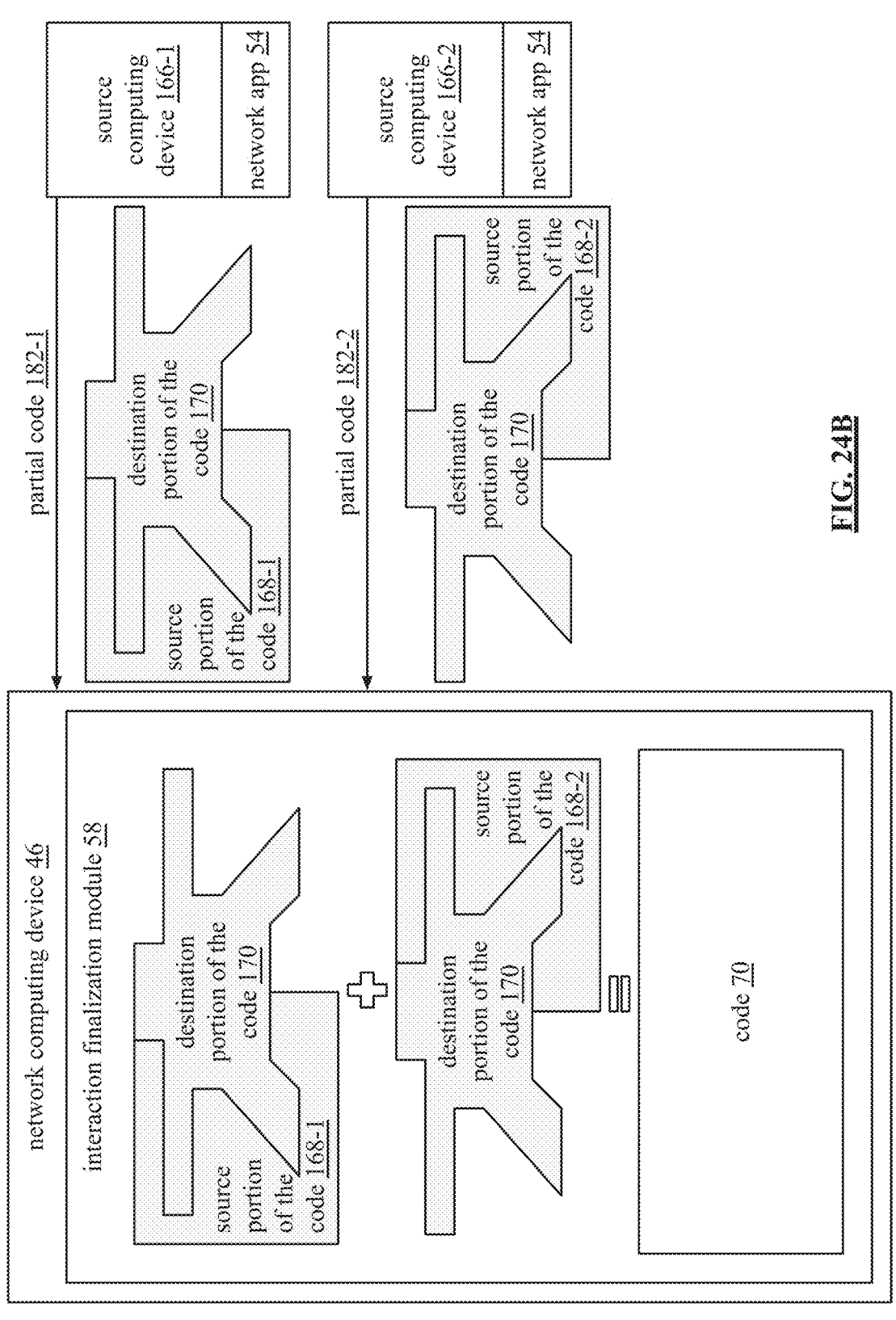

FIG. 24B continues the example of FIG. 24A where the source computing devices 166-1 through 166-2 perform an alignment function to align the source portions of the code 168-1 through 168-2 with the destination portion of the code 170 to produce partial codes 182-1 through 182-2. The image processing technology of the network application 54 captures the partial codes 182-1 through 182-2 and sends the partial code information to the network computing device 46. The interaction finalization module 58 of the network computing device 46 analyzes the partial codes 182-1 through 182-2 received to determine whether the full code 70 is formed by the partial codes. When the full code is formed, the interaction is complete.

Figure 24C:
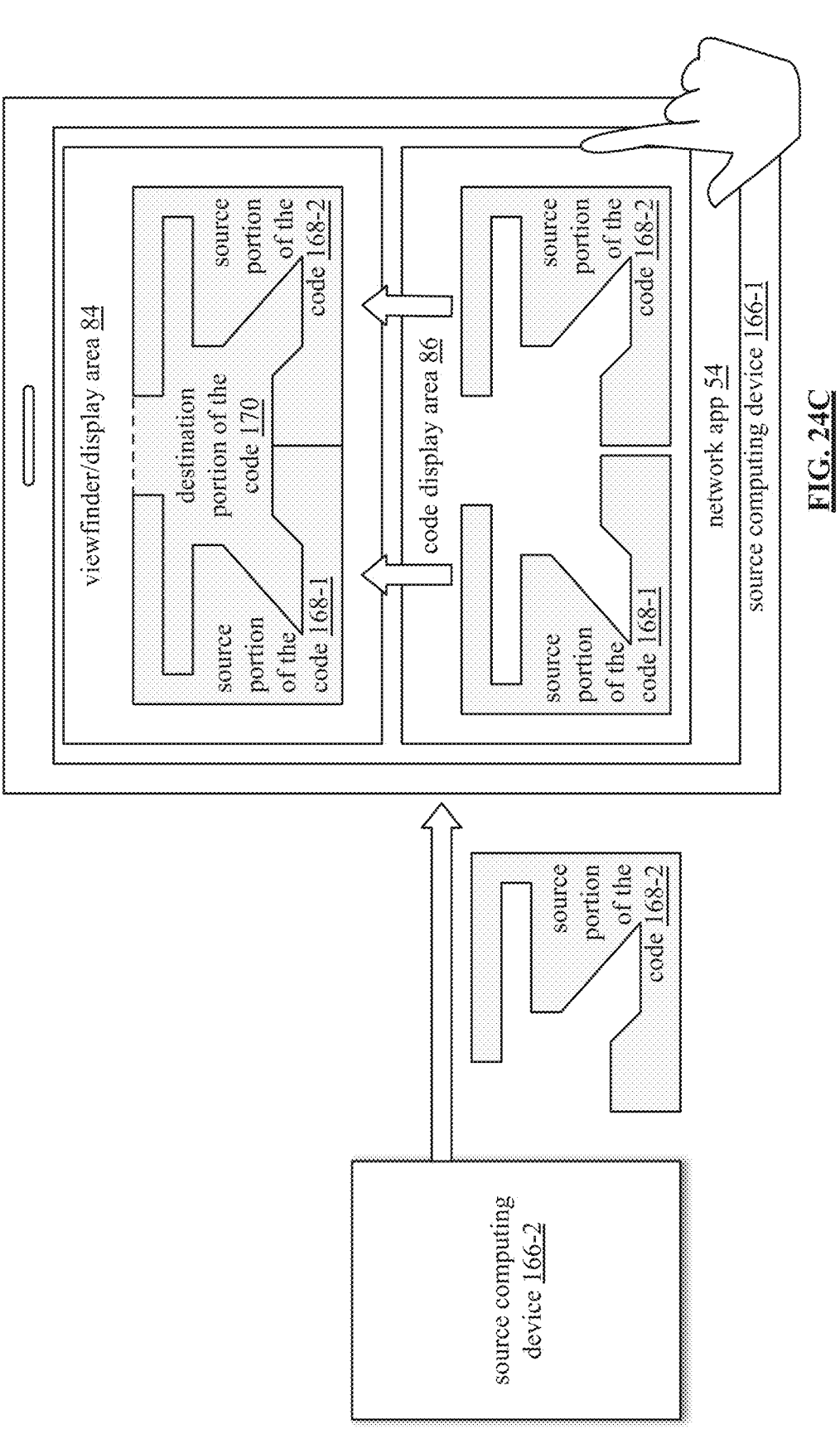

FIG. 24C continues the example of FIG. 24A where the source computing device 166-2 sends its source portion of the code 168-2 to the source computing device 166-1 (e.g., via email, Bluetooth, text message, optical scan by the source computing device 166-1, etc.). The source computing device 166-1 performs an alignment function to align the source portions of the code 168-1 through 168-2 with the destination portion of the codes 170. The network application 54 of the source computing device 166-1 captures the full code produced to complete the interaction.

Figure 24D:
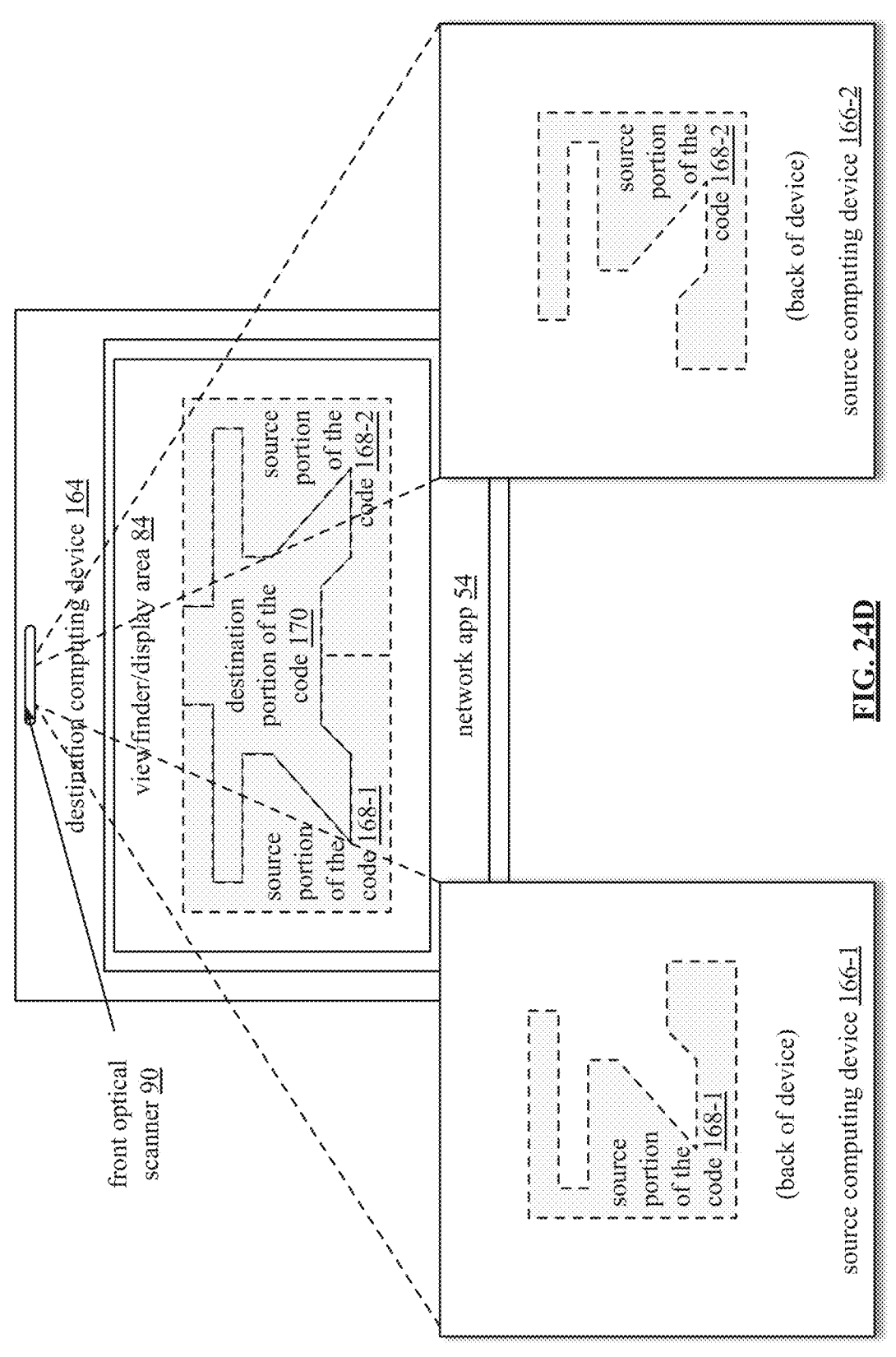

FIG. 24D continues the example of FIG. 24A where the source computing devices 166-1 and 166-2 perform a move to align function similar to the example of FIGS. 16-18. A front optical scanner 90 of the destination computing device 164 scans the source portions of the code 168-1 through 168-2 from the viewfinder/display areas of the source computing devices 166-1 through 166-2 (e.g., the source and destination computing devices are placed display to display).

The users of the source computing devices 166-1 through 166-2 move the source computing devices 166-1 through 166-2 to align the source portions of the code 168-1 through 168-2 with the destination portion of the code 170 in the viewfinder/display area 84 of the destination computing device 164. The network application 54 of the destination computing device 164 captures the full code produced to complete the interaction.

Figure 24E:
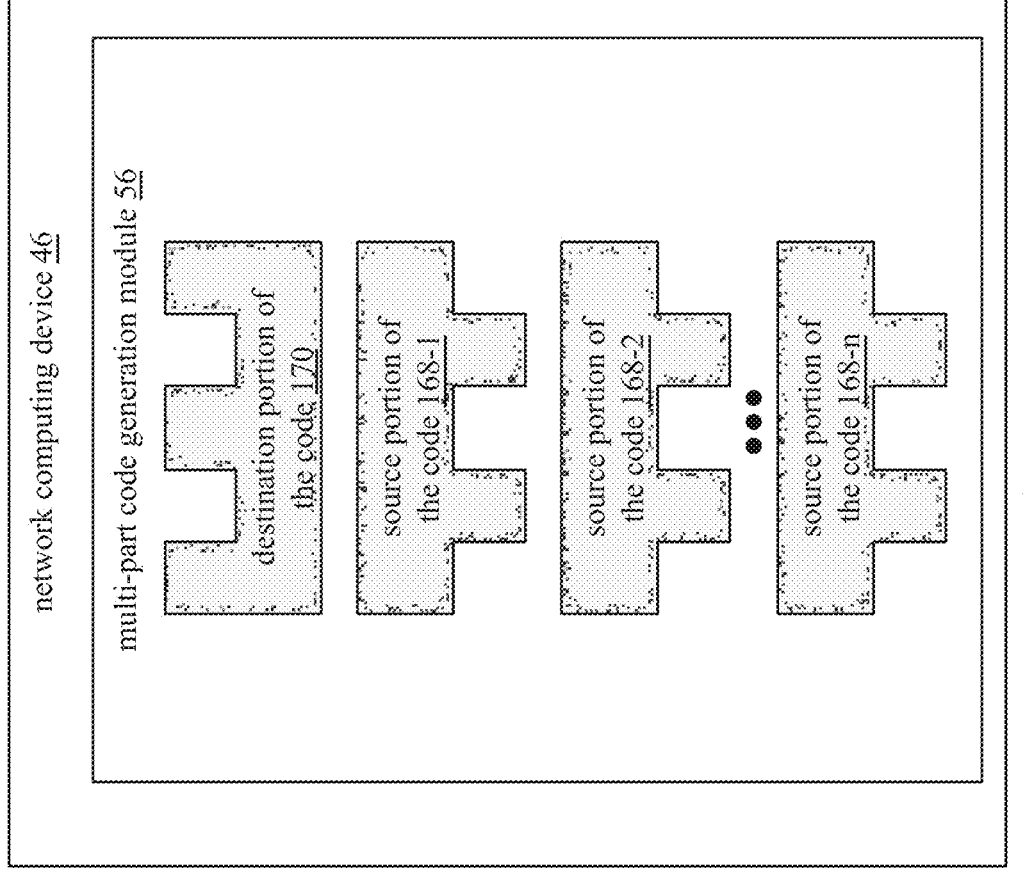

FIG. 24E is an example where the multi-part code generation module 56 of the network computing device 46 generates source portions of the code 168-1 through 168-*n* that do not have a unique shape. For example, the multi-part code generation module 56 first generates the destination portion of the code 170 based on interaction information received from the destination computing device. At this point, the multi-part code generation module 56 does not know how many source computing devices are involved in the interaction. The multi-part code generation module 56 generates a destination portion of the code 170 with a particular shape unrelated to a number of source portions of code.

When the source computing devices obtain the destination portion of the code 170, the source computing devices send the network computing device 46 further interaction information. Based on the further interaction information and the destination portion of the code 170, the multi-part code generation module 56 generates the source portions of the code 168-1 through 168-*n* (e.g., to align with the shape of the destination portion of the code 170).

Figure 25A:
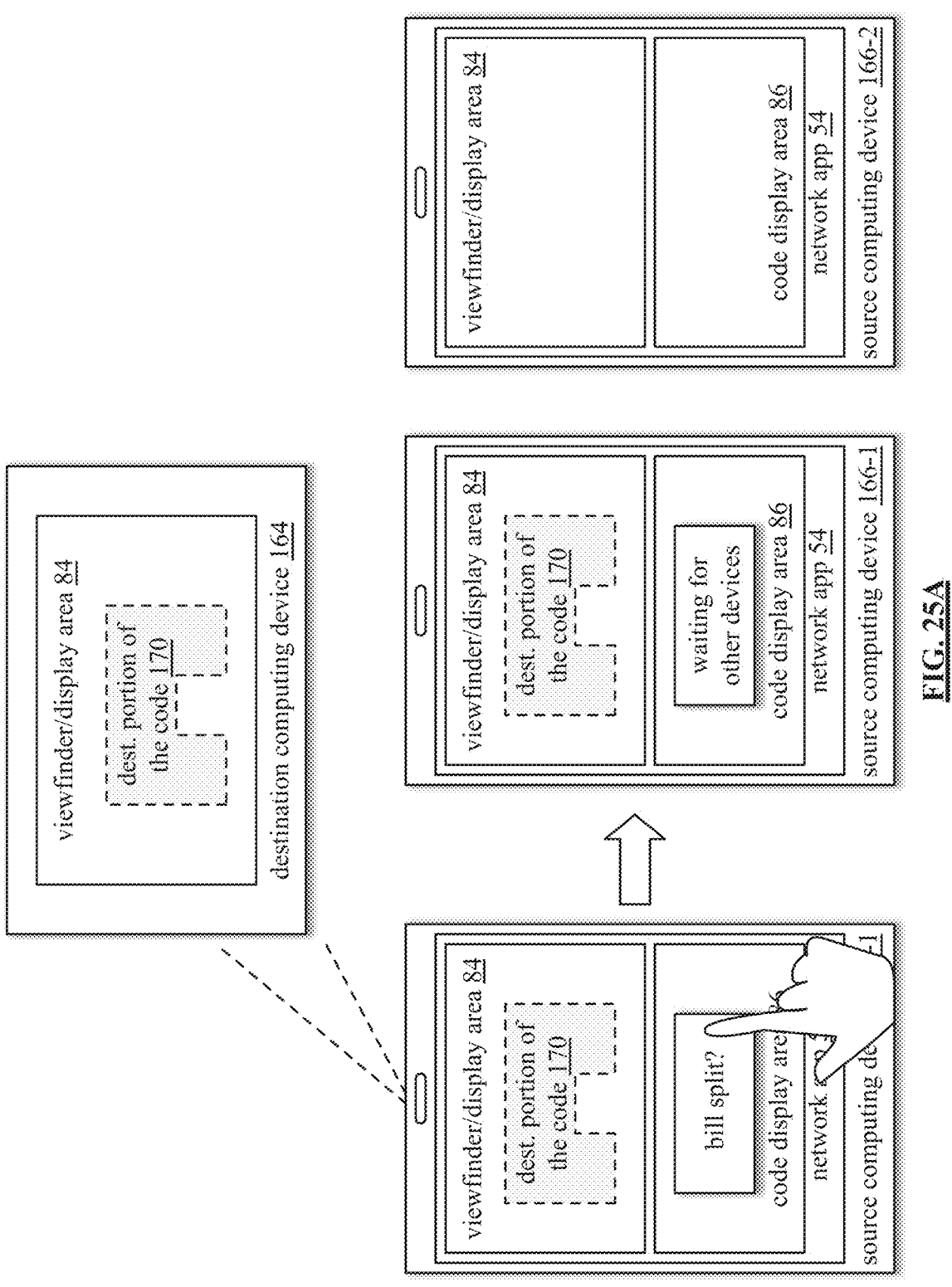
Figure 25B:
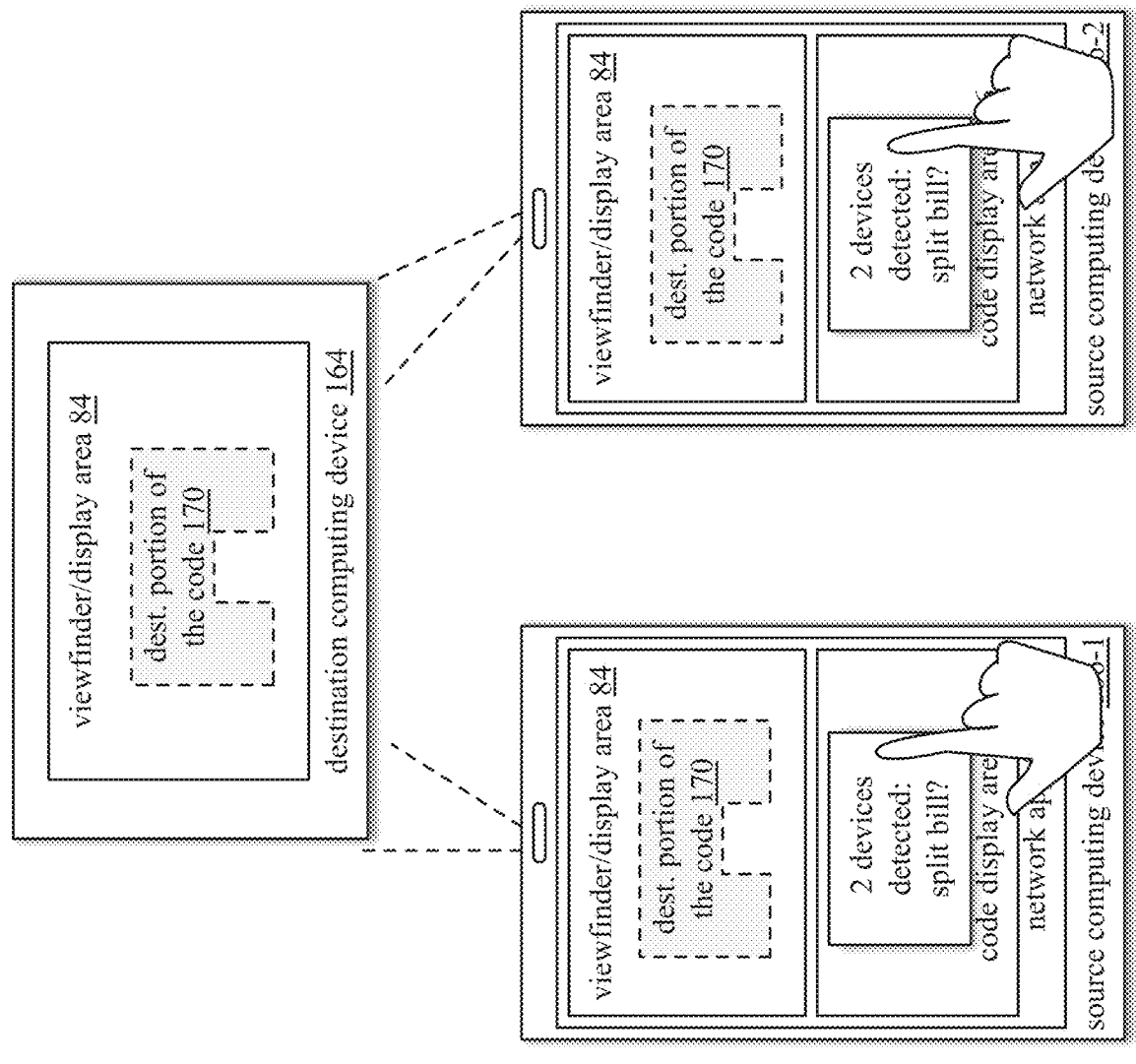
Figure 25C:
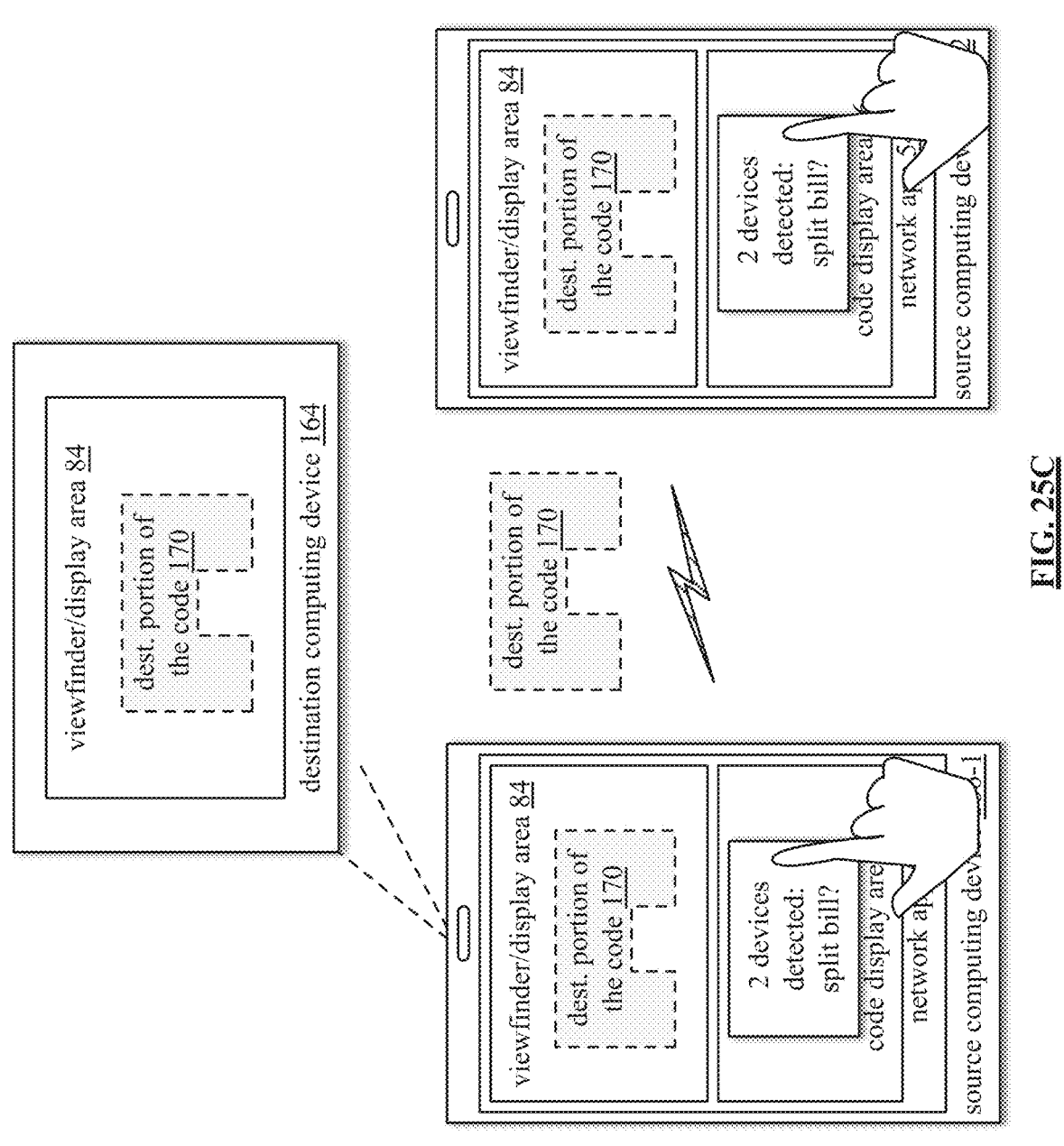

FIGS. 25A-25E are schematic block diagrams of an embodiment of a multi-source multi-part code system that includes source computing devices 166-1 and 166-2 and a destination computing device 164. FIGS. 25A-25C demonstrate an example of a bill splitting interaction where the source computing devices 166-1 through 166-2 are payors and the destination computing device 164 is a payee. For example, the source computing devices 166-1 through 166-2 are smartphones used by patrons of a restaurant and the destination computing device is a point-of-sale computing device (e.g., a register, a tablet, etc.) used by a restaurant employee to generate and settle a bill. As another example, the source computing devices 166-1 through 166-2 are smartphones used by consumers of a retail store and the destination computing device is a point-of-sale computing device (e.g., a register, a tablet, e-commerce platform, etc.) used to complete a checkout.

In FIG. 25A, the network computing device 46 generates a destination portion of a code 170 based on interaction information received from the destination computing device 164 (e.g., a merchant identifier (ID), a desired payment method, an amount owed, items purchased, discounts, etc.) and sends it to the destination computing device 164 via the destination computing device 164's network application 54. The destination computing device 164 displays the destination portion of a code 170 to the source computing devices 166-1 through 166-2 (e.g., to obtain via optical scanning).

For example, the destination computing device 164 displays the destination portion of a code 170 on a viewfinder/display area 84 of the destination computing device 164. As another example, the destination computing device 164 prints the destination portion of a code 170 onto a scannable surface (e.g., a paper receipt). In another example, the destination computing device 164 delivers the destination portion of a code 170 to the source computing devices 166-1 through 166-2 through an interface means such a network connection (e.g., via email, text message, etc.).

In this example, the first source computing device 166-1 scans (e.g., via a front or back optical scanner such as a smartphone camera application) the destination portion of the code 170 (e.g., directly from the viewfinder/display area 84 of the destination computing device 164, from a receipt, etc.) which displays the destination portion of the code 170 in the viewfinder/display area 84 of the first source computing device 166-1.

The first source computing device 166-1 enables a bill splitting application of the network application 54. When enabled, the network application 54 waits for other devices to scan or otherwise receive the destination portion of the code 170.

In FIG. 25B, the source computing device 166-2 scans (e.g., via a front or back optical scanner such as a smartphone camera application) the destination portion of the code 170 (e.g., directly from the viewfinder/display area 84 of the destination computing device 164, from a receipt, etc.) and displays the destination portion of the code 170 in the viewfinder/display area 84 of the source computing device 166-2. The source computing device 166-2 enables a bill splitting application of the network application 54. When enabled, the network application 54 generates a message that two devices have been detected for the bill splitting application and asks whether to proceed with splitting the bill.

The network application 54 is operable to detect devices for the bill splitting application based on which devices have uploaded the destination portion of the code 170. In this example, both the source computing device 166-1 and the source computing device 166-2 select the option to split the bill between the two devices. Alternatively, the source computing device 166-1 and the source computing device 166-2 wait for additional devices to be detected. If no other devices are detected after a period of time, an error message is sent indicating that the bill splitting application cannot be used or to retry after a certain time period.

FIG. 25C illustrates an alternative example of the source computing device 166-2 receiving the destination portion of the code 170. In this example, the source computing device 166-1 sends the source computing device 166-2 the destination portion of the code 170 via a connection (e.g., a Bluetooth link, email, SMS text message, etc.). The source computing device 166-2 displays the destination portion of the code 170 in the viewfinder/display area 84 of the source computing device 166-2 (e.g., the source computing device 166-2 screenshots and/or saves the destination portion of the code 170 for upload to the network application 54).

The source computing device 166-2 enables a bill splitting application of the network application 54. When enabled, the network application 54 generates a message that two devices have been detected for the bill splitting application and asks whether to proceed with splitting the bill. In this example, both the first source computing device 166-1 and the second source computing device 166-2 select the option to split the bill between the two devices. Alternatively, the first source computing device 166-1 and the second source computing device 166-2 wait for additional devices to be detected.

Figure 25D:
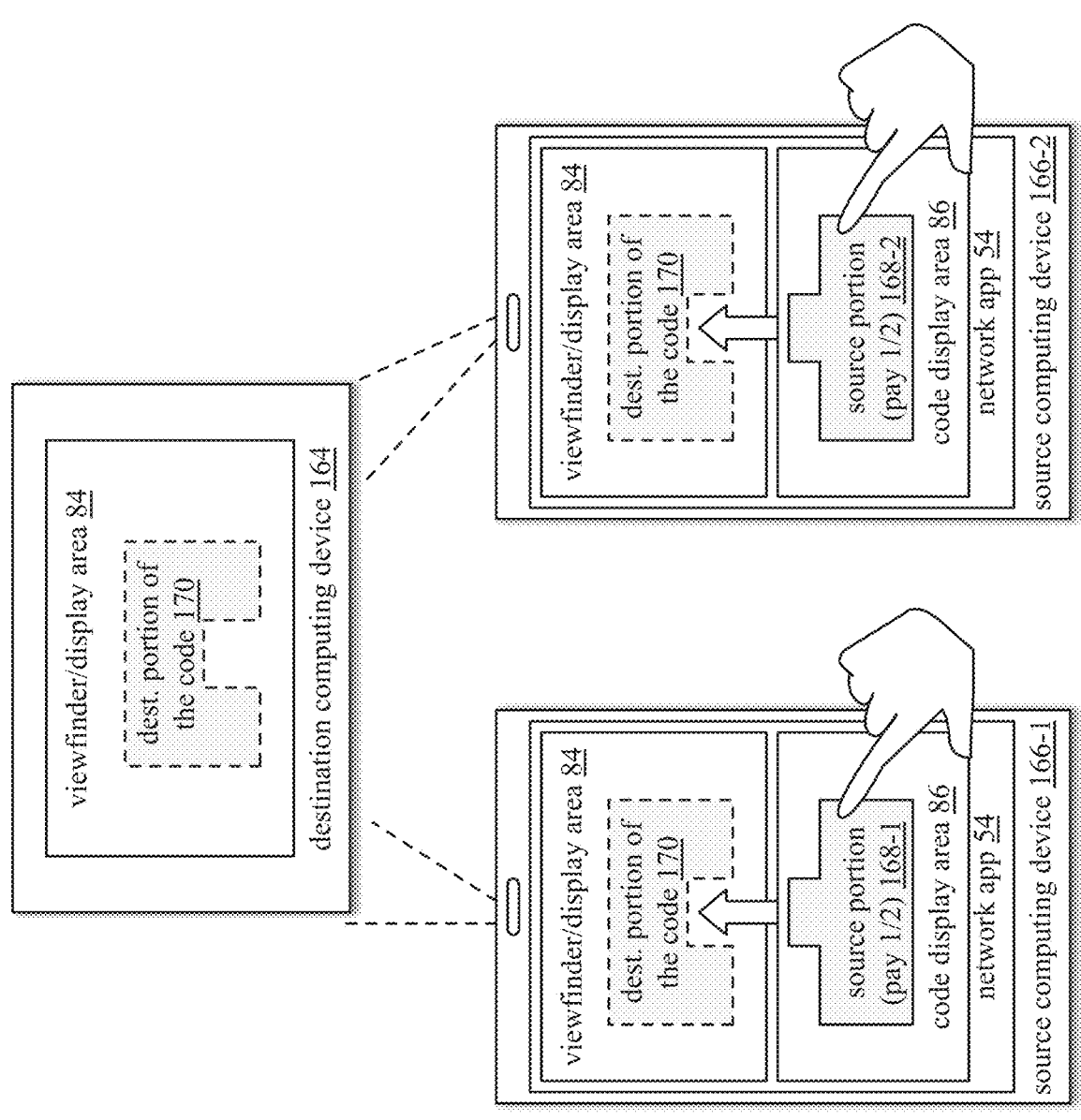

In FIG. 25D, the network computing device generates a first source portion of the code 168-1 based on interaction information to split a payment to the destination computing device 164 equally with the second source computing device 166-2 and based on the destination portion of the code 170. The network computing device generates a second source portion of the code 168-2 based on interaction information to split the payment to the destination computing device 164 equally with the first source computing device 166-1 and based on the destination portion of the code 170. The network computing device sends the first source portion of the code 168-1 to the first source computing device 166-1 and the second source portion of the code 168-2 to the second source computing device 166-2.

Users of the first and second source computing devices complete an alignment function to align the first and second source portions of the code 168-1 through 168-2 with the destination portion of the code 170 to complete the interaction. For example, a drag and drop function is shown here, however, a move to align function is also possible when the source computing devices and the destination computing device are physically near each other.

FIG. 25E continues the example of FIG. 25D where the users of the source computing devices 166-1 through 166-2 complete an alignment function to align the source portions of the code 168-1 through 168-2 respectively with the destination portion of the code 170 to complete the interaction. When the portions are aligned, a full code is optically produced and captured by image processing circuitry of the network application 54. The network application 54 communicates with the interaction finalization module 58 of the network computing device 46 to finalize the interaction 60.

For example, the network application 54 of source computing device 166-1 communicates with the interaction finalization module 58 of the network computing device 46 regarding the code captured. For example, the captured and decoded code contains information instructing the interaction finalization module 58 to transfer an amount of money from an account associated with the source computing device 166-1 to an account associated with the destination computing device 164. The captured and decoded code also contains information regarding the bill splitting application (e.g., an amount of source devices, terms of the bill splitting, total amount owed, etc.).

When the interaction is complete, the users are notified that the interaction is complete (e.g., the total bill has been paid). The notification may also include options to end or modify. For example, the user of the source computing device 166-1 is notified that the total bill has been paid and the user wishes to add additional tip. The user of the source computing device 166-1 would press the modify option to request to add the tip. The network computing device generates a new source portion of the code for modification requests. If the modification request lowers the amount paid below the amount owed, an error notification is sent to one or more of the source and destination devices and the request is rejected.

Figure 26A:
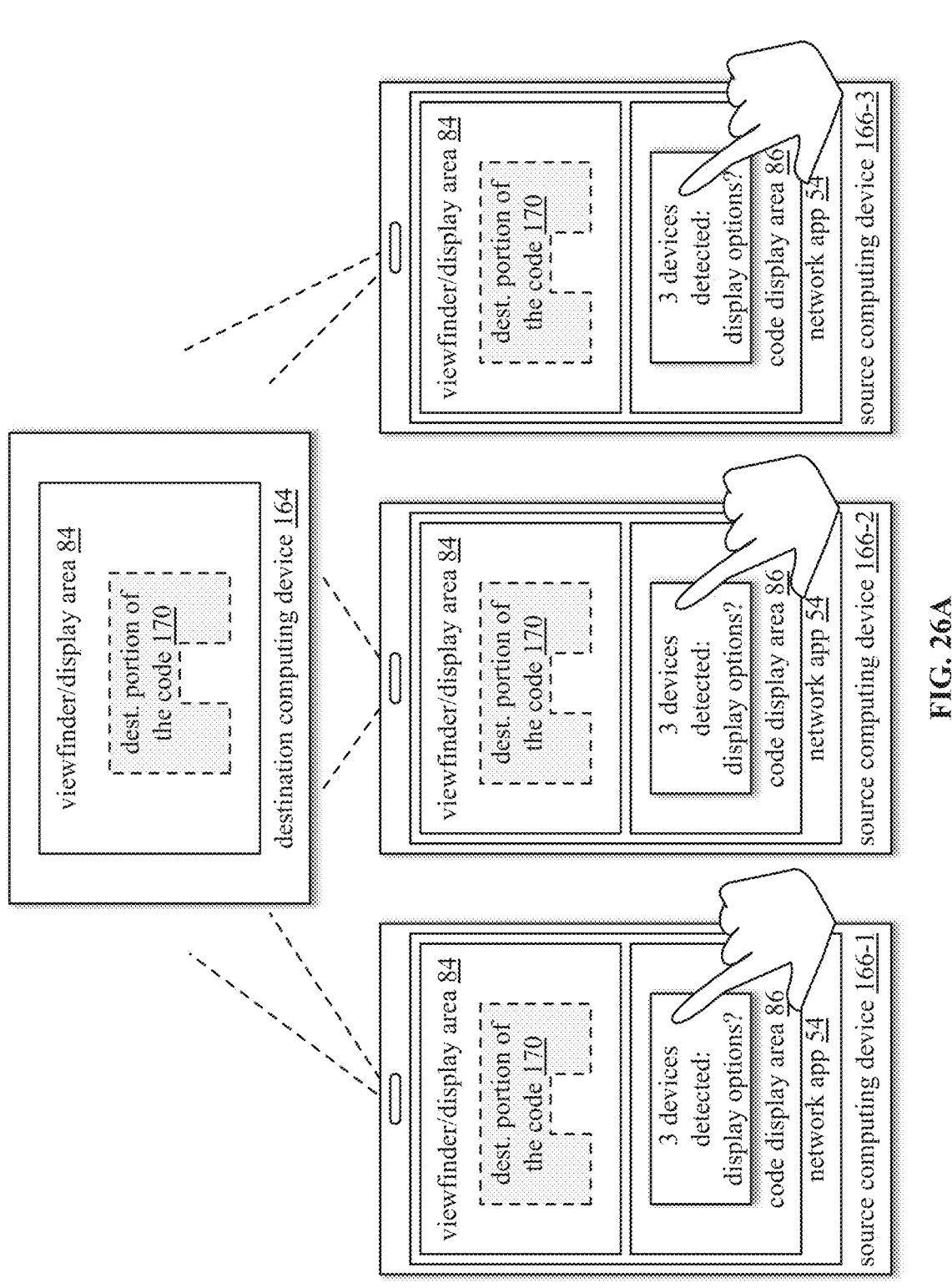

FIGS. 26A-26D are schematic block diagrams of an example of bill splitting options of a multi-source multi-part code system. FIGS. 26A-26D includes source computing devices 166-1 through 166-3. In FIG. 26A, the source computing devices 166-1 through 166-3 have scanned (or otherwise uploaded to the network application 54) the destination portion of the code 170 (e.g., similarly to the example of FIG. 25A).

The network applications 54 recognize that the three source computing devices have uploaded the destination portion of the code 170 and present the source computing devices 166-1 through 166-3 the ability to display different bill splitting options. In this example, the users of the source computing devices 166-1 through 166-3 select to have bill split options displayed. In another embodiment, uploading the destination portion of the code 170 by the source computing devices 166-1 through 166-3 engaged in a bill splitting function, automatically generates source portions of the code based on user agreed or default settings (e.g., a split equally default setting).

FIG. 26B continues the example of FIG. 26A and shows an example of bill split options displayed in the code display areas 86 of the source computing devices 166-1 through 166-3. In this example, the options include: split the bill equally (e.g., based on the amount of source devices detected), split a 20% tip equally (or other tip amount set by the parties, or by a default setting), enter a custom amount, and enter a custom tip. The bill split options includes a confirmation button.

Figure 26D:
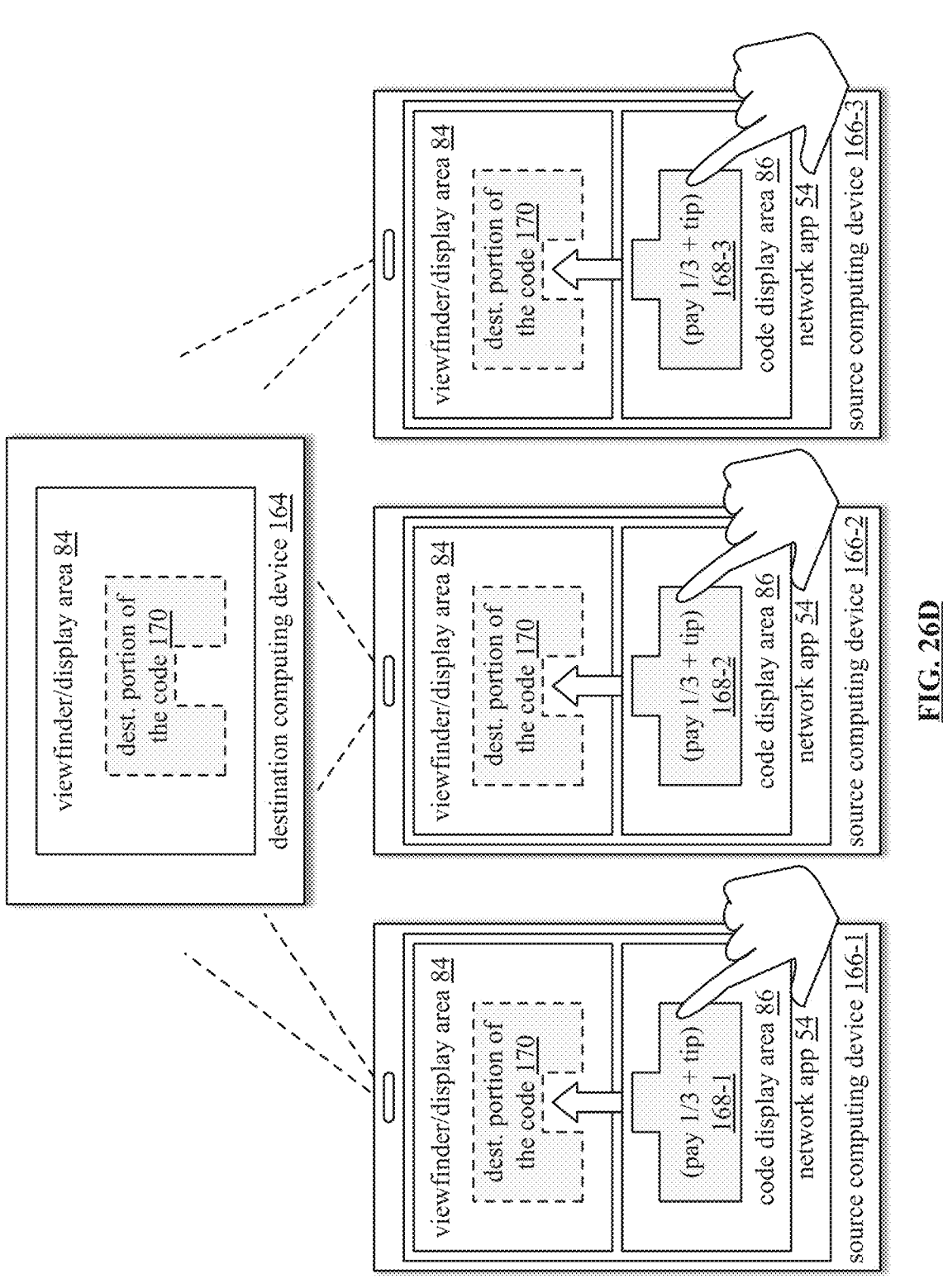

FIG. 26C continues the example of FIG. 26B and shows an example where the source computing devices 166-1 through 166-3 have selected the spilt bill equally and split 20% tip equally options. The first, second, and third source computing devices 166-1 through 166-3 then confirm the selections. FIG. 26D continues the example of FIG. 26C where the network computing device generates source portions of the code 168-1 through 168-3 based on the selected bill split options (e.g., split the bill and tip equally) and the destination portion of the code 170. The network computing device sends the source portions of the code 168-1 through 168-3 to the respective source computing devices 166-1 through 166-3.

Users of the source computing devices 166-1 through 166-3 complete an alignment function to align the source portions of the code 168-1 through 168-3 with the destination portion of the code 170. For example, the users of the source computing devices 166-1 through 166-3 drag and drop the source portions of the code 168-1 through 168-3 into their respective viewfinder/display areas 84 to align with the destination portion of the code 170. The interaction is complete when the network applications 54 of the source computing devices 166-1 through 166-3 all capture the optically produced codes and communicate with the network computing device.

FIGS. 27A-27B are schematic block diagrams of an example of bill splitting options of a multi-source multi-part code system. FIGS. 27A-27B includes the source computing devices 166-1 through 166-3. Continuing the example of FIG. 26A where the users of the source computing devices 166-1 through 166-3 select to have bill split options displayed, in another embodiment, the network computing device generates source portions of the code representative of different bill split options and sends the source portion options of the code to the source computing devices.

For example, the interaction between the source computing devices 166-1 through 166-3 and the destination computing device 164 is a payment for three items (e.g., three entrees off a restaurant menu). The network computing device generates source portions of the code to represent payment of the different items and sends the source portion options of the code to the source computing devices.

In this example, the user of the source computing device 166-1 performs an alignment function to align the "pay item 1" source portion of the code 168-1 with the destination portion of the code 170. The user of the source computing device 166-2 performs an alignment function to align the "pay item 2" source portion of the code 168-2 with the destination portion of the code 170. The user of the source computing device 166-3 performs an alignment function to align the "pay item 3" source portion of the code 168-3 with the destination portion of the code 170. The bill split options section may further include a confirmation button and other bill split selection options.

The alignment function may end the interaction (e.g., as in the example discussed in FIGS. 21A-21B) or a confirmation may be needed to confirm when all desired source portion options of the code are aligned (e.g., as in the example discussed in FIGS. 19A-19C).

In this example, a confirmation is required to end the interaction. After aligning the source portions of the code indicative of menu items to pay, the users of the source computing devices 166-1 through 166-3 select an option to add tip. In another embodiment, once the users of the source computing devices 166-1 through 166-3 align their respective source portions of the code indicative of menu items to pay, the network application automatically displays source portions of the code to represent adding tip based off the price of the individual items selected. As another example, the source portions of the code may already include a tip.

In FIG. 27B, when the users of the source computing devices 166-1 through 166-3 select an option to add tip, the network computing device generates source portions of the code to represent payment of tip based on of the price of the different items and sends the source portion options of the code to the source computing devices.

In this example, the user of the source computing device 166-1 performs an alignment function to align the "pay item 1 tip" source portion of the code 168-1 with the destination portion of the code 170. The user of the source computing device 166-2 performs an alignment function to align the "pay item 2 tip" source portion of the code 168-2 with the destination portion of the code 170. The user of the source computing device 166-3 performs an alignment function to align the "pay item 3 tip" source portion of the code 168-3 with the destination portion of the code 170.

The alignment function may end the interaction (e.g., as in the example discussed in FIGS. 21A-21B) or a confirmation may be needed to confirm when all desired source portion options of the code are aligned (e.g., as in the example discussed in FIGS. 19A-19C). As shown here, the users of the source computing devices 166-1 through 166-3 select an option to confirm all portions have been aligned in order to end the interaction.

Figure 28A:
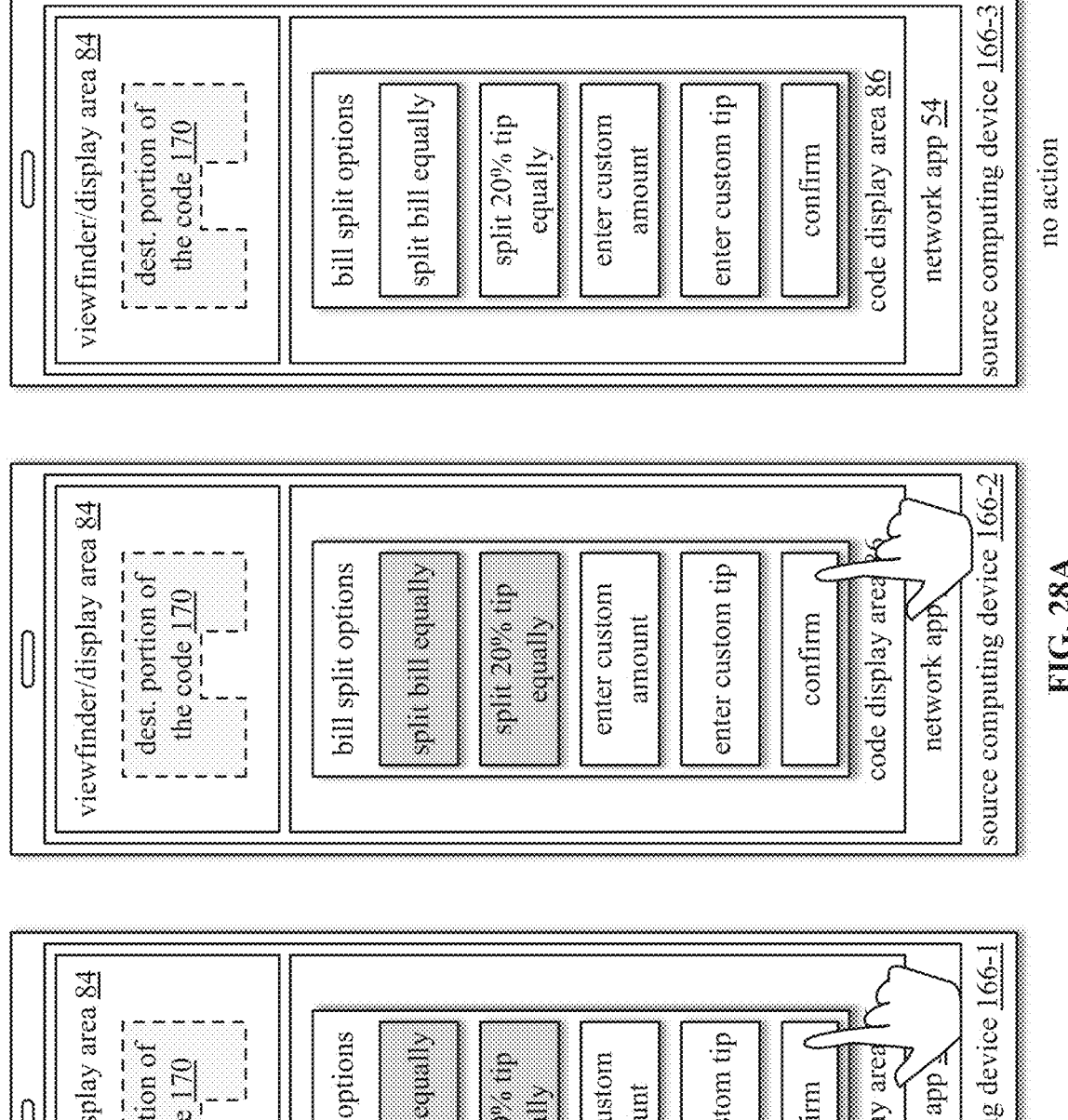

FIGS. 28A-28B are schematic block diagrams of examples of bill splitting errors of a multi-source multi-part code system. FIG. 28A continues the example described in FIGS. 26A-26C except that only the source computing devices 166-1 through 166-2 have selected the spilt bill equally and split 20% tip equally options. The user of the source computing device 166-3 has not selected any options within a certain period of time. FIG. 28B continues the example described in FIGS. 26A-26C except that the source computing devices 166-1 through 166-2 have selected the spilt bill equally and split 20% tip equally options and the source computing device 166-3 has selected to enter a custom amount and a custom tip. In this example, the custom amount and the custom tip entered are less than the amount of splitting the bill equally and tip equally with the other source computing devices.

Figure 29A:
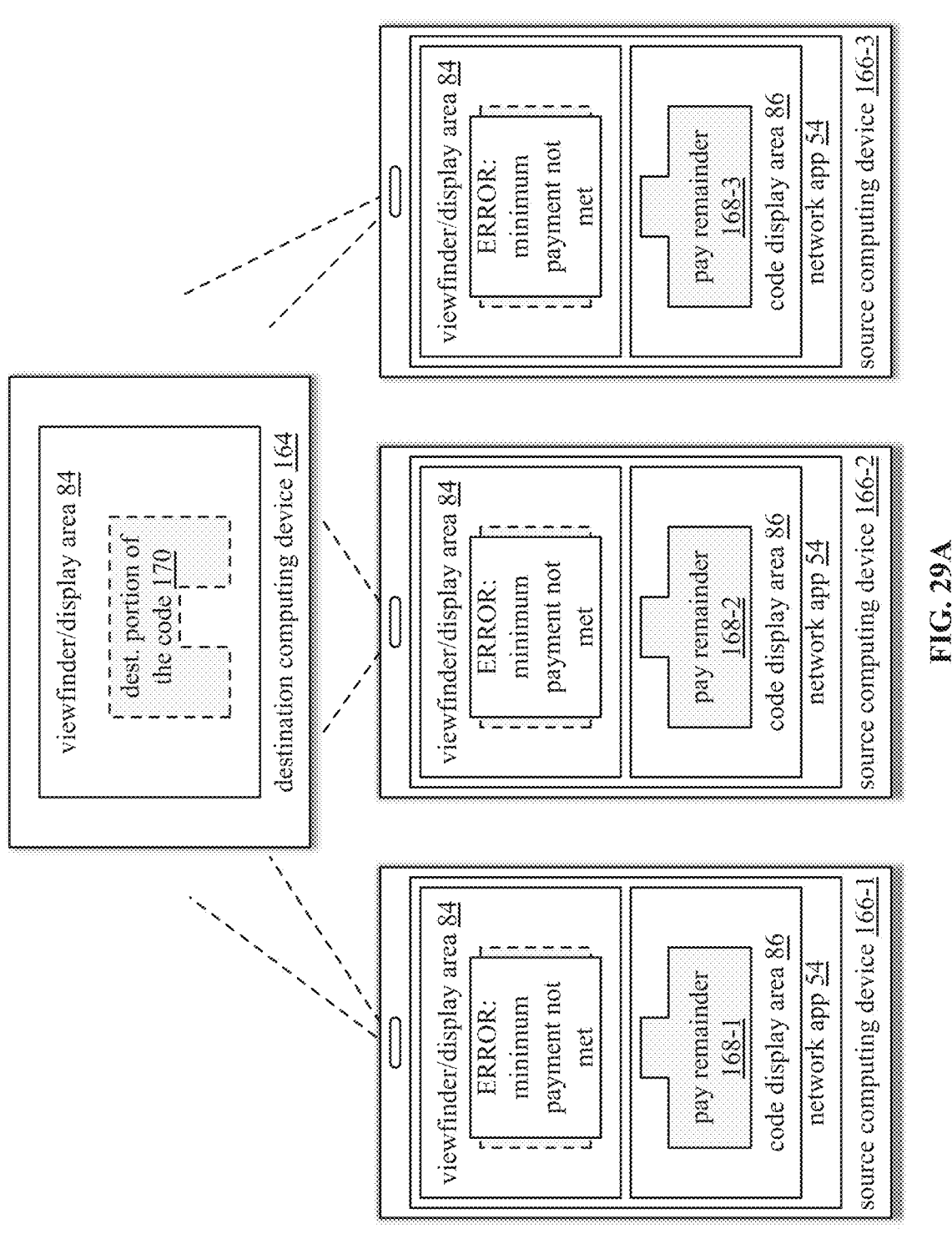
FIGS. 29A-29C are schematic block diagrams of examples of error remedies of a multi-source multi-part code system in accordance with the present invention.
Figure 29B:
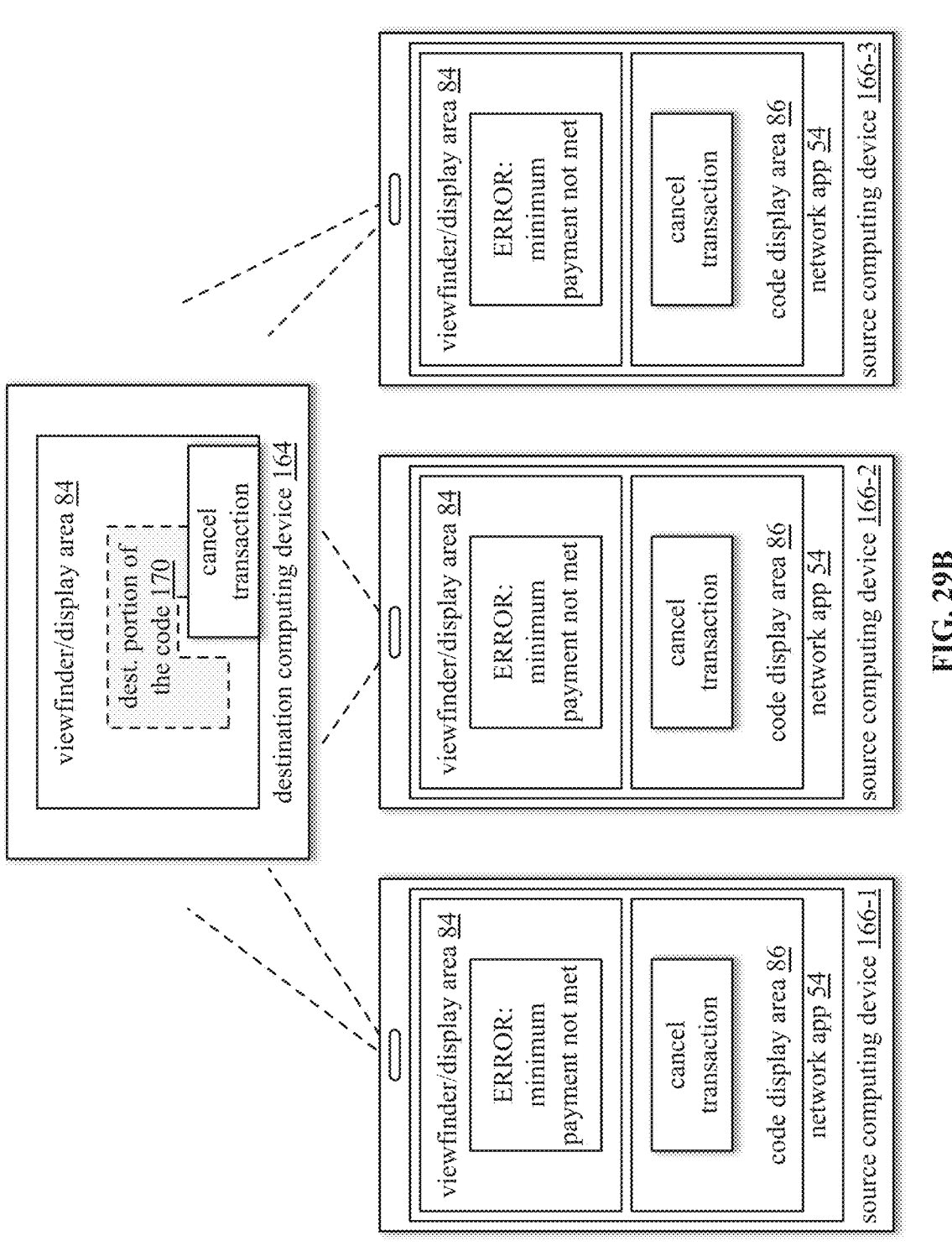
Figure 29C:
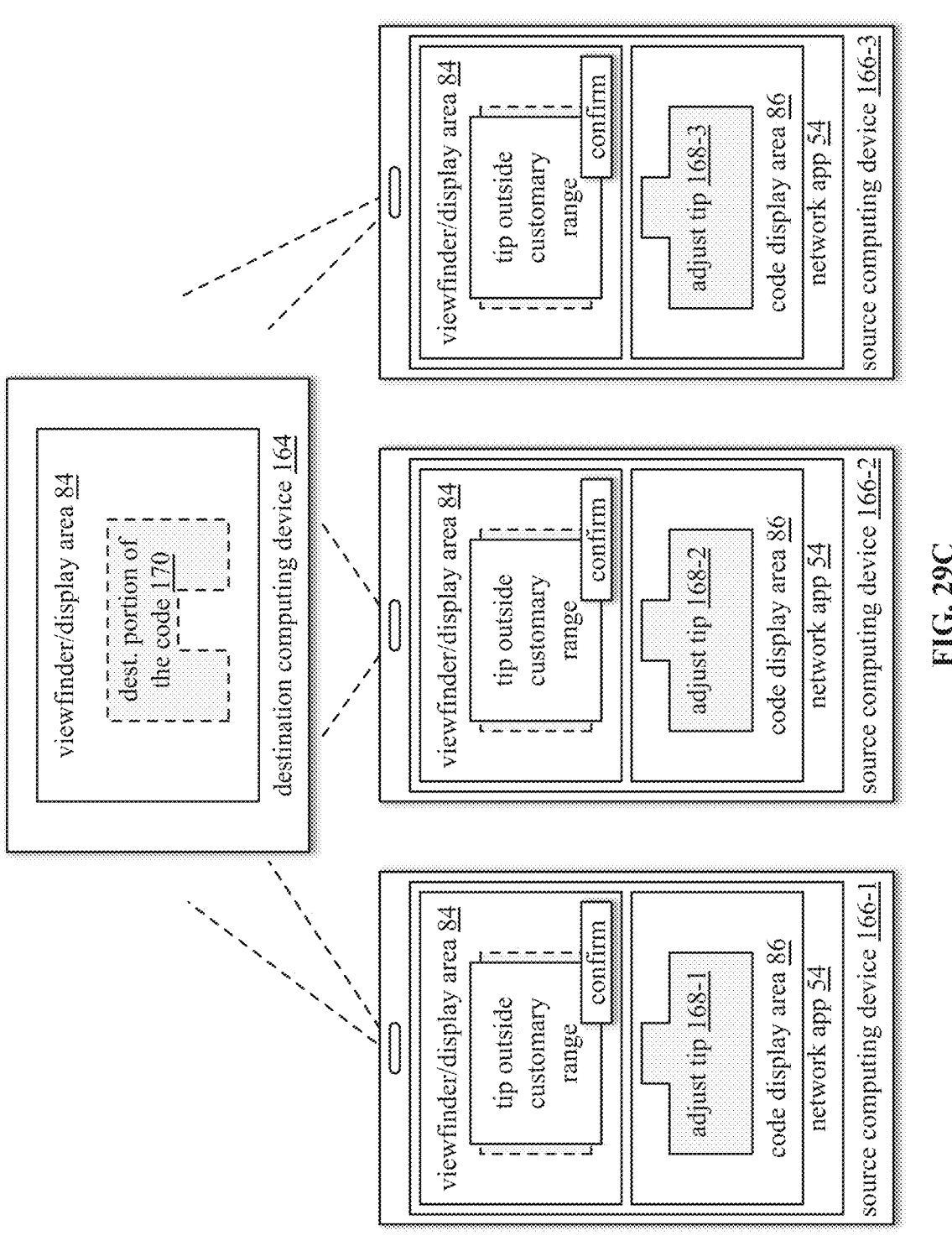

FIGS. 29A-29C are schematic block diagrams of examples of error remedies of a multi-source multi-part code system. In FIG. 29A, when an error is detected (e.g., like the errors of FIG. 28A and/or 28B), the alignment functions and confirmation attempts to end the interaction are not accepted by the network computing device. An error message indicating that the minimum payment has not been met is sent to the source computing devices 166-1 through 166-3.

The network computing device generates a new source portion of the code representative of the amount owed and sends the source portion of the code to the source computing devices 166-1 through 166-3 such that any of the source computing devices can remedy the error.

In FIG. 29B, when an error is detected (e.g., like the errors of FIGS. 28A and/or 28B), the alignment functions and confirmation attempts to end the interaction are not accepted by the network computing device. An error message indicating that the minimum payment has not been met is sent to the source computing devices 166-1 through 166-3. An option to cancel the transaction is displayed. For example, if a source computing device refuses to pay the correct amount, one or more of the source computing device 166-1, source computing device 166-2, source computing device 166-3, and the destination computing device 164 can choose to cancel the transaction.

In FIG. 29C, the network computing device receives notification that all portions are aligned and that the code produced indicates that a minimum payment has been met but a customary amount of tip is too low or too high. For example, different geographical regions have different tipping customs. A person traveling abroad may not realize that he or she is tipping more or less than is customary. As another example, while tipping is customary for certain services, tipping is always a choice. A level of service can dictate a tip outside of a customary amount. As another example, a user of one of the source computing devices 166-1 through 166-3 may have forgotten to include tip or made a calculation error.

When the network computing device detects that the amount of tip is too low or too high based on the current geographical region and service involved, the source computing devices 166-1 through 166-3 are notified that the amount of tip is outside the customary range. The notification may include an indication of how much the tip is outside the customary range. The users of the source computing devices 166-1 through 166-3 are presented an option to confirm or adjust the tip amount.

To adjust the tip amount, the network computing device may present a recommended source portion of code that would adjust the tip when aligned with the destination portion of the code. The recommended source portion of code may include a full amount required to adjust the tip or an amount split among the source computing devices.

FIG. 30 is a flowchart of an example of a method for execution by a network computing device of a multi-source multi-part code. The method begins with step 172 where the network computing device receives interaction information from one or more of: a source computing device of two or more source computing devices of the multi-source multi-part code system and a destination computing device of the multi-source multi-part code system. One or more of the source computing device of two or more source computing devices and the destination computing device include a network application that associates the source computing device of two or more source computing devices and the destination computing device with the network computing device. The interaction occurs via an interface means.

The interaction is an exchange of data. For example, the interaction is a payment transaction between the two or more source computing devices and the destination computing device. As another example, the interaction is a contract between the two or more source computing devices and the destination computing device. As another example, the interaction is sharing confidential information between the two or more source computing devices and the destination computing device.

The interface means includes one or more of an optical scanning application of one or more of the first or second computing device, a direct link (e.g., near-field communication (NFC)), and a network connection. The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The method continues with step 174 where a multi-part code generation module of the network computing device generates a destination portion of a code representative of the interaction information and two or more source portions of the code representative of the interaction information such that the destination and two or more source portions of the code are unusable individually. Unusable means the portions cannot be optically read by an optical reader/scanner or the information obtained from an optical reader is incomplete or yields no real data. The generation of the two or more source portions of the code may be based on the destination portion of the code and/or source code option selections of the two or more source computing devices (e.g., bill splitting options, etc.). Different examples of multi-part code generation for multiple sources is discussed in more detail with reference to FIGS. 24A-24E.

The method continues with step 176 where the network computing device sends the destination portion of the code to the destination computing device and two or more source portions of the code to the corresponding two or more source computing devices. Alternatively, the network computing device sends the destination portion of the code to the destination computing device, generates the two or more source portions of the code based on the source computing devices' interaction with the destination portion of the code, and then sends the two or more source portions of the code to the corresponding two or more source computing devices.

The two or more source portions of the code must be aligned with destination portion of the code through an alignment function (e.g., drag and drop, move to align, etc.) such that a full code is produced indicating intent to complete the interaction. When the two or more source portions of the code are aligned with destination portion of the code to produce a full and accurate code at step 178, the interaction finalization module of the network computing device finalizes the interaction at step 180. For example, the interaction finalization module transfers an amount of money from the accounts associated with the two or more source computing devices to an account associated with the destination computing device when the interaction is a payment from the two or more source computing devices to the two or more source computing devices computing device.

If the two or more source portions of the code are not aligned with destination portion of the code to produce the full code at step 178 (e.g., not all source portions of the code have been aligned) and/or the two or more source portions of the code are aligned with destination portion of the code to produce an inaccurate code (e.g., the code produced is not representative of the interaction information, a user error has occurred, etc.), the network computing device implements one or more remedies at step 182.

For example, the network computing device generates and delivers a new source portion of the code to at least one of the two or more source computing devices or the network computing device generates and delivers all new portions of the code to the two or more source computing devices and the destination computing device. As another example, the network computing device notifies one or more of two or more source computing devices and the destination computing device regarding the alignment (e.g., a notification to retry alignment is sent, a notification to correct an error, a query regarding whether to regenerate a new code, etc.).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprises:
a network module;
memory; and
a processing module operably coupled to the network module and to the memory, wherein the processing module is operable to:
obtain a first portion of a graphical code, wherein the graphical code represents an invoice and wherein the first portion of the graphical code includes a graphical representation of payee information;
obtain a first complementary portion of the graphical code that includes a graphical representation for information from a first payor device;
obtain a second complementary portion of the graphical code that includes a graphical representation for information from a second payor device;
combine the first portion of the graphical code with the first complementary portion of the graphical code to produce a first invoice and payment information for the first payor device;
combine the first portion of the graphical code with the second complementary portion of the graphical code to produce a second invoice and payment information for the second payor device; and
execute payment from the first and second payor devices when the first and second invoice and payment information has been verified.

2. The computing device of claim 1, wherein the processing module is operable to obtain the first portion of the graphical code by:
sending, via the network module, the invoice and the payee information to a network computing device of a multi-part code system; and
receiving, via the network module, the first portion of the graphical code from the network computing device, wherein the network computing device generated the graphical code based on the invoice, and wherein the network computing device generated the first portion of the graphical code based on the payee information.

3. The computing device of claim 1, wherein the processing module is operable to obtain the first complementary portion of the graphical code by:
receiving, via the network module, the first complementary portion of the graphical code from a network computing device of a multi-part code system, wherein the network computing device generated the first complementary portion of the graphical code based on the payment information for the first payor device.

4. The computing device of claim 3, wherein the processing module is operable to obtain the second complementary portion of the graphical code by:
receiving, via the network module, the second complementary portion of the graphical code from the network computing device, wherein the network computing device generated the second complementary portion of the graphical code based on the payment information for the second payor device.

5. The computing device of claim 4, wherein the processing module is operable to obtain one or more of the first and second complementary portions of the graphical code by:
receiving, via an interface means, the one or more of the first and second complementary portions of the graphical code from one or more of the first and second payor devices, wherein the network computing device provided the one or more of the first and second complementary portions of the graphical code to the one or more of the first and second payor devices.

6. The computing device of claim 1, wherein the processing module is operable to combine the first portion of the graphical code with one or more of the first and second complementary portions of the graphical code by:
performing an alignment function to combine the one or more of the first and second complementary portions of the graphical code with the first portion of the graphical code.

7. The computing device of claim 1, wherein the processing module is operable to combine the first portion of the graphical code with one or more of the first and second complementary portions of the graphical code by:
performing a drag and drop function to combine the one or more of the first and second complementary portions of the graphical code and the first portion of the graphical code.

8. The computing device of claim 1, wherein the processing module is operable to combine the first portion of the graphical code with one or more of the first and second complementary portions of the graphical code by:
obtaining, via an interface means, an indication from one or more of the first and second payor devices that the one or more of the first and second complementary portions of the graphical code has been combined with the first portion of the graphical code.

9. The computing device of claim 1, wherein the processing module is operable to execute payment from the first and second payor devices by:
sending, via the network module, confirmation that the first and second invoice have been generated to a network computing device of a multi-part code system; and
obtaining, via the network computing device, payment from the first and second payor devices.

10. A computer readable storage medium comprises:
at least one memory section that stores operational instructions that, when executed by a processing module, causes the processing module to:
obtain a first portion of a graphical code, wherein the graphical code represents an invoice and wherein the first portion of the graphical code includes a graphical representation of payee information;
obtain a first complementary portion of the graphical code that includes a graphical representation for information from a first payor device;

obtain a second complementary portion of the graphical code that includes a graphical representation for information from a second payor device;

combine the first portion of the graphical code with the first complementary portion of the graphical code to produce a first invoice and payment information for the first payor device;

combine the first portion of the graphical code with the second complementary portion of the graphical code to produce a second invoice and payment information for the second payor device; and execute payment from the first and second payor devices when the first and second invoice and payment information has been verified.

11. The computer readable storage medium of claim 10, wherein the at least one memory section further stores operational instructions that, when executed by the processing module, causes the processing module to obtain the first portion of the graphical code by:

sending the invoice and the payee information to a network computing device of a multi-part code system; and receiving the first portion of the graphical code from the network computing device, wherein the network computing device generated the graphical code based on the invoice, and wherein the network computing device generated the first portion of the graphical code based on the payee information.

12. The computer readable storage medium of claim 10, wherein the at least one memory section further stores operational instructions that, when executed by the processing module, causes the processing module to obtain the first complementary portion of the graphical code by:

receiving the first complementary portion of the graphical code from a network computing device of a multi-part code system, wherein the network computing device generated the first complementary portion of the graphical code based on the payment information for the first payor device.

13. The computer readable storage medium of claim 12, wherein the at least one memory section further stores operational instructions that, when executed by the processing module, causes the processing module to obtain the second complementary portion of the graphical code by:

receiving the second complementary portion of the graphical code from the network computing device, wherein the network computing device generated the second complementary portion of the graphical code based on the payment information for the second payor device.

14. The computer readable storage medium of claim 13, wherein the at least one memory section further stores operational instructions that, when executed by the processing module, causes the processing module to obtain one or more of the first and second complementary portions of the graphical code by:

receiving the one or more of the first and second complementary portions of the graphical code from one or more of the first and second payor devices, wherein the network computing device provided the one or more of the first and second complementary portions of the graphical code to the one or more of the first and second payor devices.

15. The computer readable storage medium of claim 10, wherein the at least one memory section further stores operational instructions that, when executed by the processing module, causes the processing module to combine the first portion of the graphical code with one or more of the first and second complementary portions of the graphical code by:

performing an alignment function to combine the one or more of the first and second complementary portions of the graphical code with the first portion of the graphical code.

16. The computer readable storage medium of claim 10, wherein the at least one memory section further stores operational instructions that, when executed by the processing module, causes the processing module to combine the first portion of the graphical code with one or more of the first and second complementary portions of the graphical code by:

performing a drag and drop function to combine the one or more of the first and second complementary portions of the graphical code and the first portion of the graphical code.

17. The computer readable storage medium of claim 10, wherein the at least one memory section further stores operational instructions that, when executed by the processing module, causes the processing module to combine the first portion of the graphical code with one or more of the first and second complementary portions of the graphical code by:

obtaining an indication from one or more of the first and second payor devices that the one or more of the first and second complementary portions of the graphical code has been combined with the first portion of the graphical code.

18. The computer readable storage medium of claim 10, wherein the at least one memory section further stores operational instructions that, when executed by the processing module, causes the processing module to execute payment from the first and second payor devices by:

sending confirmation that the first and second invoice have been generated to a network computing device of a multi-part code system; and obtaining, via the network computing device, payment from the first and second payor devices.

* * * * *